US009900316B2

(12) United States Patent
Resch et al.

(10) Patent No.: US 9,900,316 B2
(45) Date of Patent: *Feb. 20, 2018

(54) ACCESSING STORAGE UNITS OF A DISPERSED STORAGE NETWORK

(71) Applicant: CLEVERSAFE, INC., Chicago, IL (US)

(72) Inventors: Jason K. Resch, Chicago, IL (US); Ravi Khadiwala, Bartlett, IL (US); Greg Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 14/502,337

(22) Filed: Sep. 30, 2014

(65) Prior Publication Data
US 2015/0156204 A1 Jun. 4, 2015

Related U.S. Application Data

(60) Provisional application No. 61/911,544, filed on Dec. 4, 2013.

(51) Int. Cl.
G06F 7/00 (2006.01)
G06F 17/30 (2006.01)
(Continued)

(52) U.S. Cl.
CPC ........ H04L 63/101 (2013.01); G06F 21/6218 (2013.01); H04L 63/0428 (2013.01); H04L 67/1097 (2013.01)

(58) Field of Classification Search
CPC . H04L 29/00; H04L 67/1097; H04L 63/0428; G06F 21/62; G06F 21/6218
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

Primary Examiner — Daniel Kuddus
(74) Attorney, Agent, or Firm — Garlick & Markison; Kelly H. Hale

(57) ABSTRACT

A method begins with a group of storage units of a dispersed storage network (DSN) receiving a common access request. The method continues with each storage unit of the group of storage units interpreting the access request to determine whether the storage unit is an intended recipient of the access request, where storage units of a sub-set of storage units of the group of storage units are intended recipients. The method continues with each storage unit of the sub-set of storage units determining a type of the access request and a level of the access request. When the access request is a read request, the method continues with each storage unit of the sub-set of storage units retrieving each encoded data slice having an identifier of its slice address substantially matching the a given identifier of the level to produce a retrieved set of encoded data slices.

27 Claims, 57 Drawing Sheets

(51) Int. Cl.
  *H04L 29/06* (2006.01)
  *G06F 21/62* (2013.01)
  *H04L 29/08* (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 7,903,730 | B2* | 3/2011 | Haskell .................. G06T 9/005 375/240.01 |
| 7,962,641 | B1* | 6/2011 | Dhuse .................. H04L 67/1097 709/203 |
| 8,027,385 | B2* | 9/2011 | Yourlo .................. G06F 3/14 348/384.1 |
| 8,281,181 | B2* | 10/2012 | Resch .................. G06F 11/10 711/163 |
| 8,458,233 | B2* | 6/2013 | Gladwin .................. G06F 17/30067 707/812 |
| 8,533,424 | B2* | 9/2013 | Grube .................. G06F 9/4401 711/154 |
| 8,548,913 | B2* | 10/2013 | Grube .................. G06F 11/1076 705/40 |
| 8,549,351 | B2* | 10/2013 | Dhuse .................. G06F 11/1076 714/6.24 |
| 8,555,109 | B2* | 10/2013 | Dhuse .................. G06F 11/1076 714/6.22 |
| 8,555,130 | B2* | 10/2013 | Baptist .................. G06F 11/1076 707/822 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0029742 | A1* | 2/2011 | Grube .................. G06F 9/4401 711/154 |
| 2011/0029809 | A1* | 2/2011 | Dhuse .................. G06F 11/1076 714/6.1 |
| 2011/0072210 | A1* | 3/2011 | Dhuse .................. G06F 11/1076 711/114 |
| 2011/0161666 | A1* | 6/2011 | Gladwin .................. G06F 21/10 713/164 |
| 2011/0264717 | A1* | 10/2011 | Grube .................. G06F 11/0727 707/827 |
| 2012/0054500 | A1* | 3/2012 | Dhuse .................. G06F 11/1076 713/189 |
| 2012/0137095 | A1* | 5/2012 | Grube .................. G06F 12/0638 711/162 |
| 2012/0254690 | A1* | 10/2012 | Resch .................. G06F 11/1044 714/763 |
| 2012/0254692 | A1* | 10/2012 | Resch .................. G06F 11/1044 714/763 |
| 2013/0304745 | A1* | 11/2013 | Dhuse .................. G06F 17/30336 707/741 |
| 2013/0304746 | A1* | 11/2013 | Dhuse .................. G06F 11/1096 707/743 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

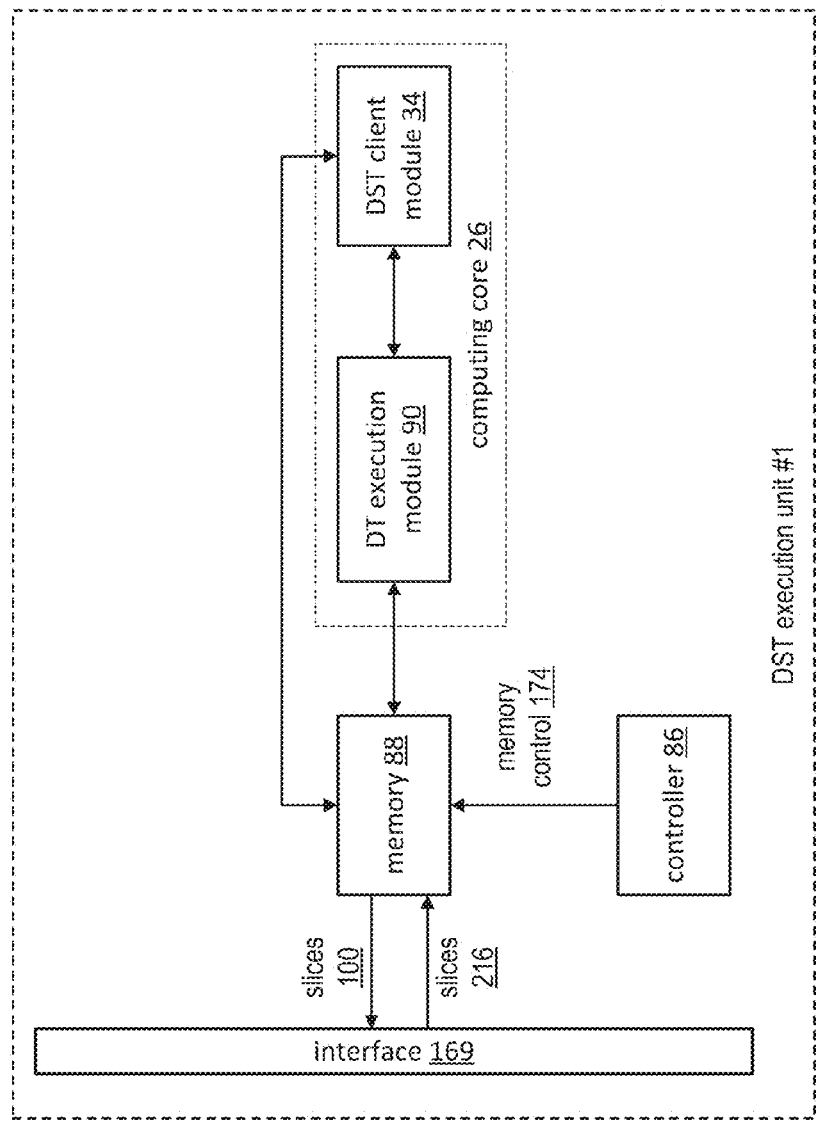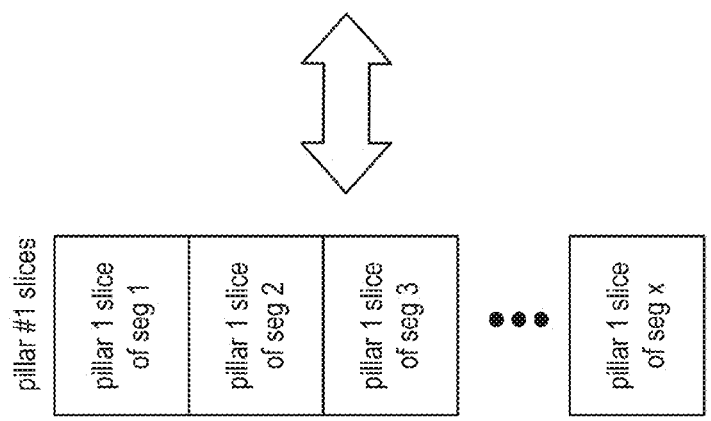
FIG. 24

DST allocation info 242 | data partition info 320: data ID; No. of partitions; Addr. info for each partition; format conversion indication

| | | task execution info 322 | | | intermediate result info 324 | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 2_3, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 3_2, 4_2, & 5_2 | R3-2 | DST unit 5 | DST unit 5 | DST units 5,6, 1-3 |

FIG. 32

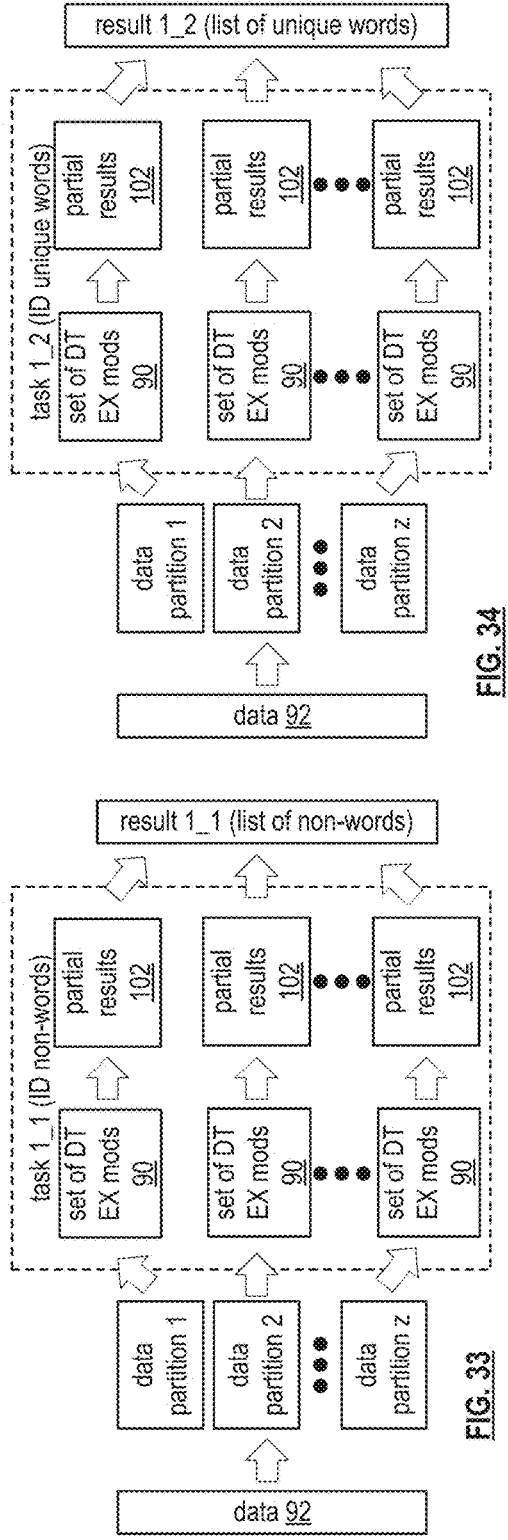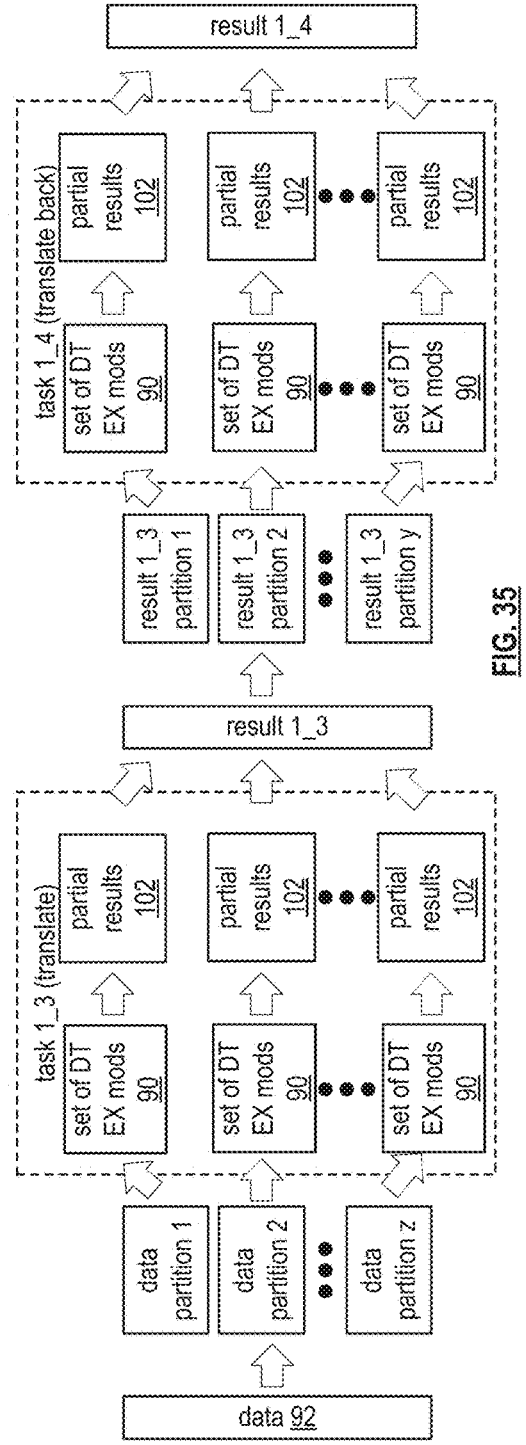

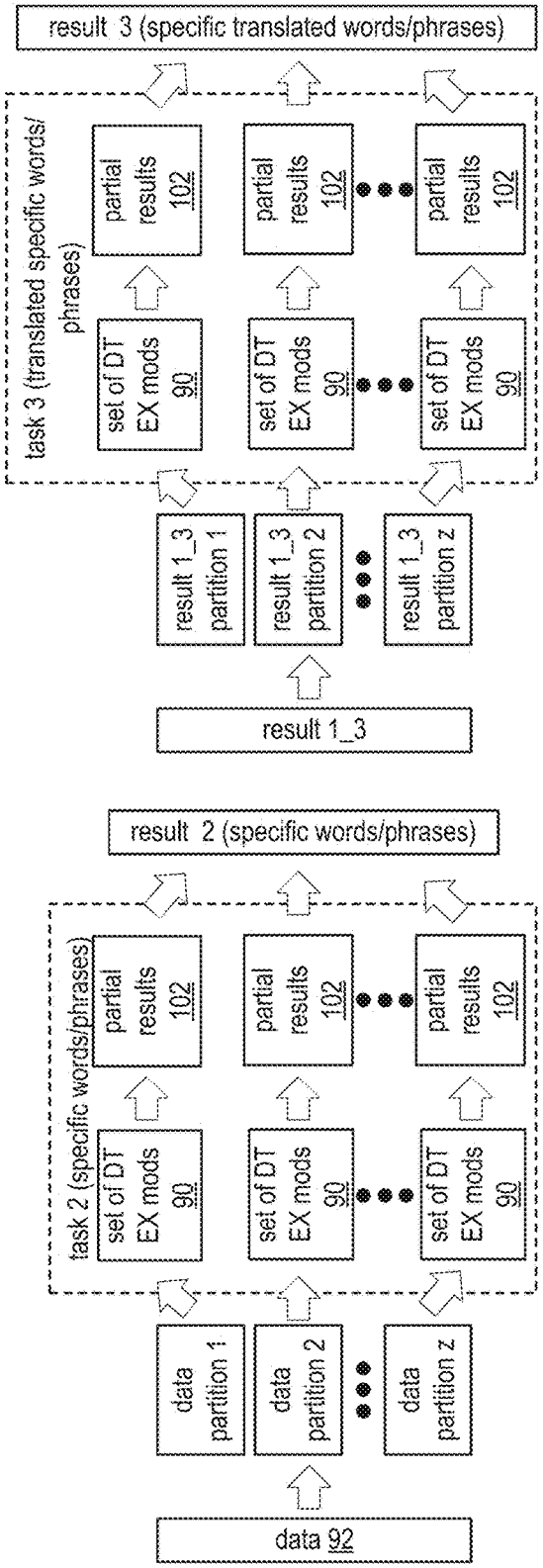
FIG. 37
FIG. 38
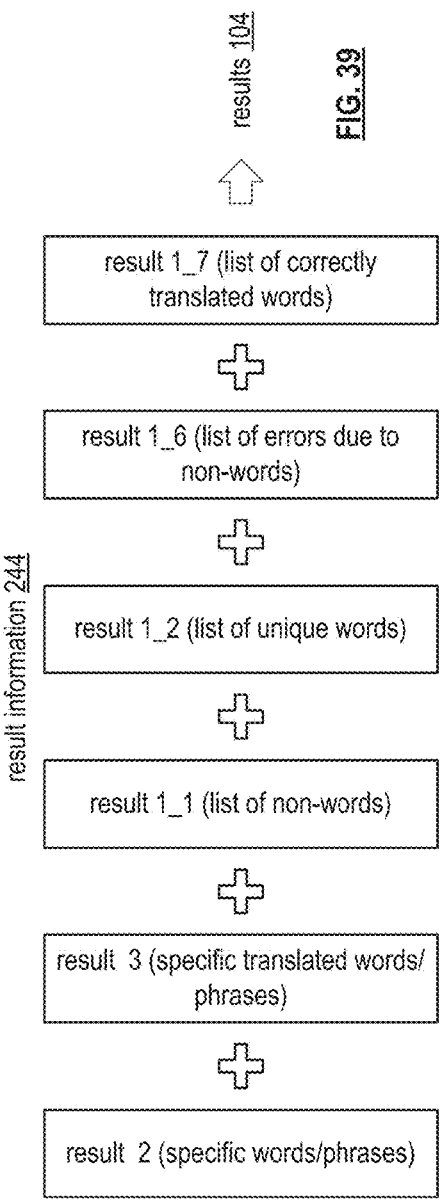
FIG. 39

ACCESSING STORAGE UNITS OF A DISPERSED STORAGE NETWORK

CROSS REFERENCE TO RELATED PATENTS

The present U.S. Utility patent application claims priority pursuant to 35 U.S.C. § 119(e) to U.S. Provisional Application No. 61/911,544, entitled "SELECTING STORAGE UNITS OF A DISPERSED STORAGE NETWORK", filed Dec. 4, 2013, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 45A:
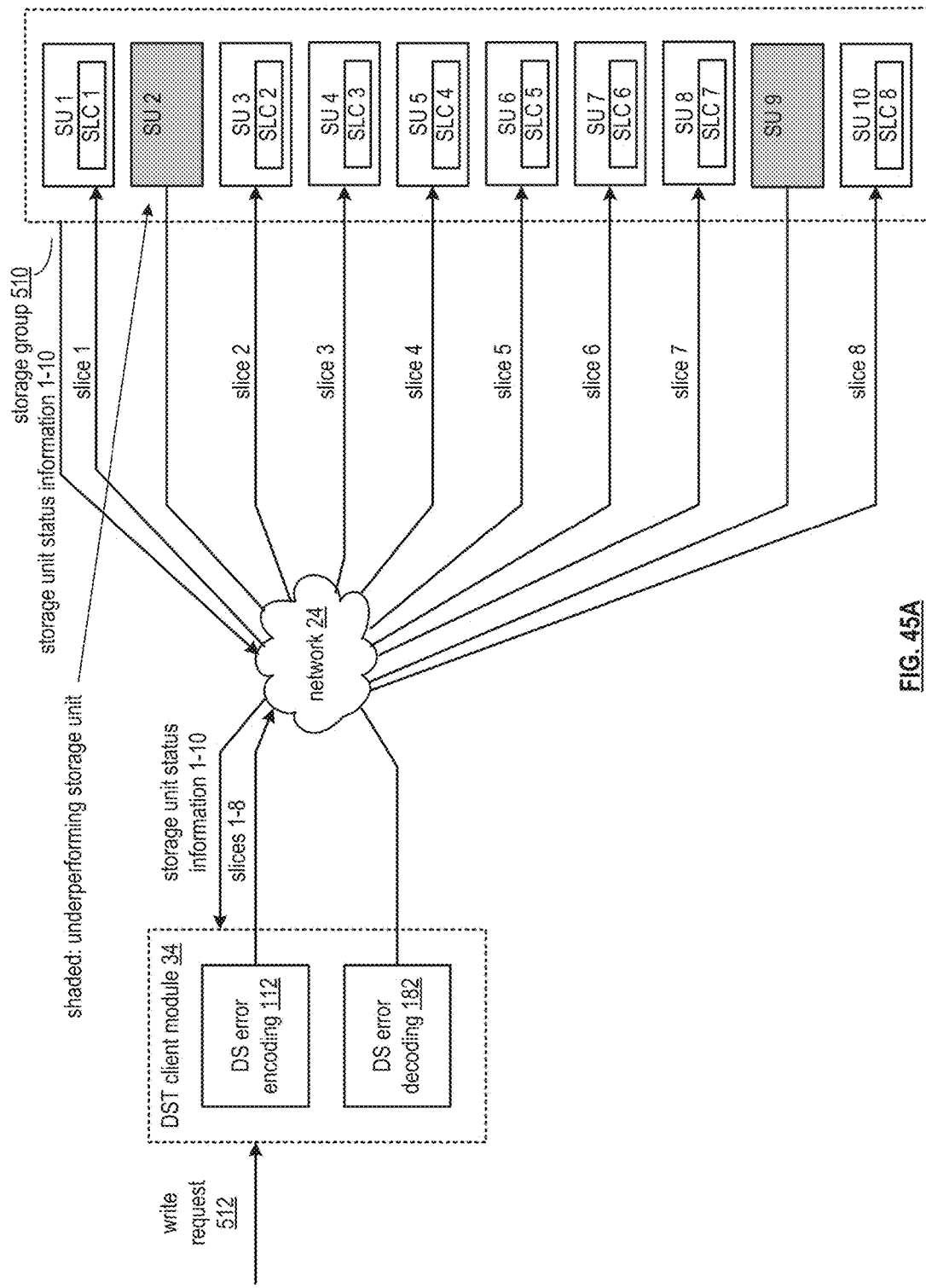
Figure 45B:
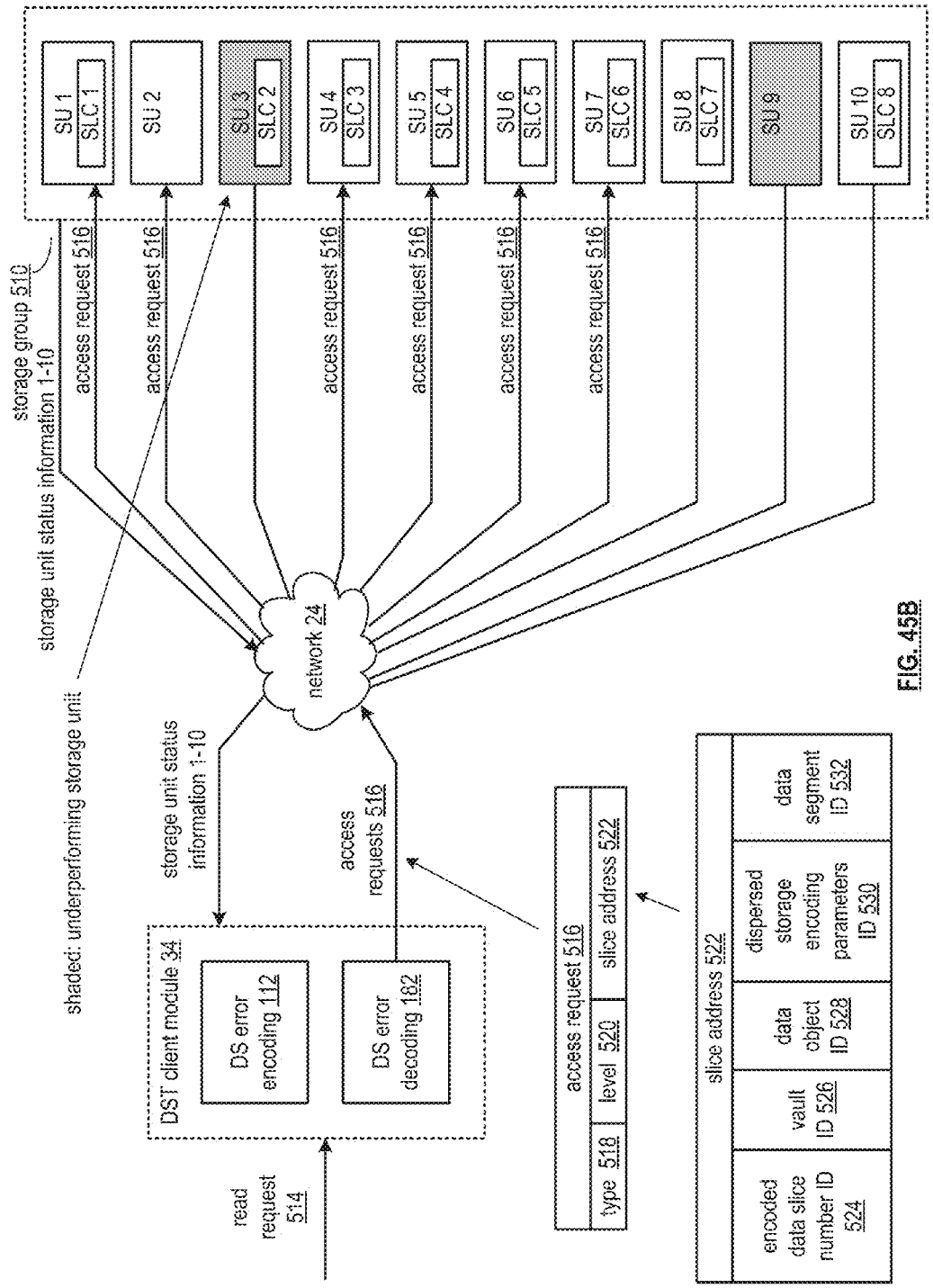
Figure 45C:
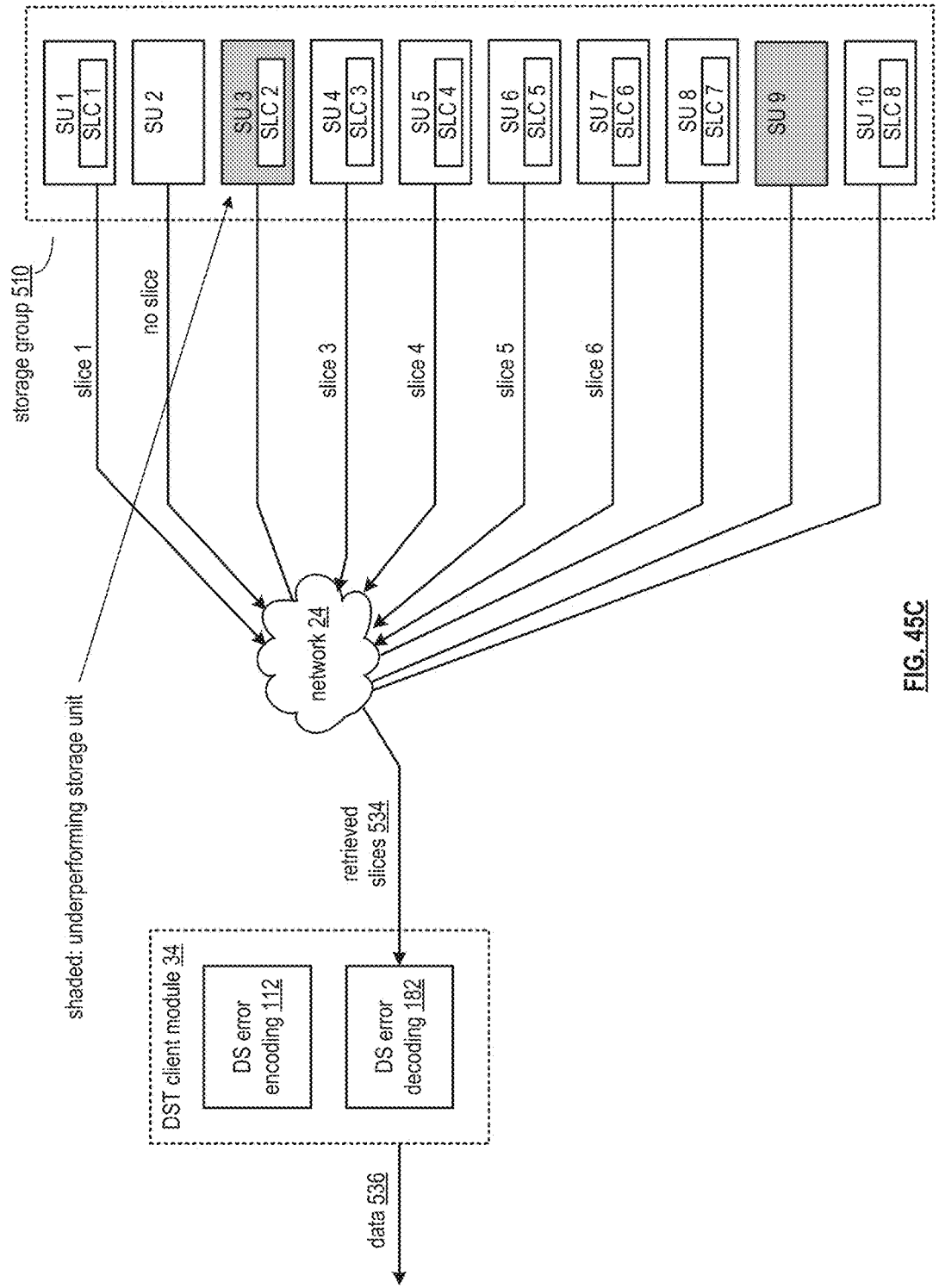
Figure 45D:
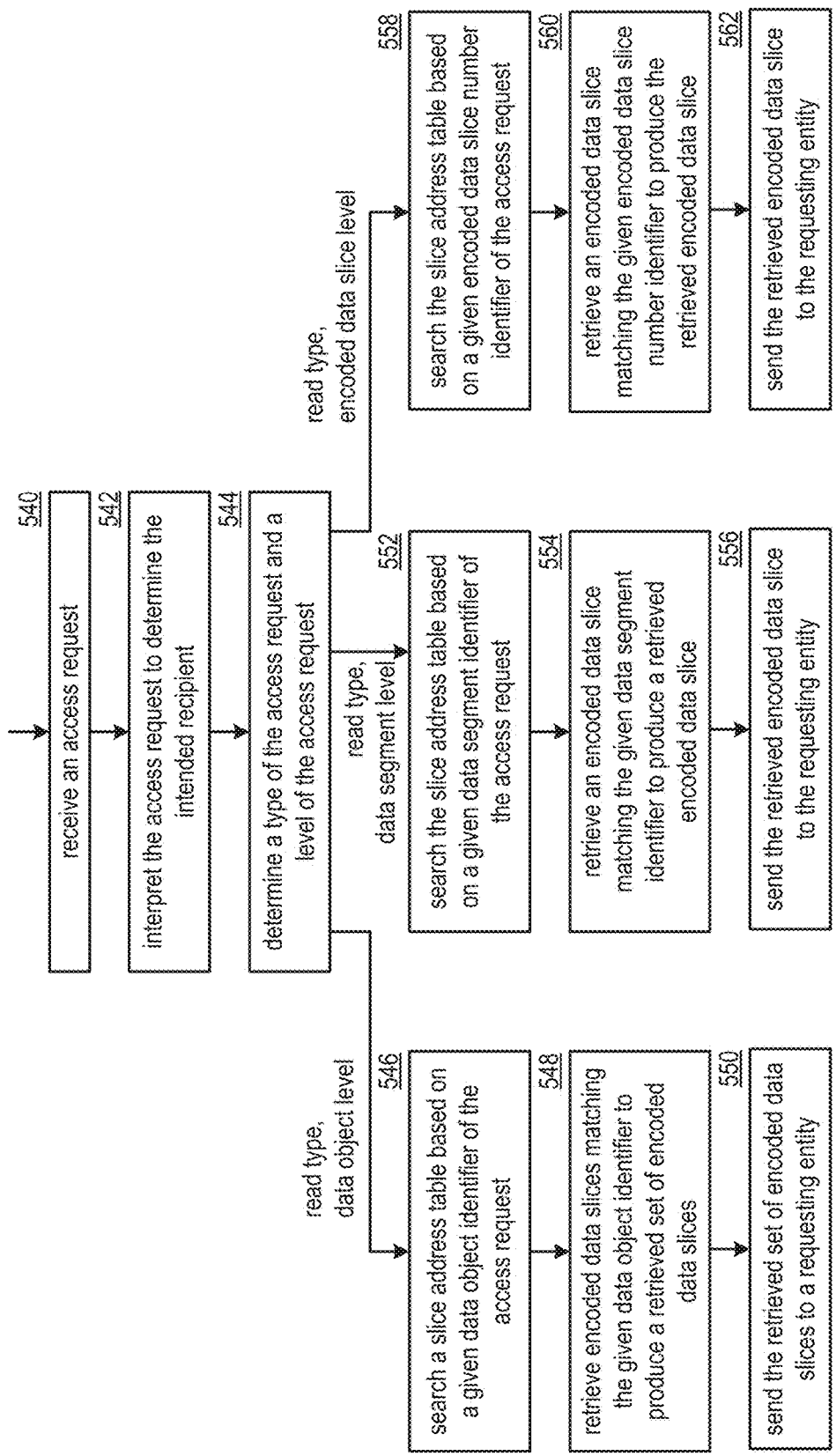
Figure 46A:
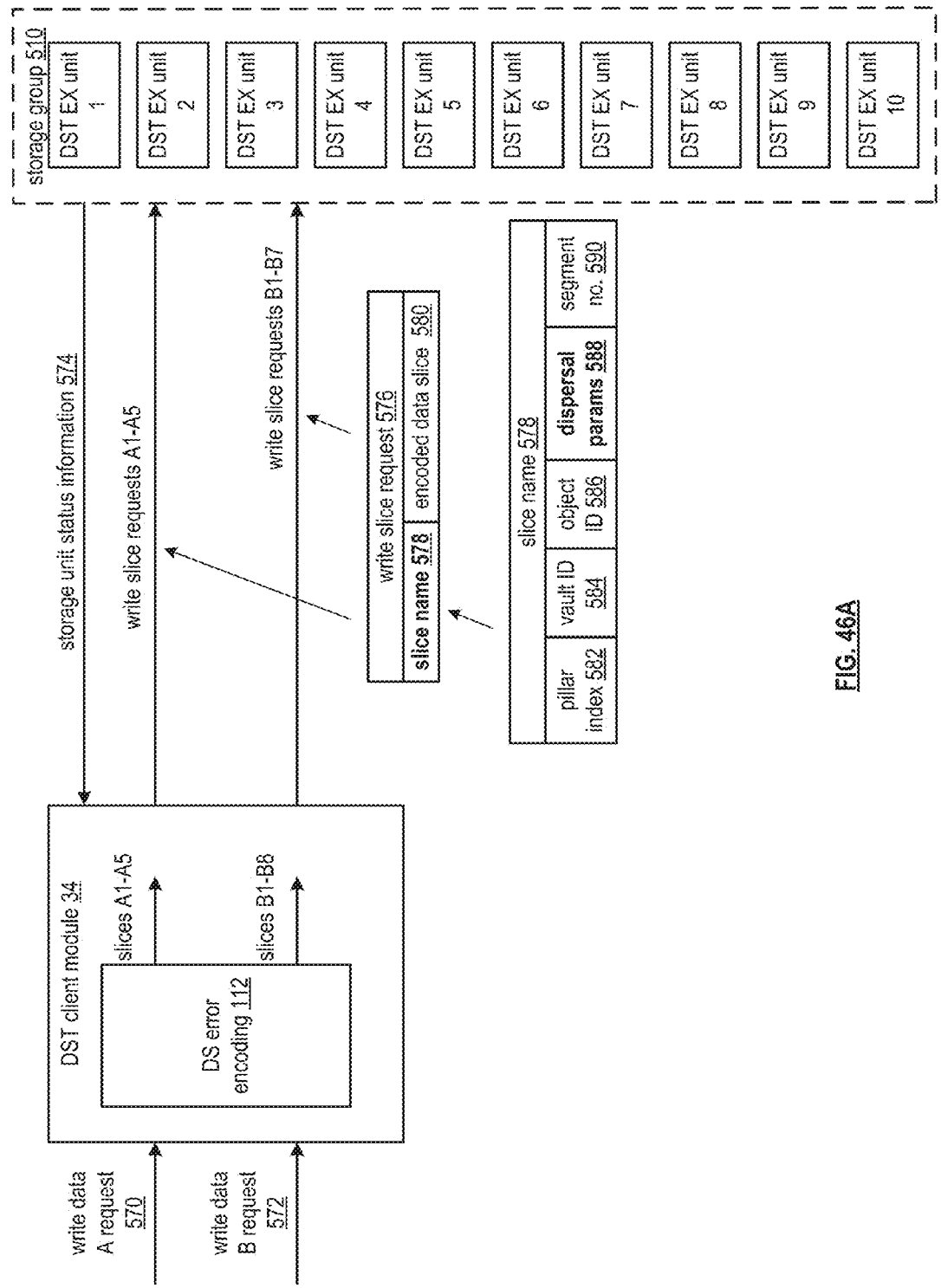
Figure 46B:
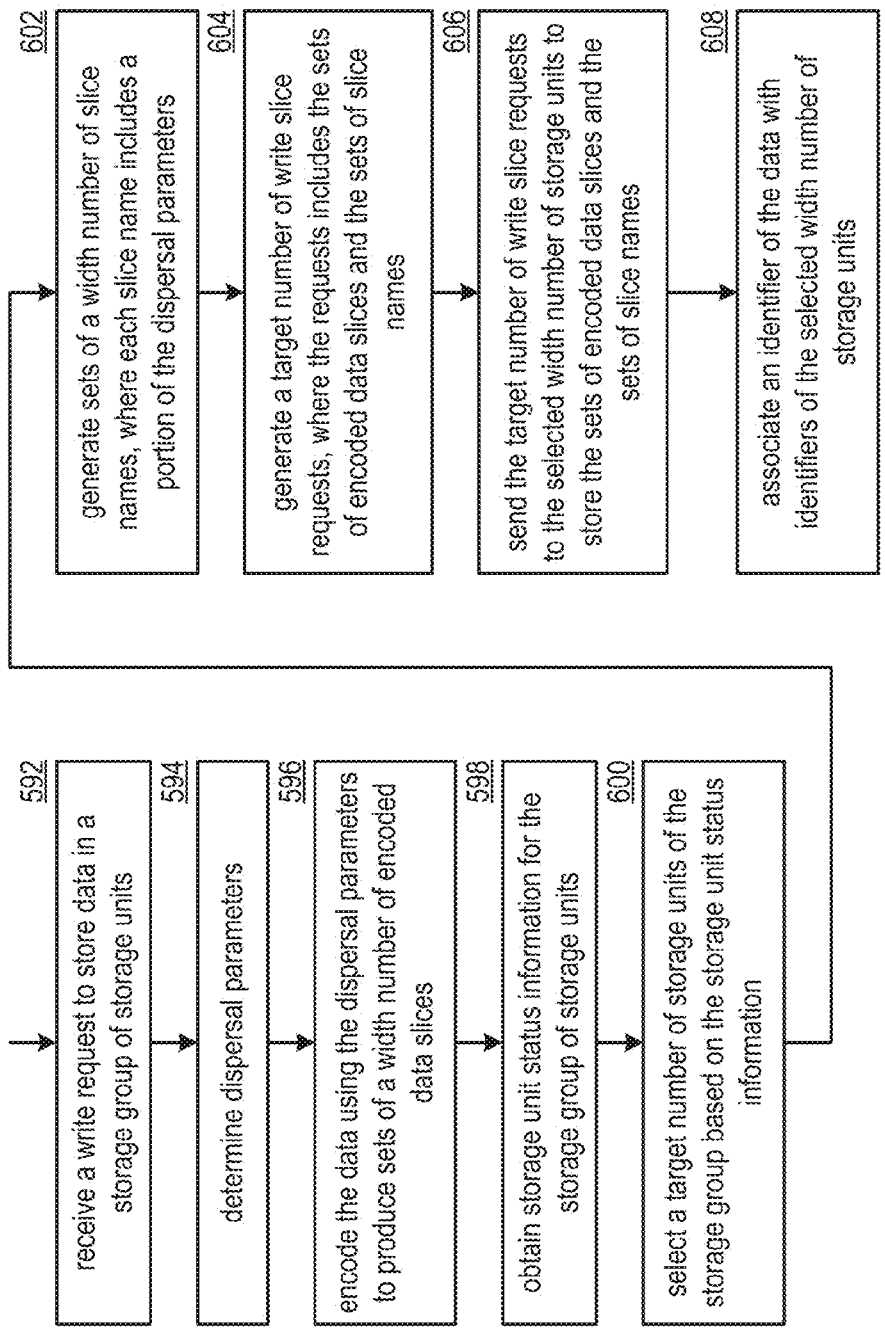
Figure 46C:
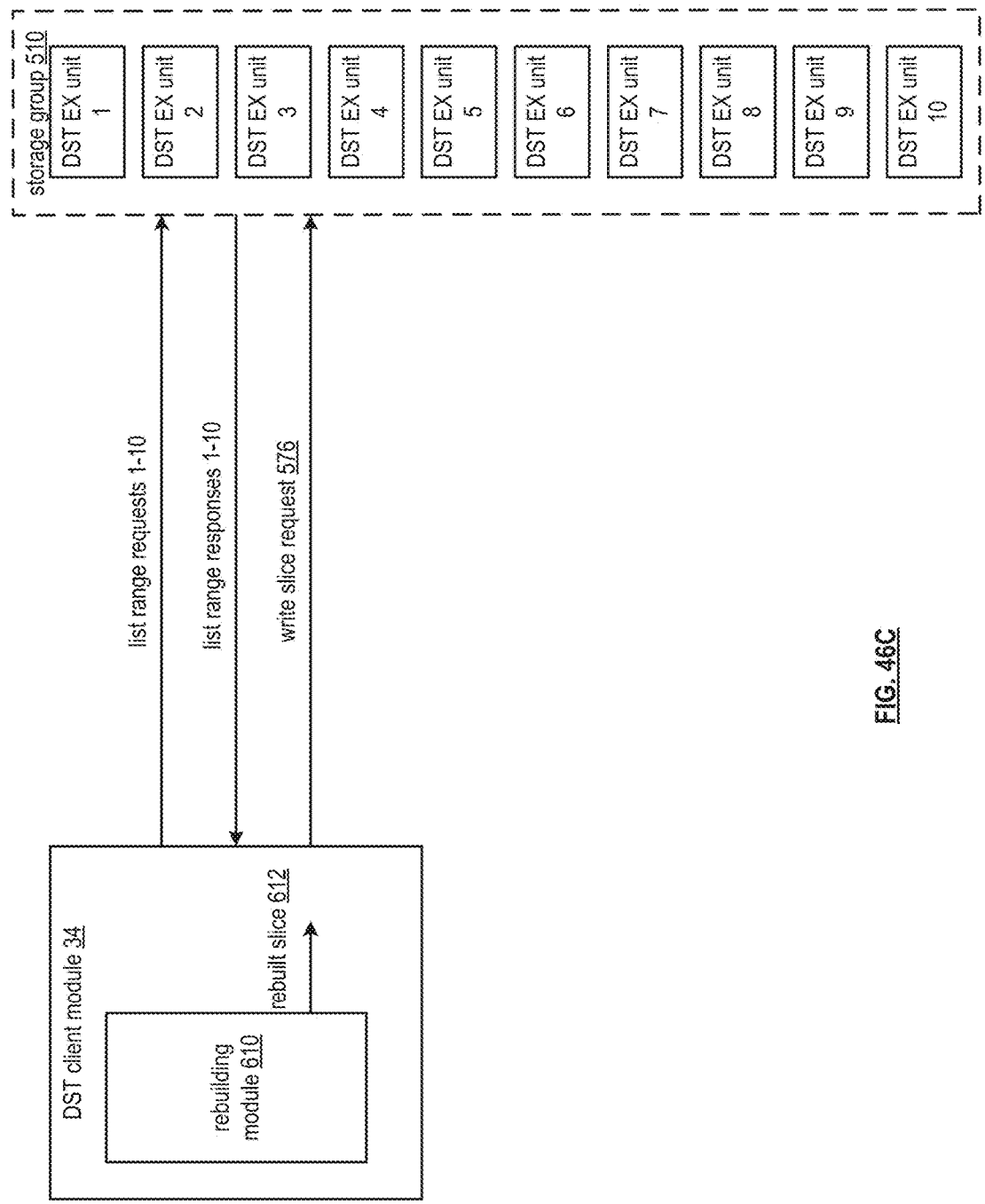
Figure 46D:
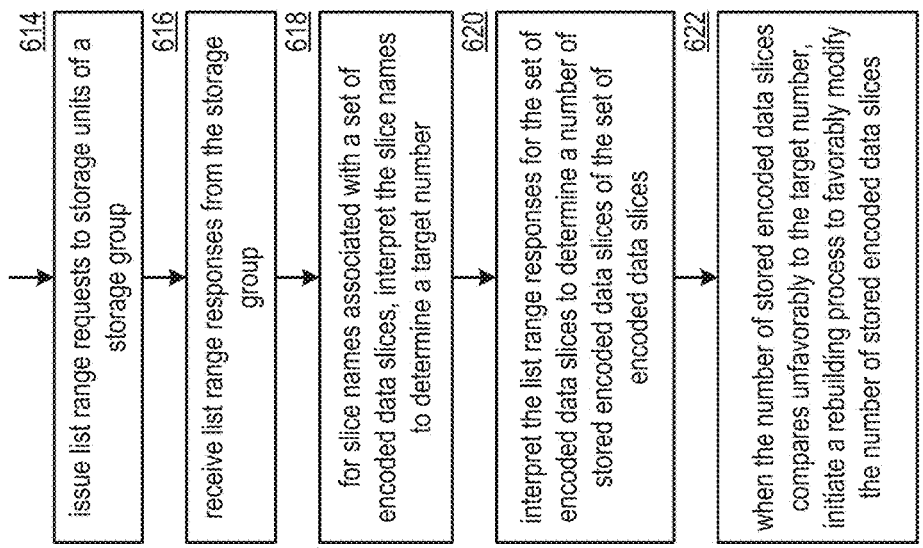
Figure 47A:
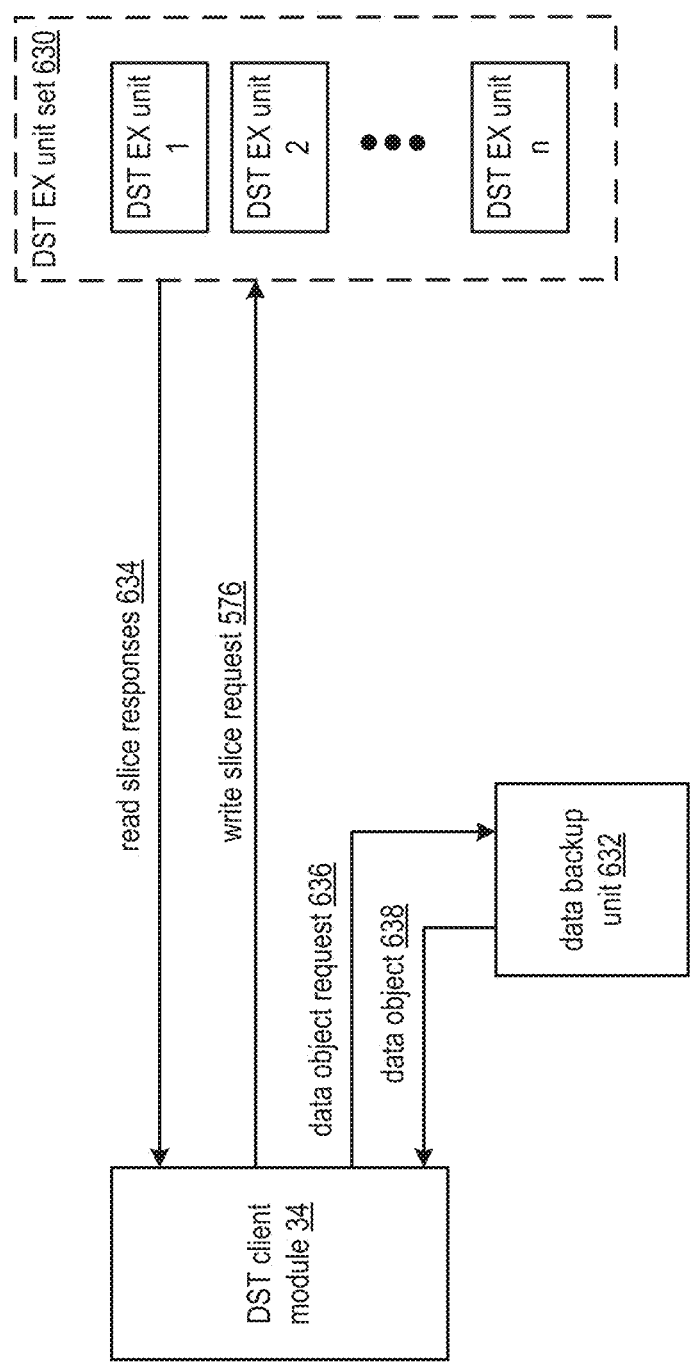
Figure 47B:
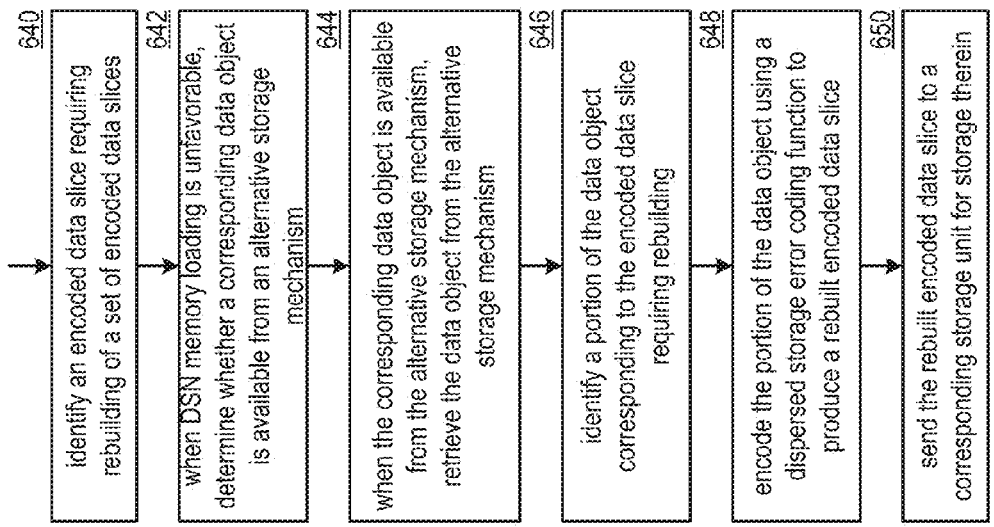
Figure 48A:
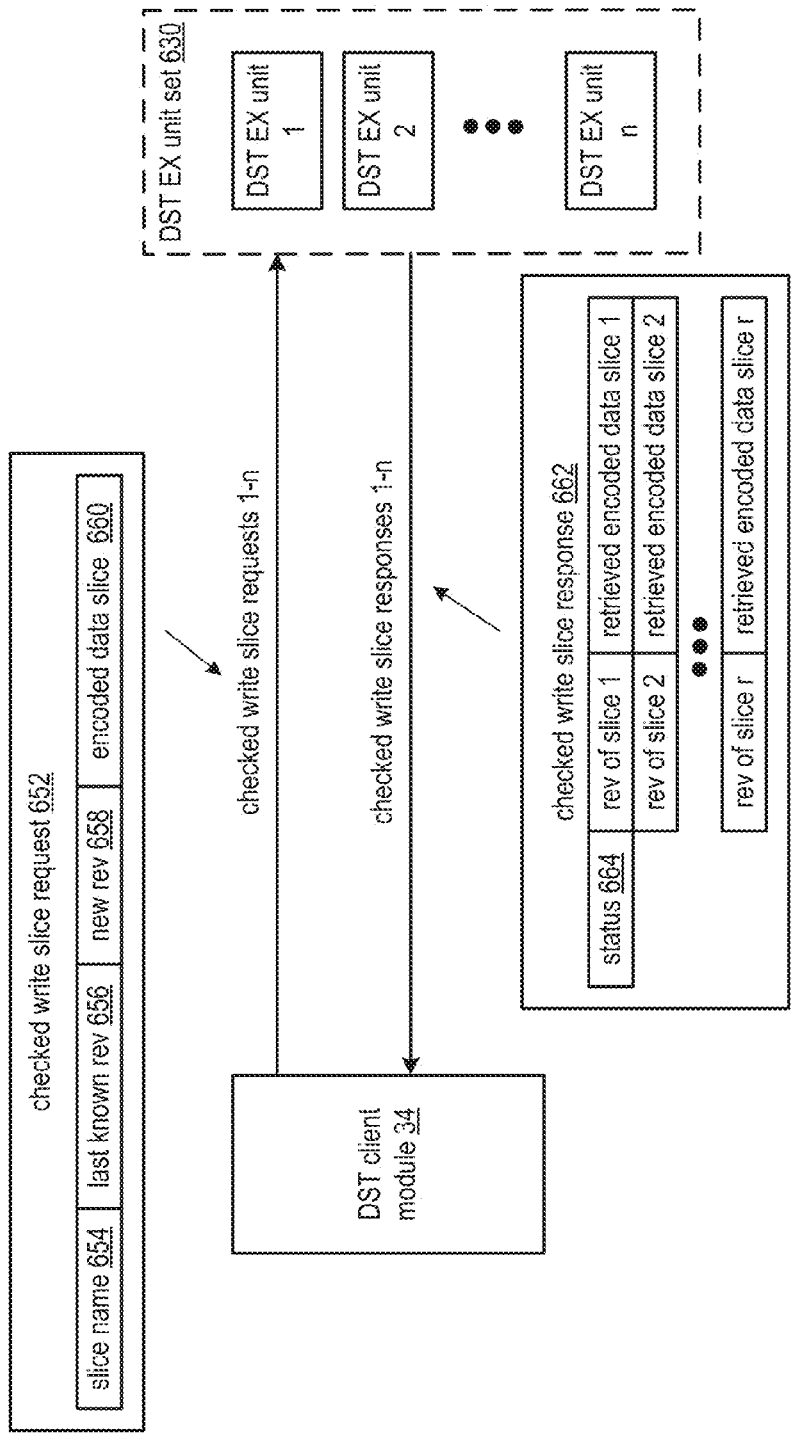
Figure 48B:
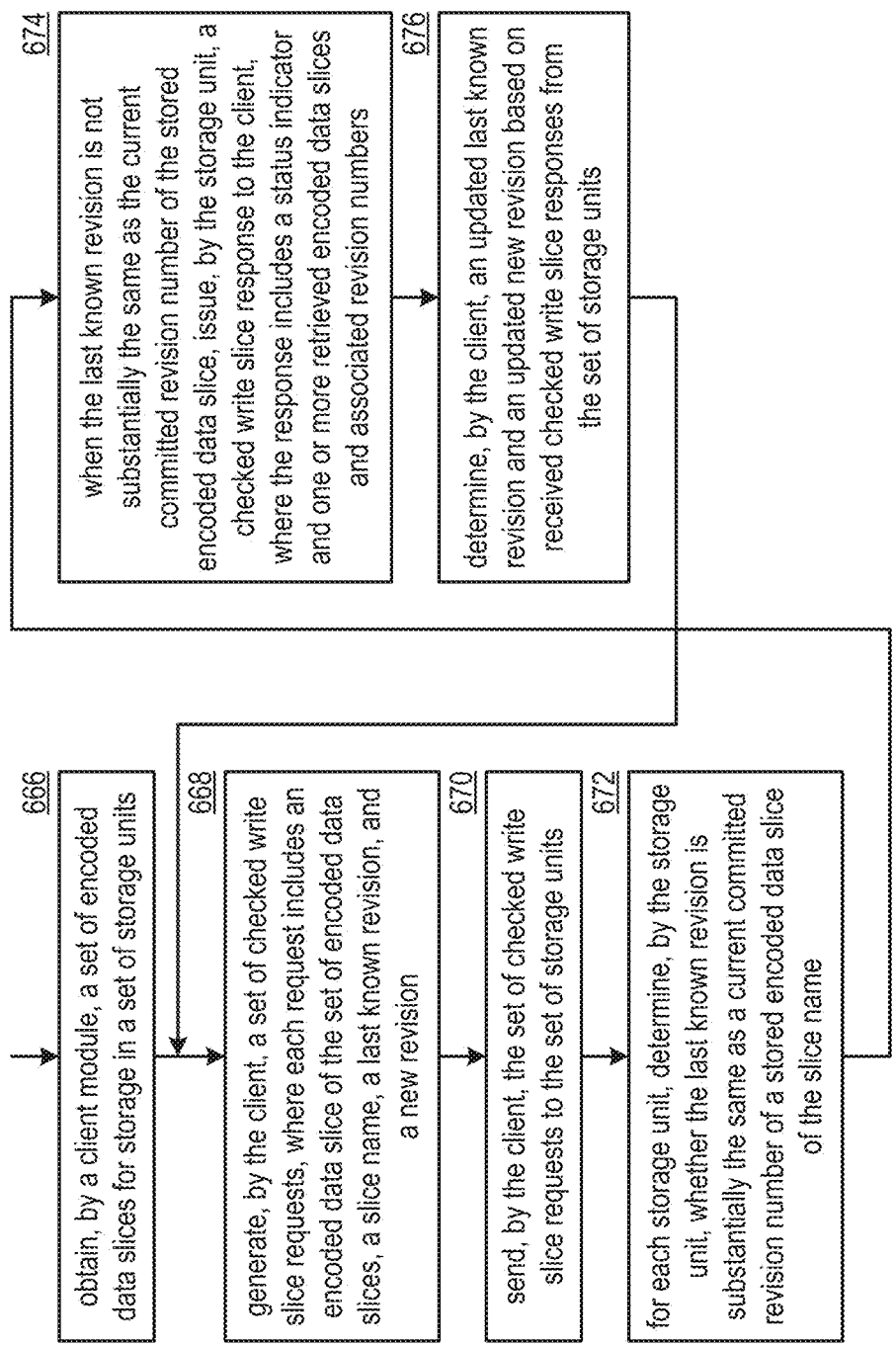

FIGS. 45A-C are schematic block diagrams of another dispersed storage network (DSN) in accordance with the present invention;

FIG. 45D is a flowchart illustrating an example of accessing data in accordance with the present invention;

FIG. 46A is a schematic block diagram of another dispersed storage network (DSN) in accordance with the present invention;

FIG. 46B is a flowchart illustrating an example of writing data in accordance with the present invention;

FIG. 46C is a schematic block diagram of another dispersed storage network (DSN) in accordance with the present invention;

FIG. 46D is a flowchart illustrating an example of rebuilding data in accordance with the present invention;

FIG. 47A is a schematic block diagram of another dispersed storage network (DSN) in accordance with the present invention;

FIG. 47B is a flowchart illustrating another example of rebuilding data in accordance with the present invention;

FIG. 48A is a schematic block diagram of another dispersed storage network (DSN) in accordance with the present invention; and FIG. 48B is a flowchart illustrating another example of writing data in accordance with the present invention.

DETAILED DESCRIPTION OF THE INVENTION

Figure 1:
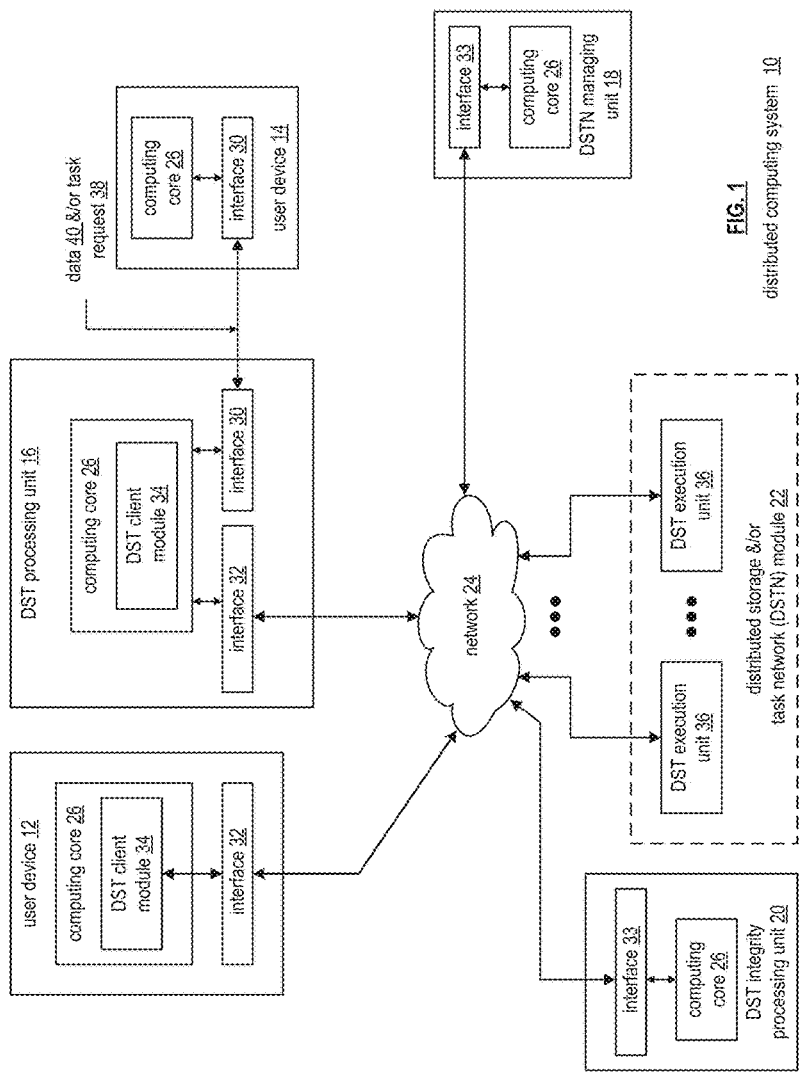
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
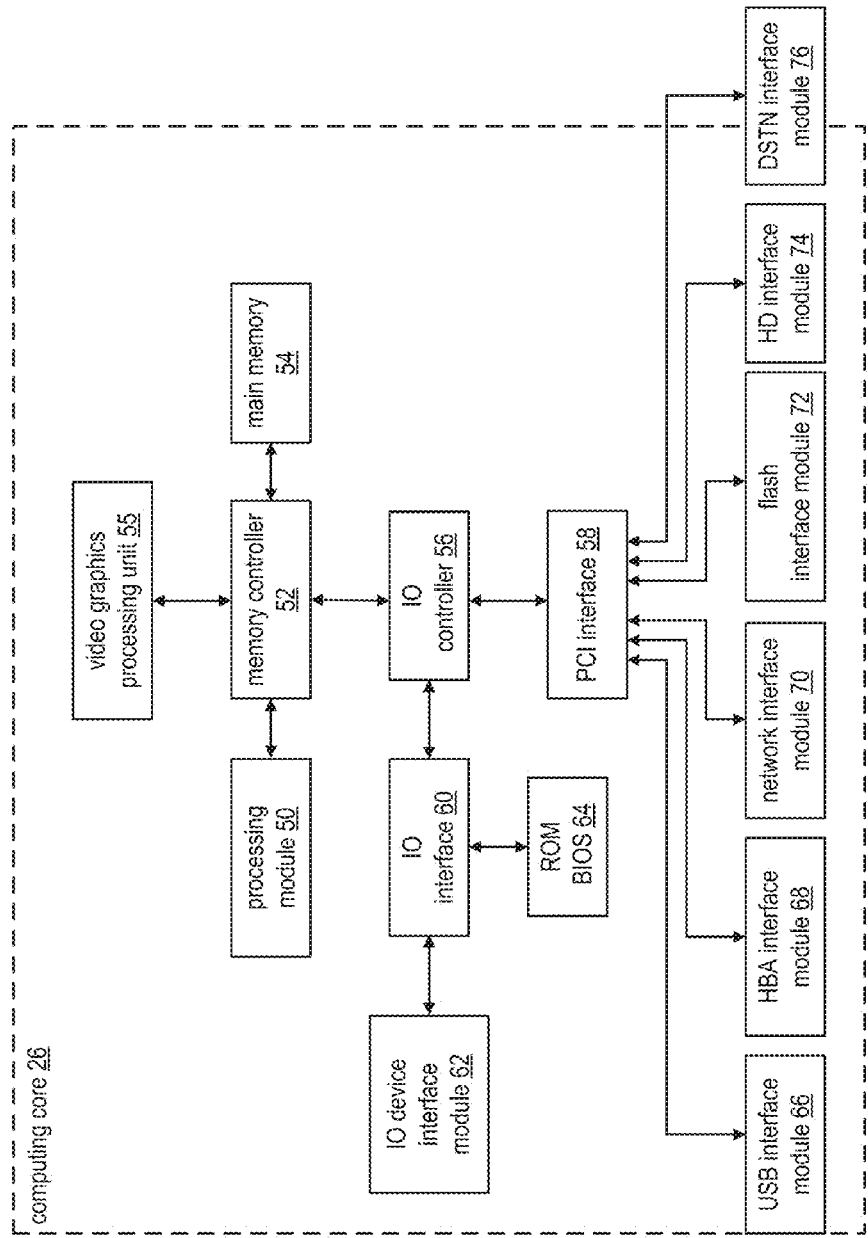
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
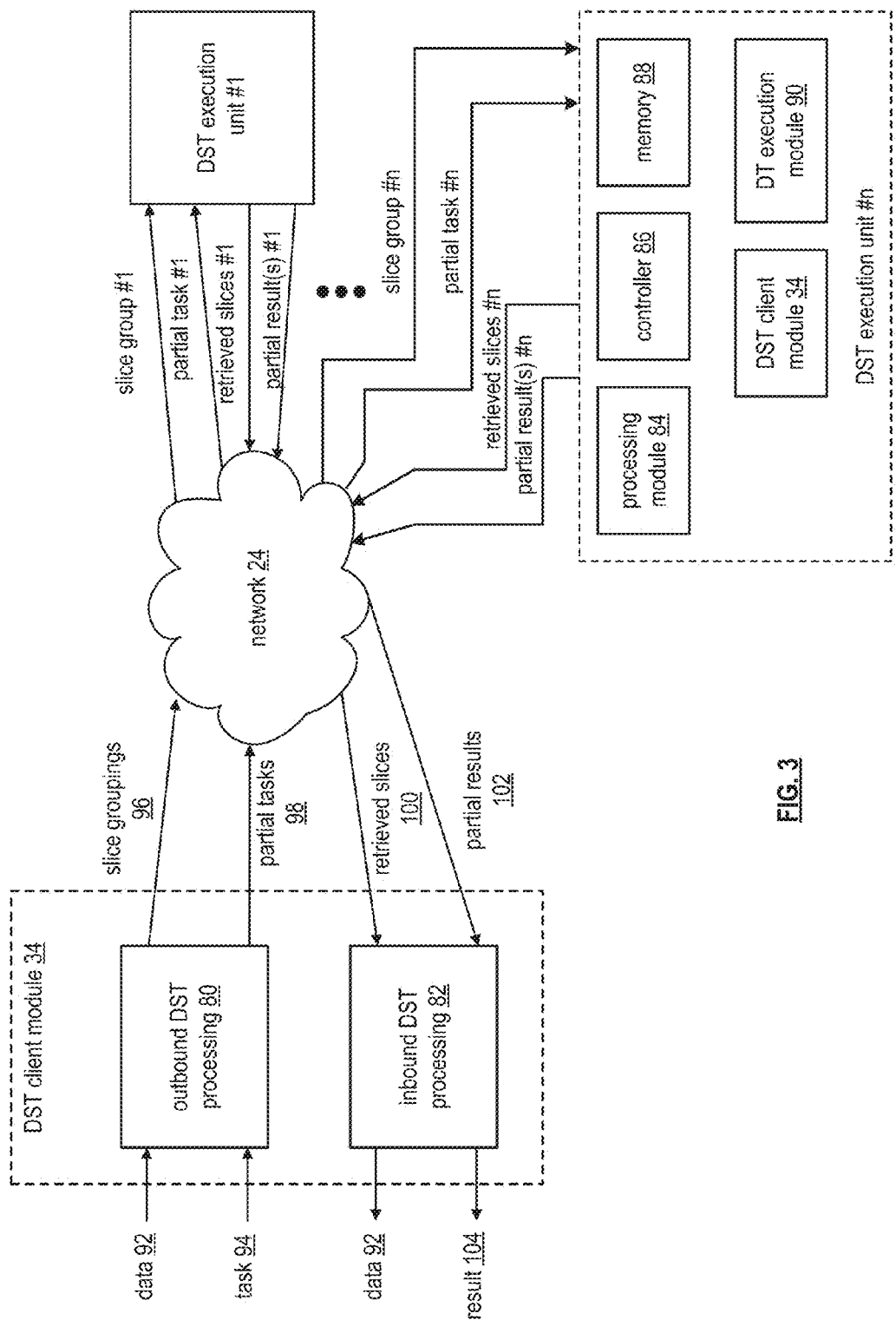
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
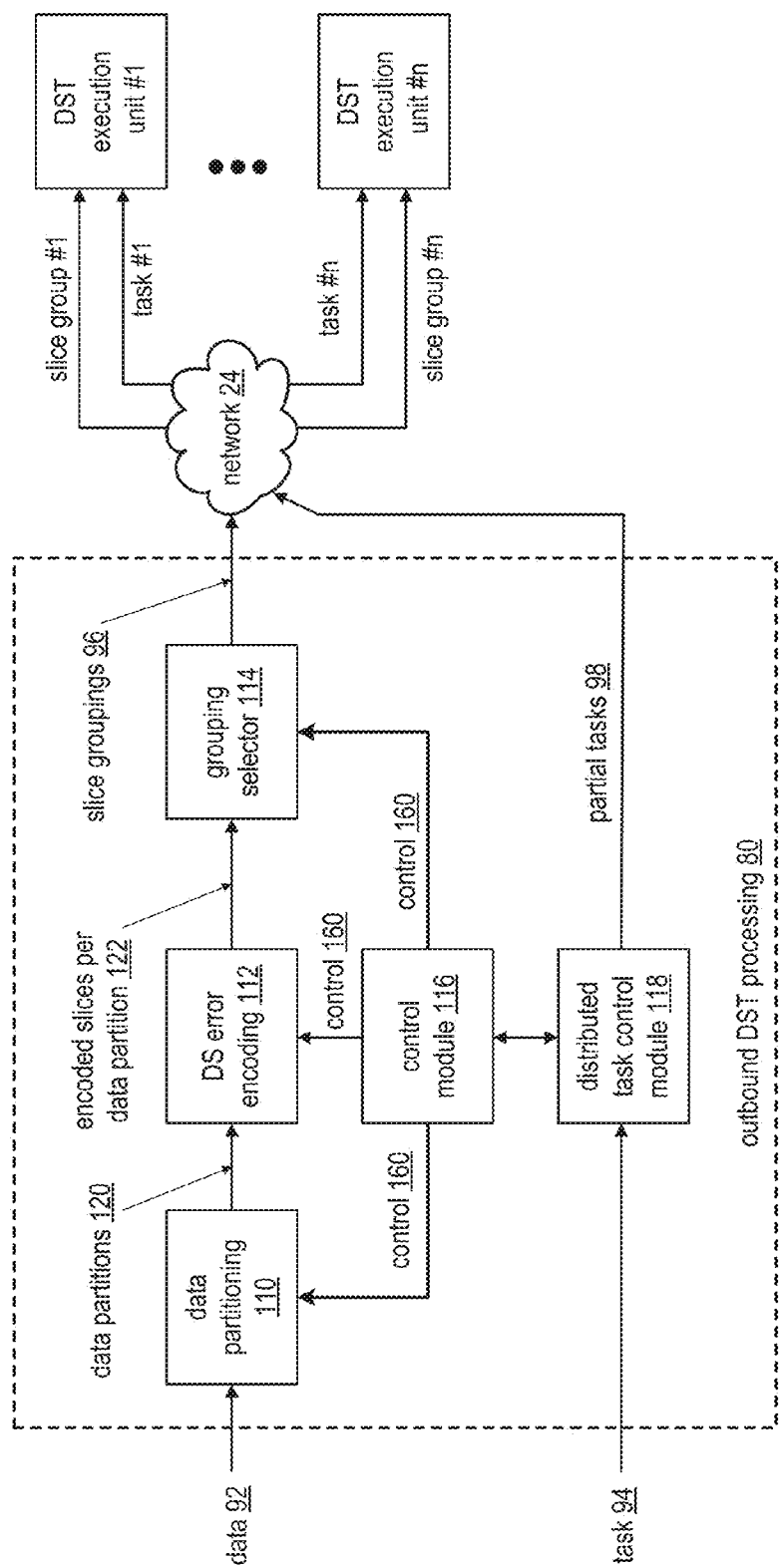
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
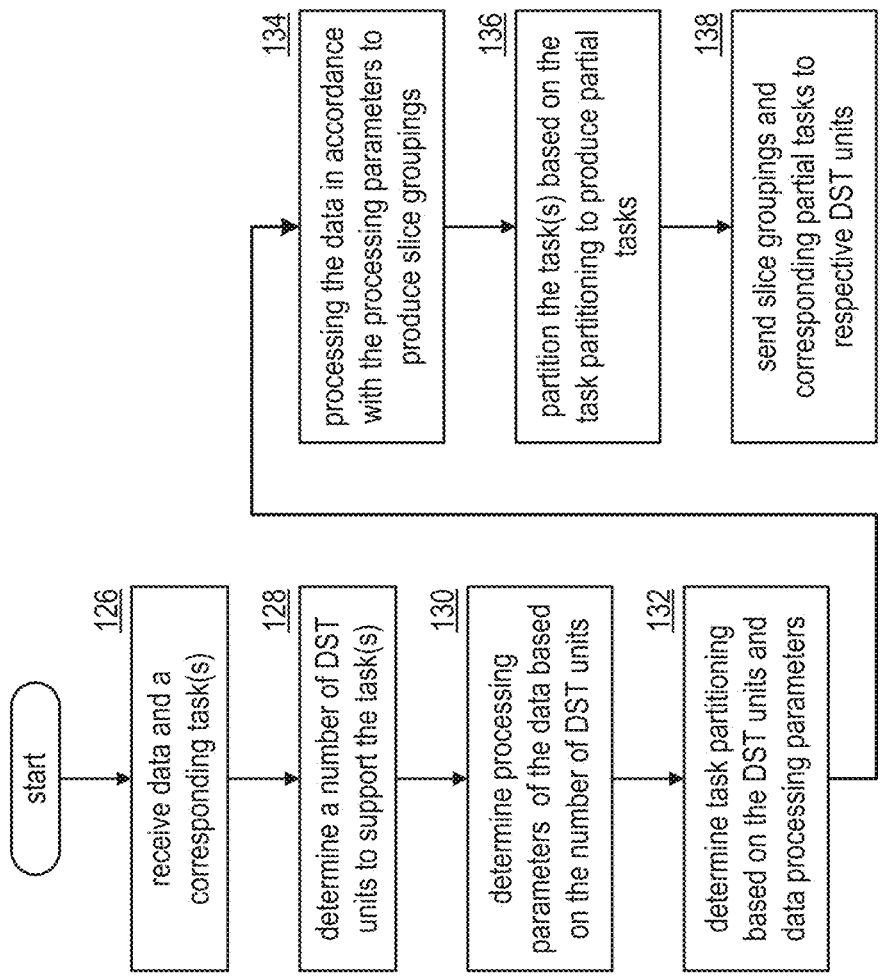
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
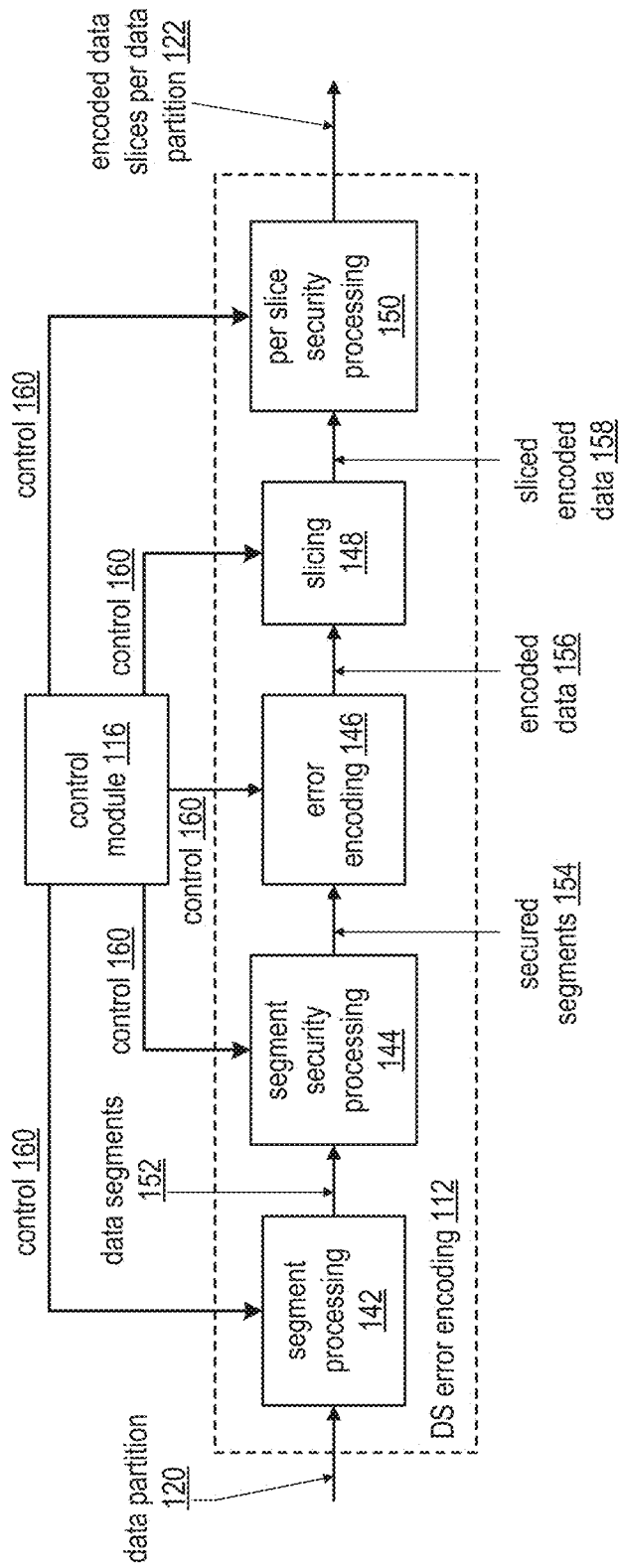
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
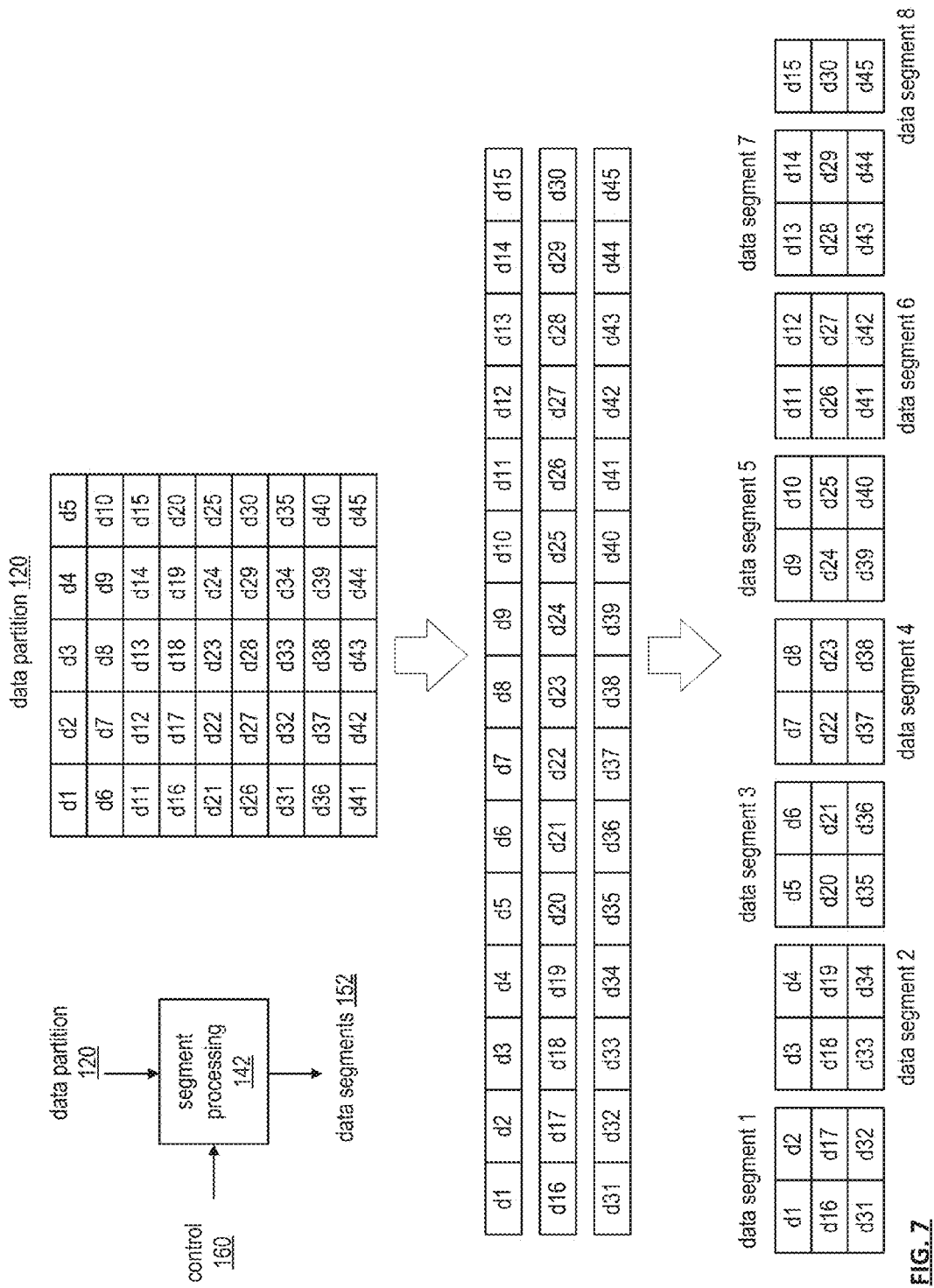
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
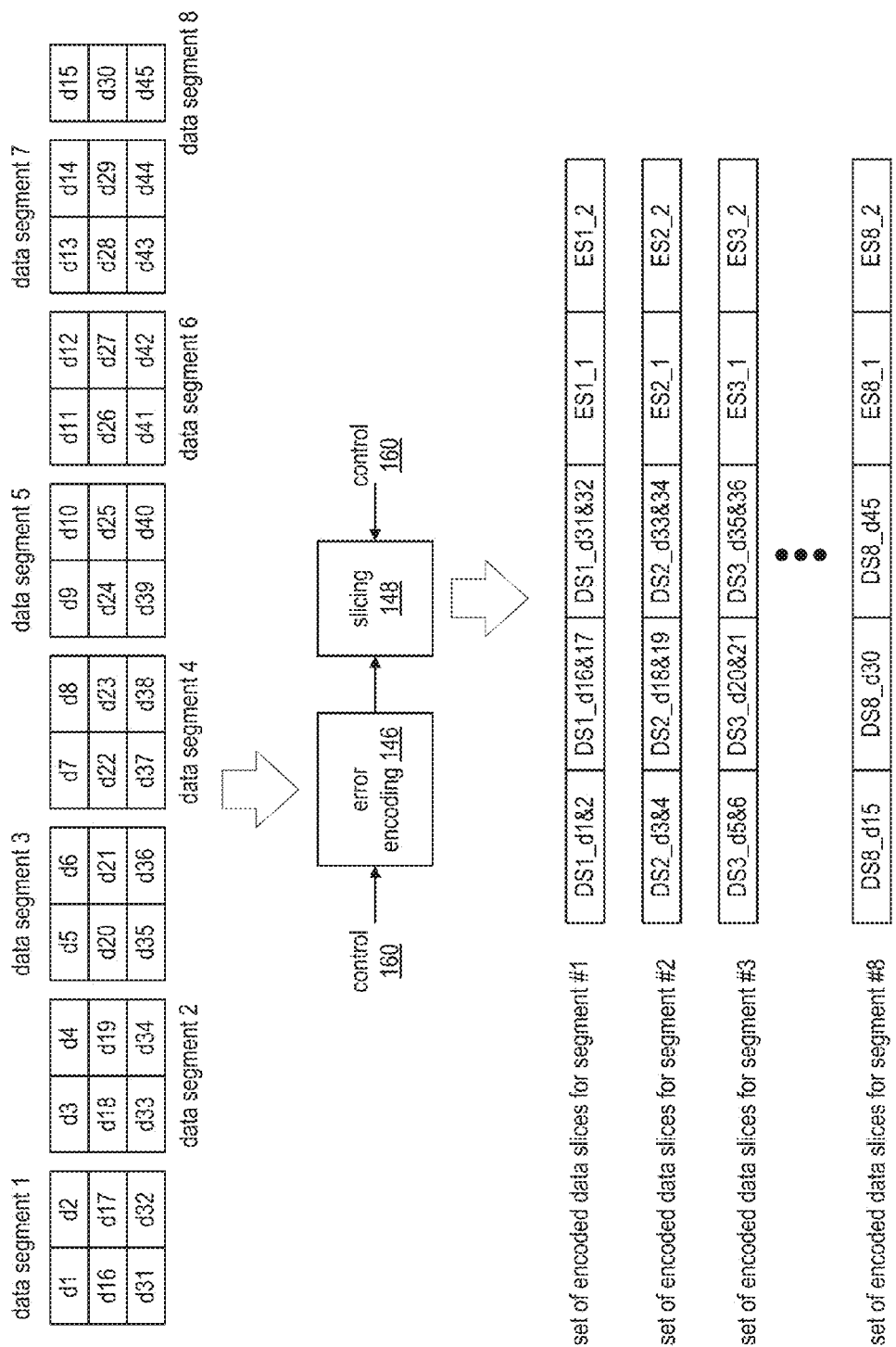
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
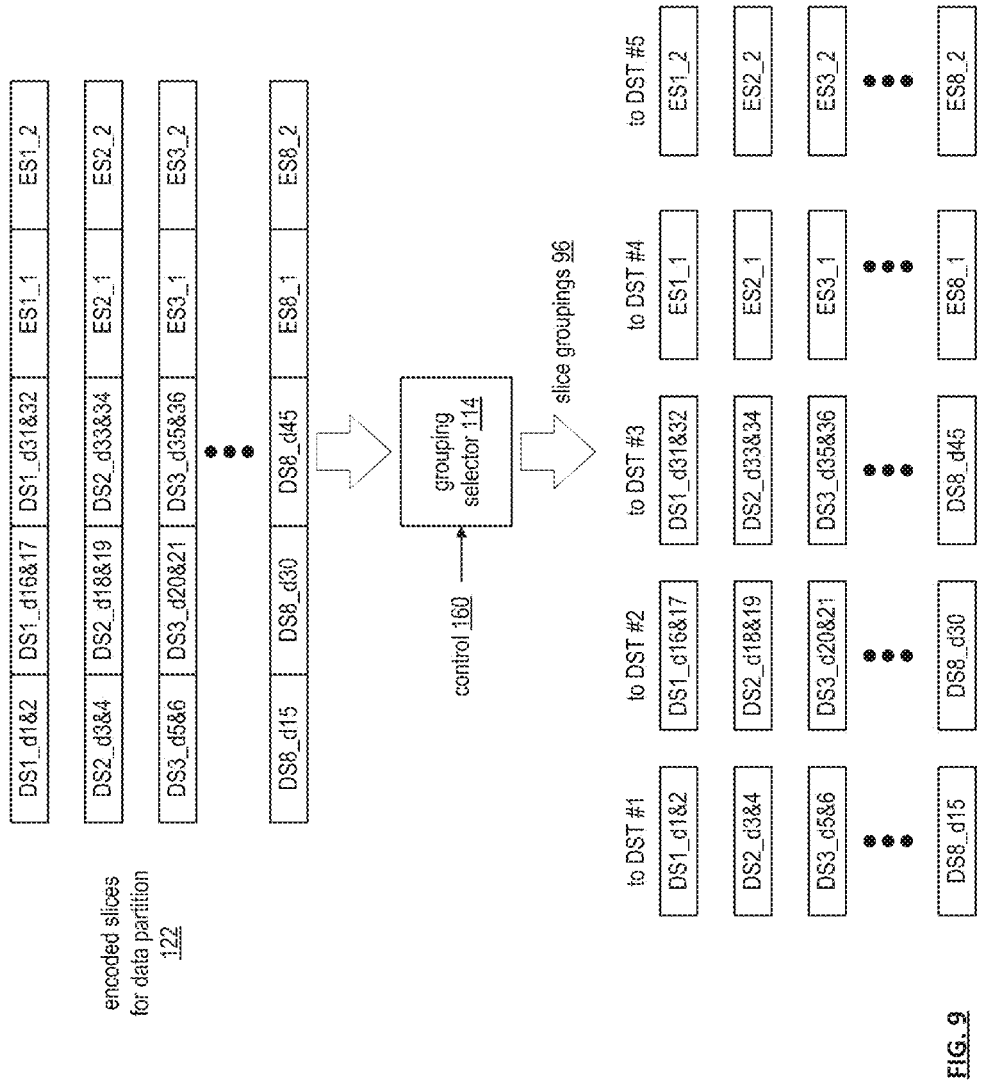
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
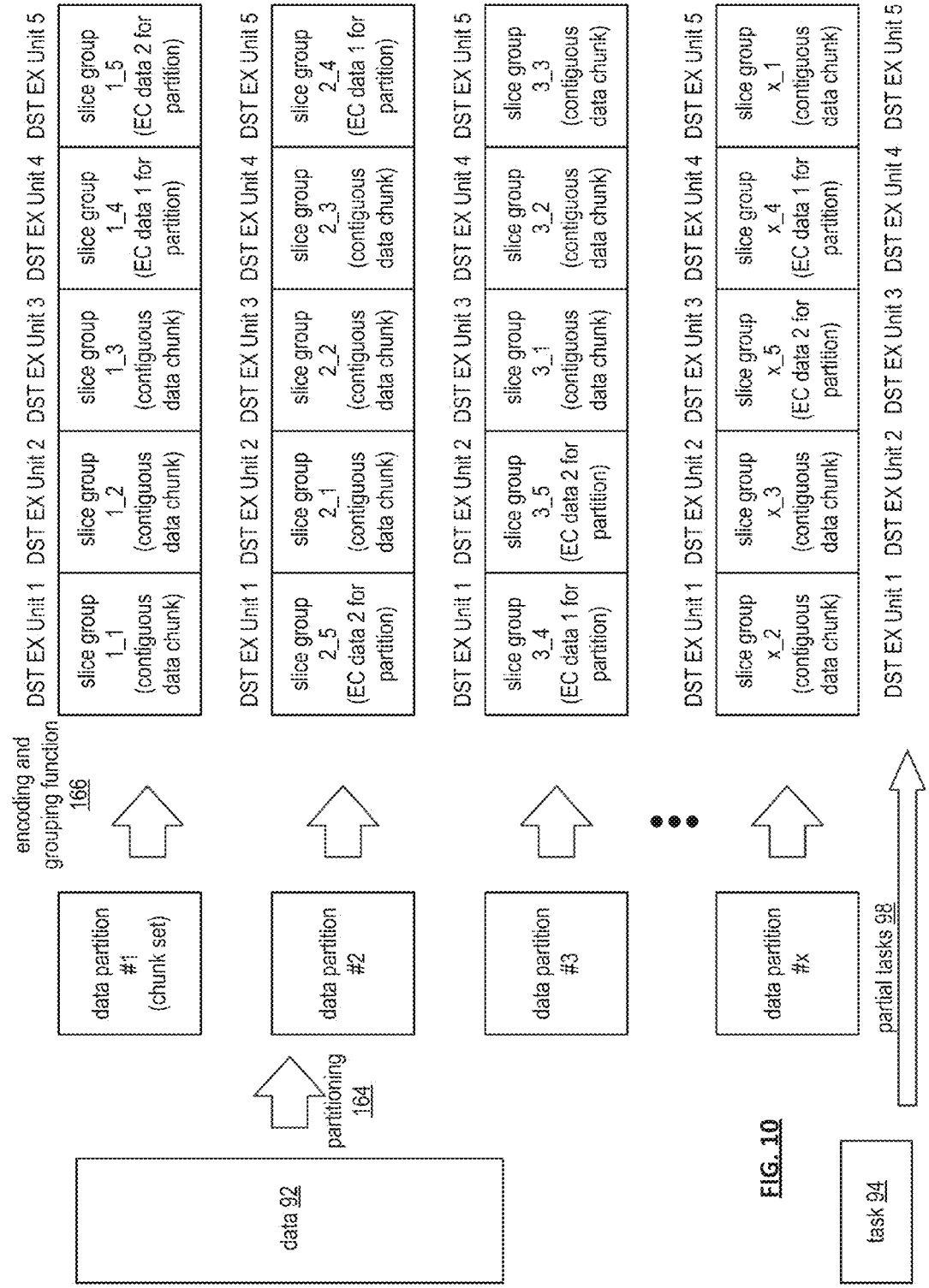
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task 94 is divided into partial tasks 98 that are sent to the DST execution units in conjunction with the slice groupings of the data partitions.

Figure 11:
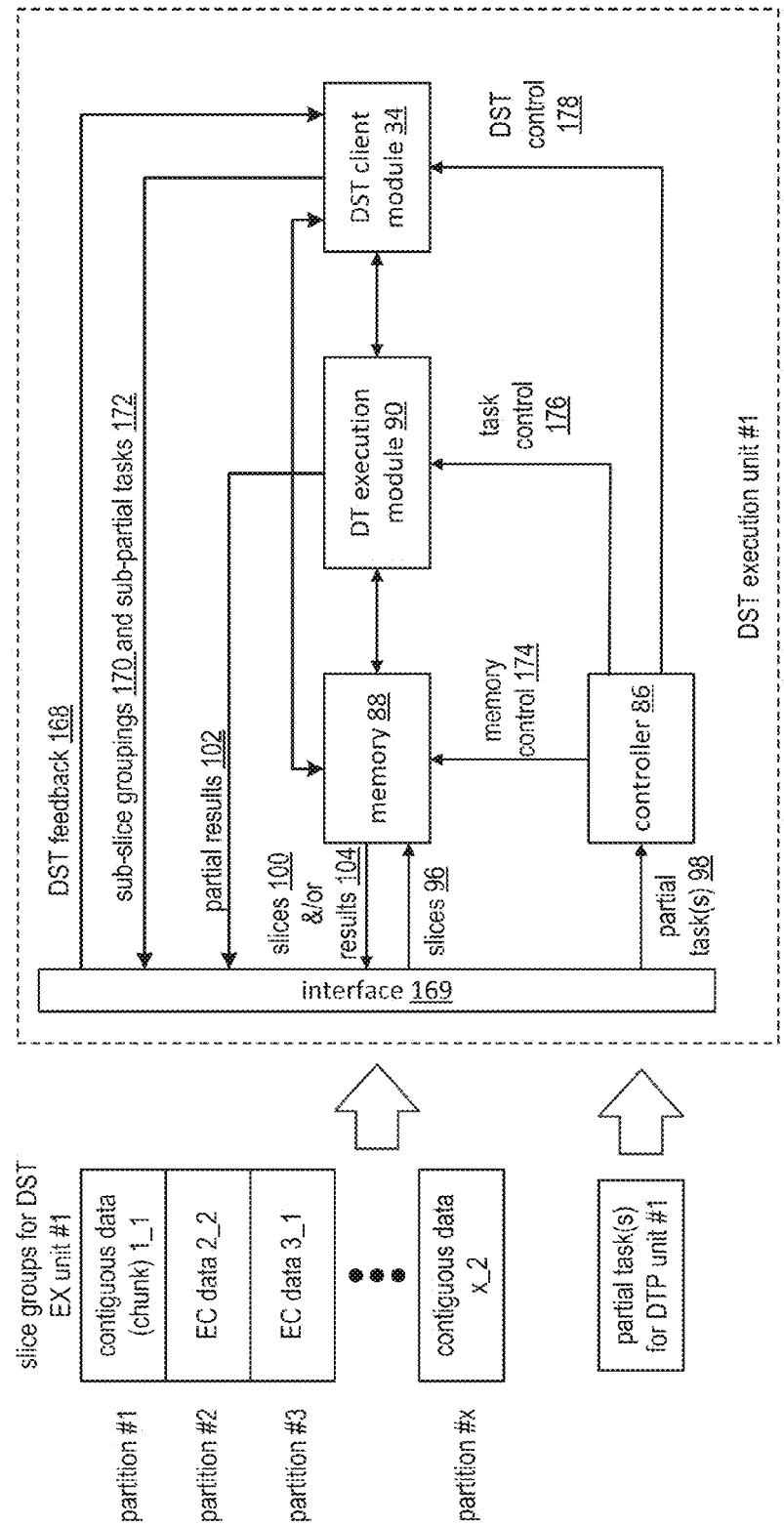
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
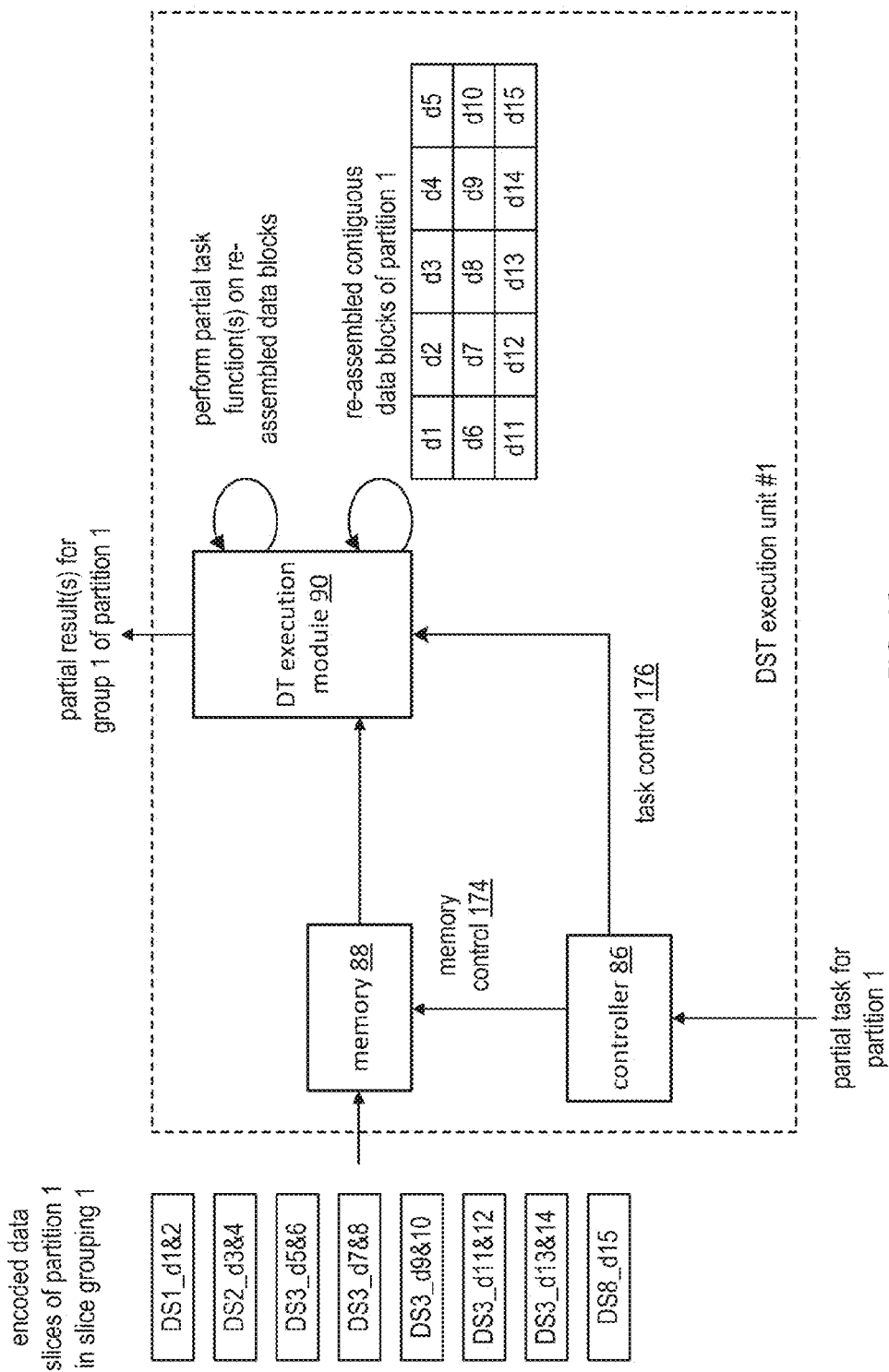
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
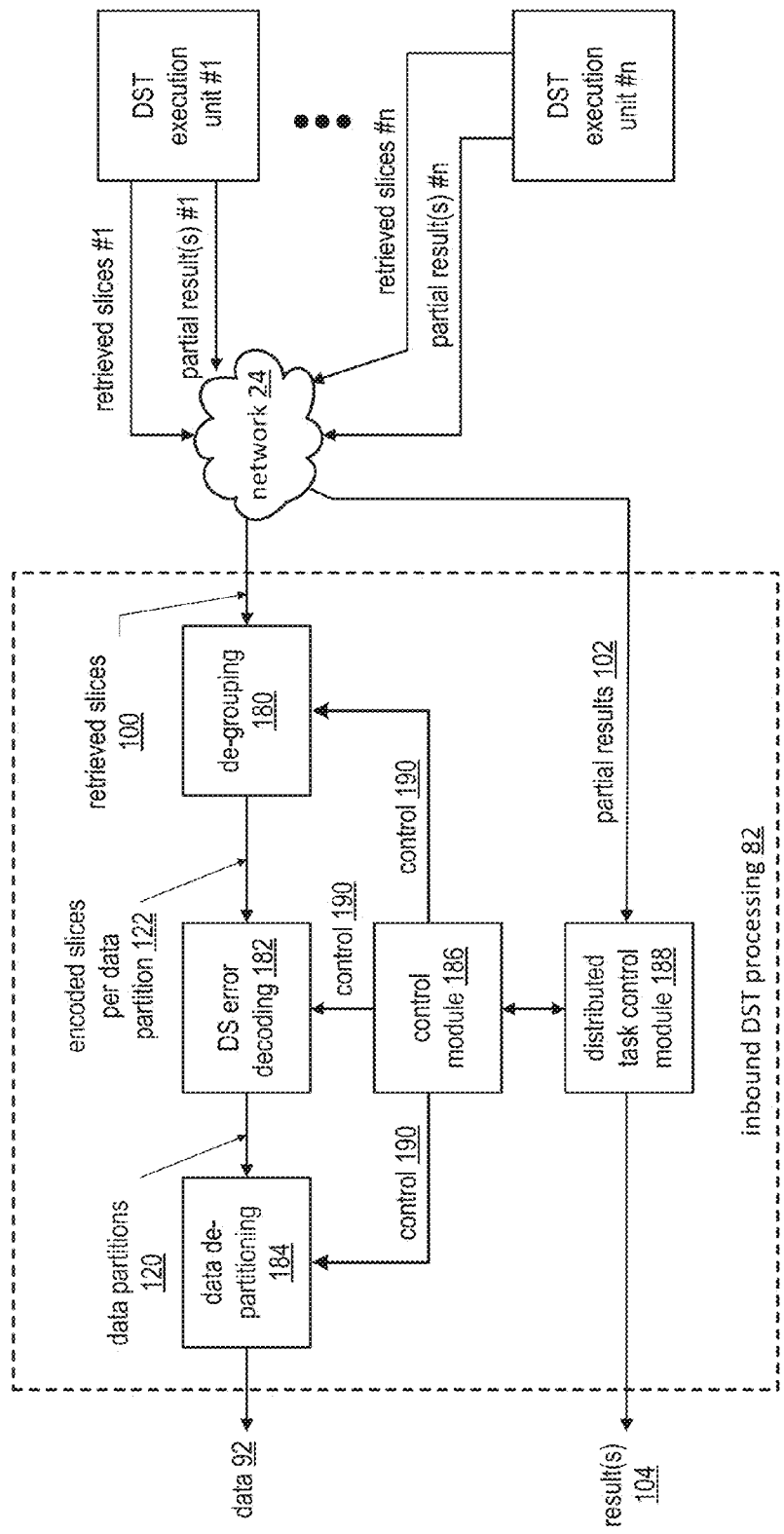
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
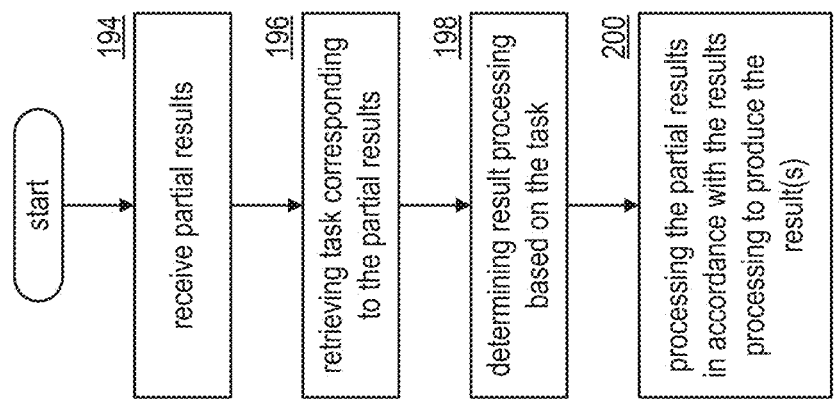
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
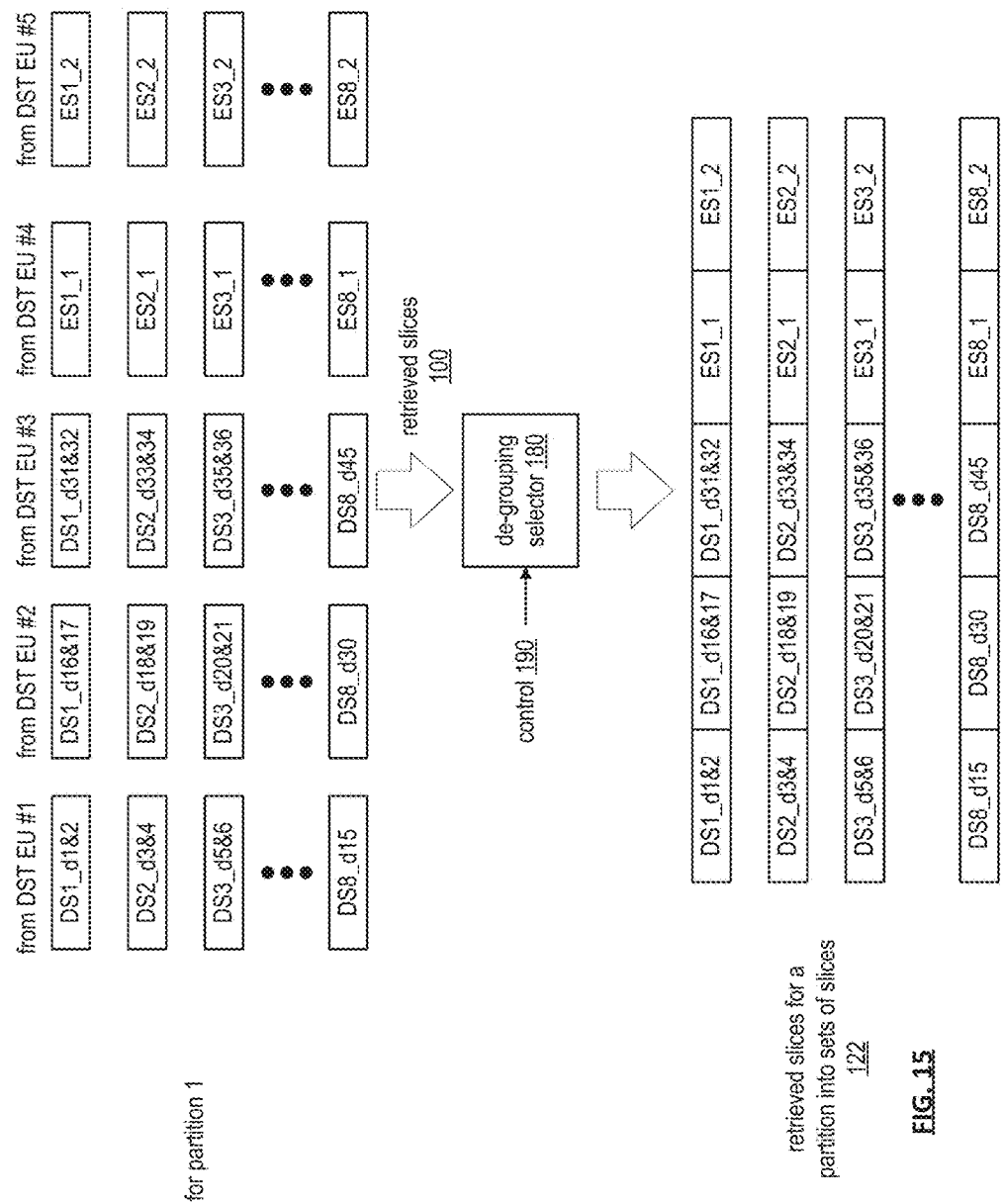
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
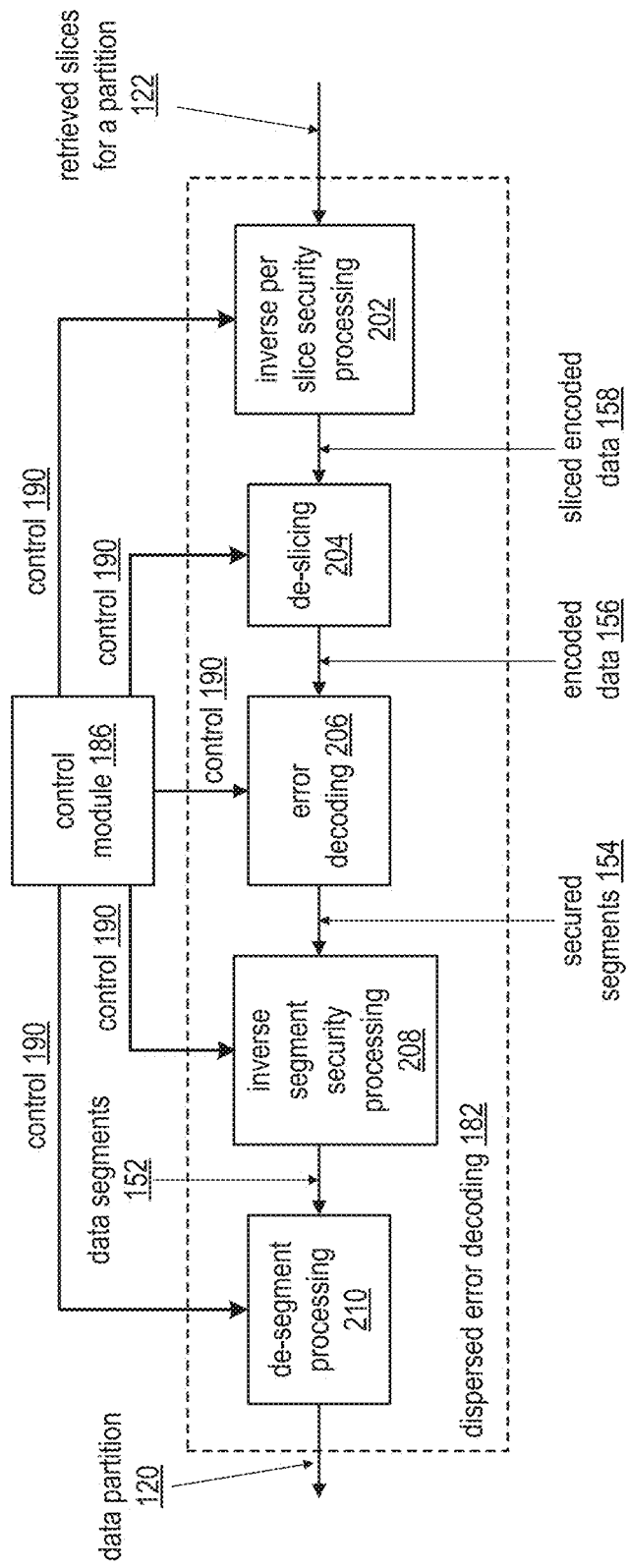
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
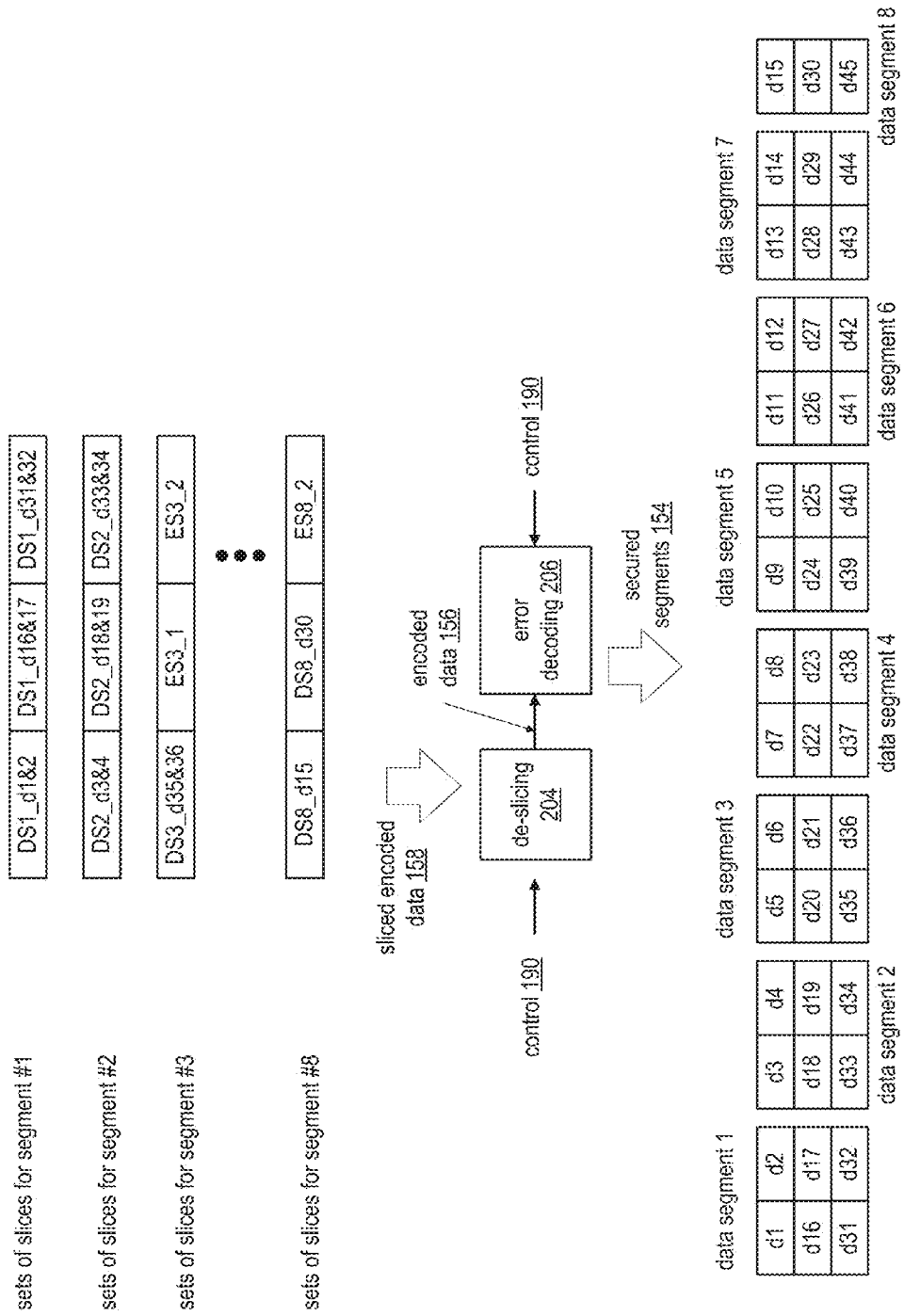
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
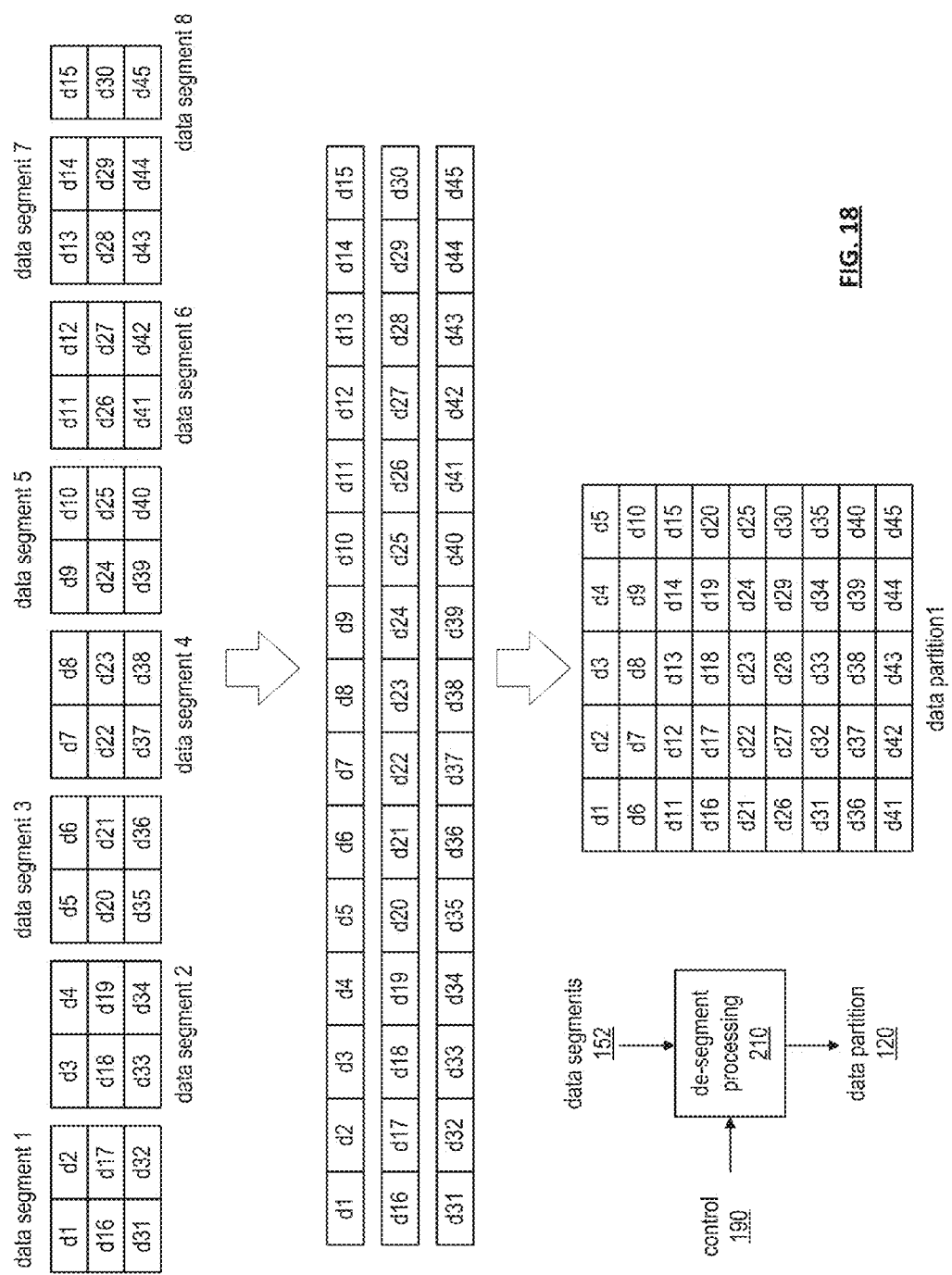
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
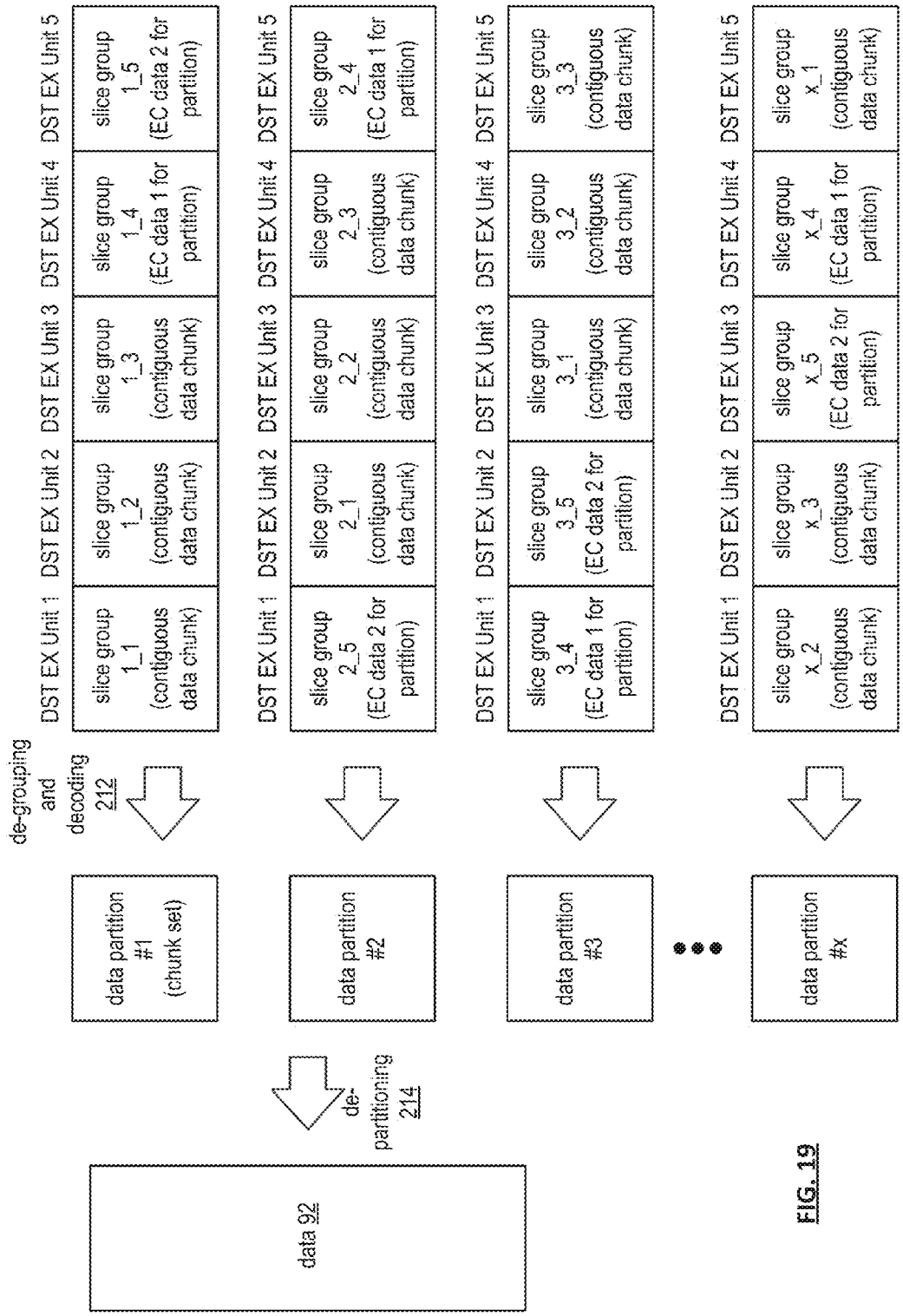
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
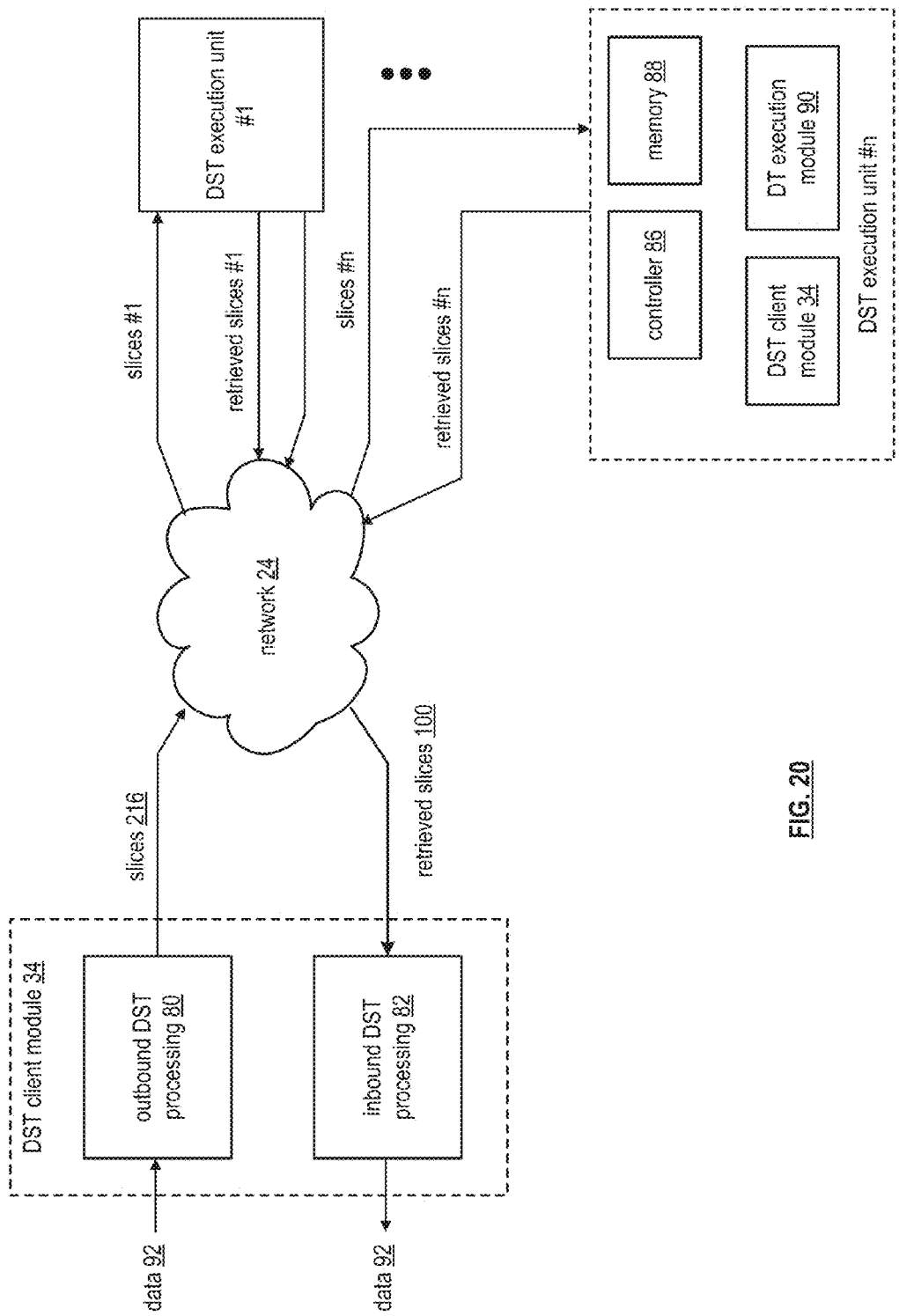
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
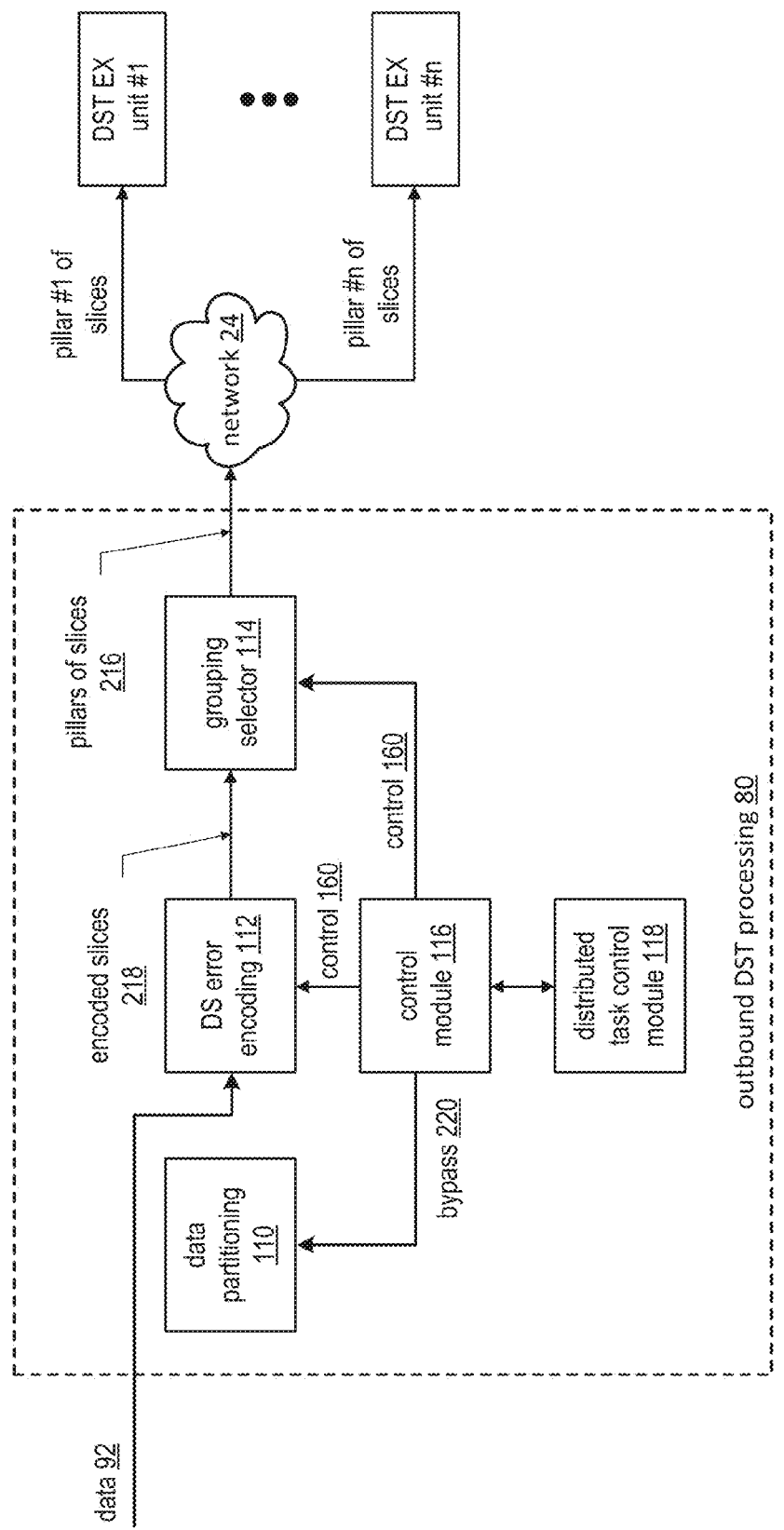
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
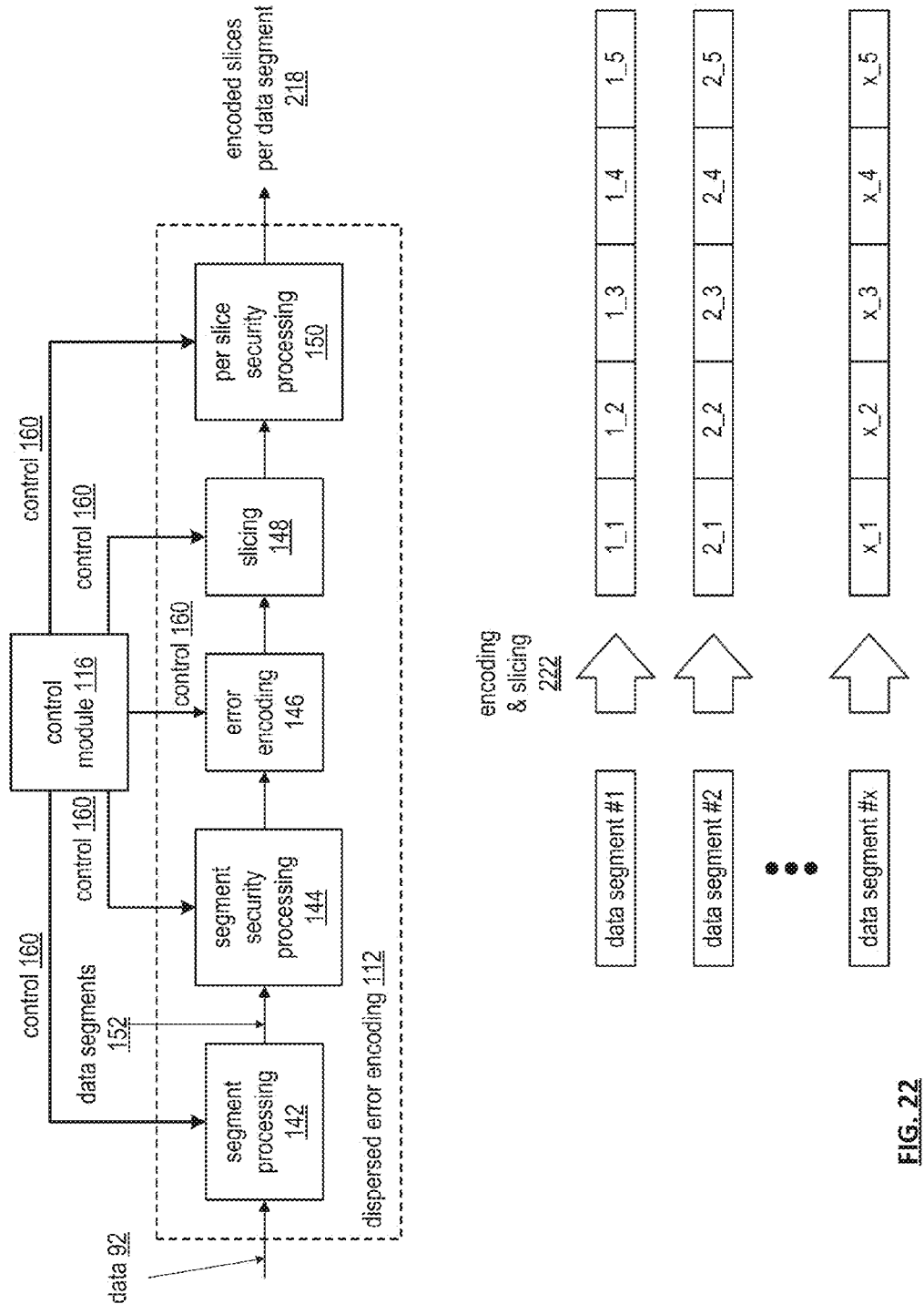
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
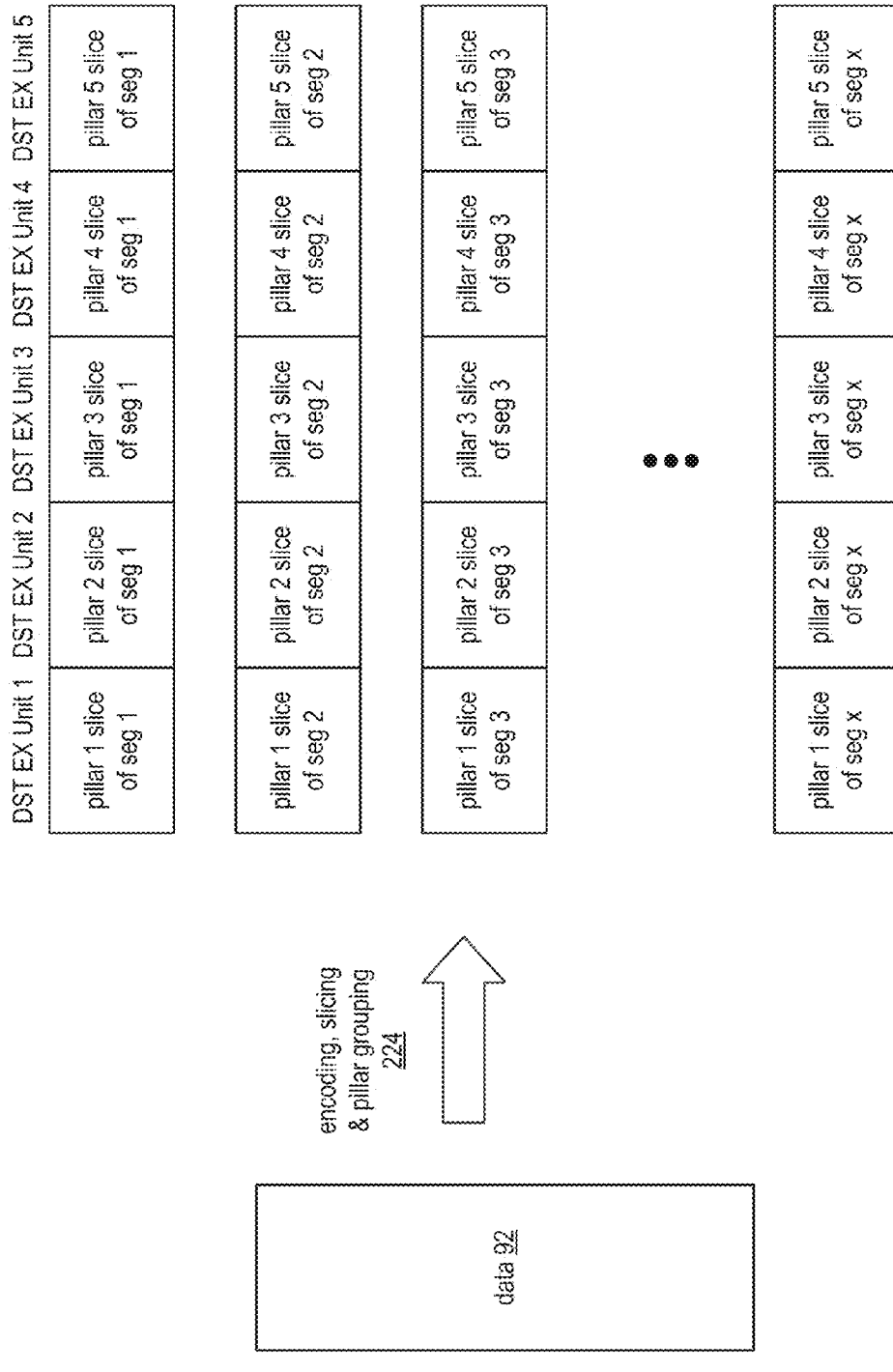
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
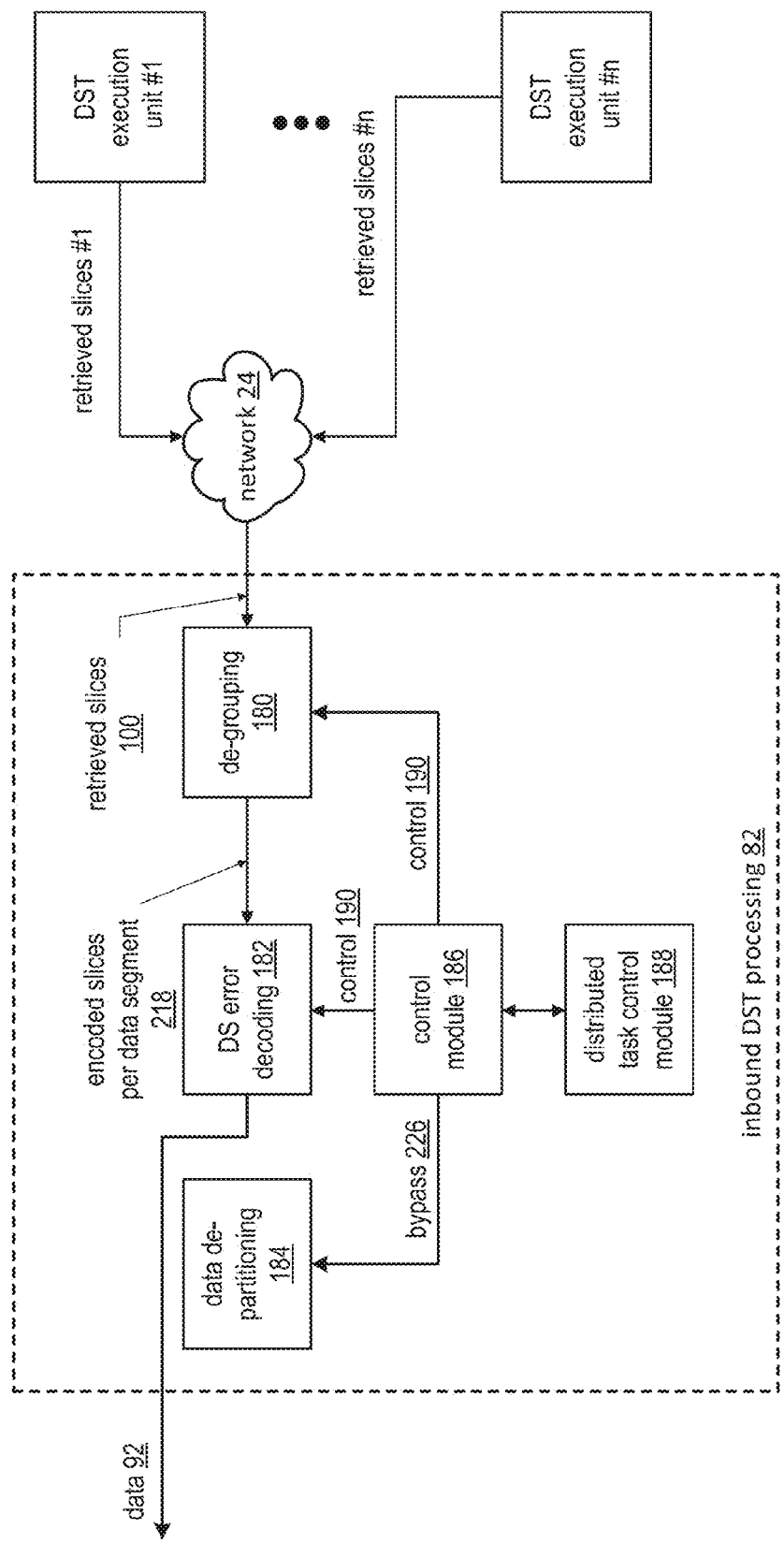
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
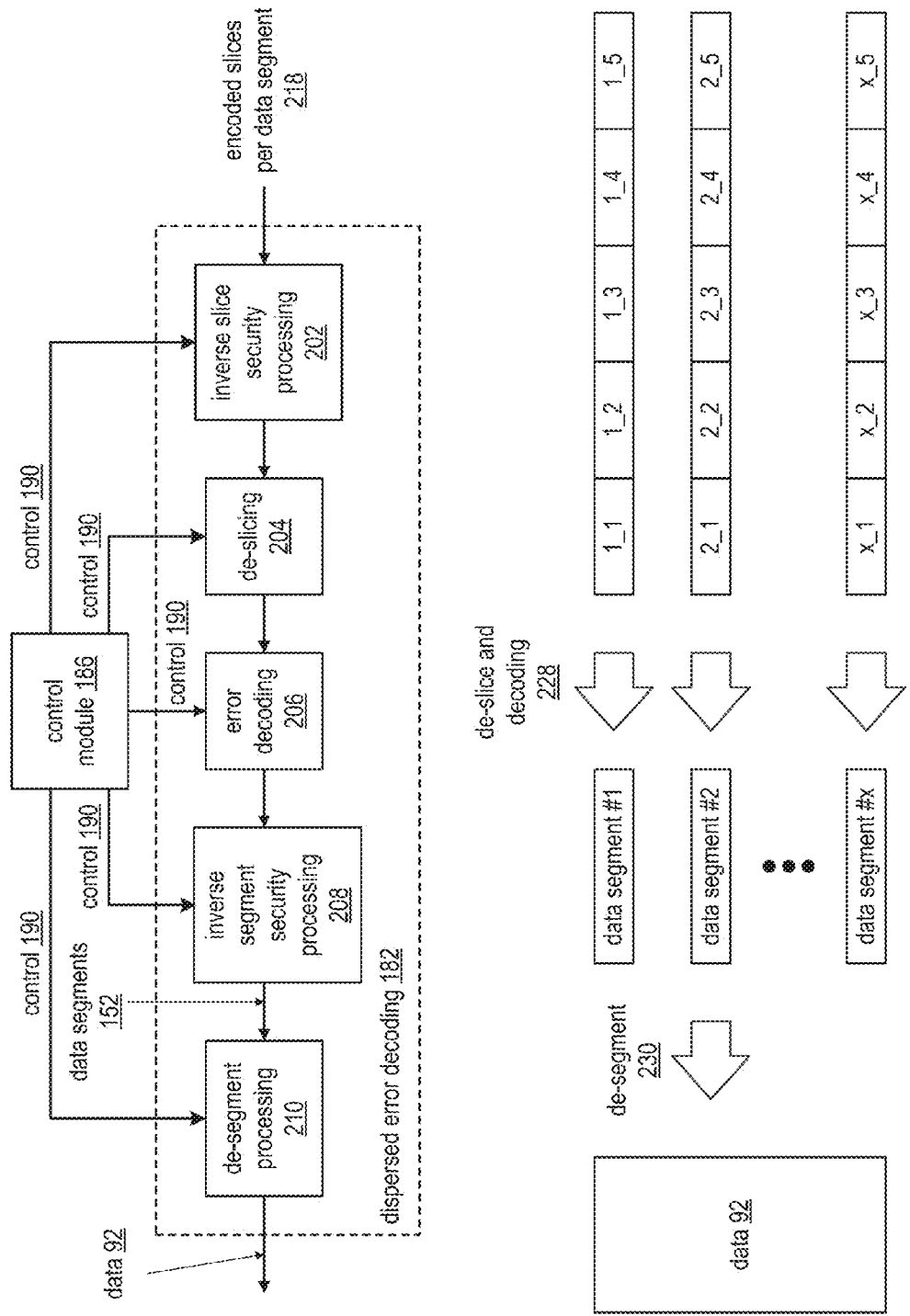
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
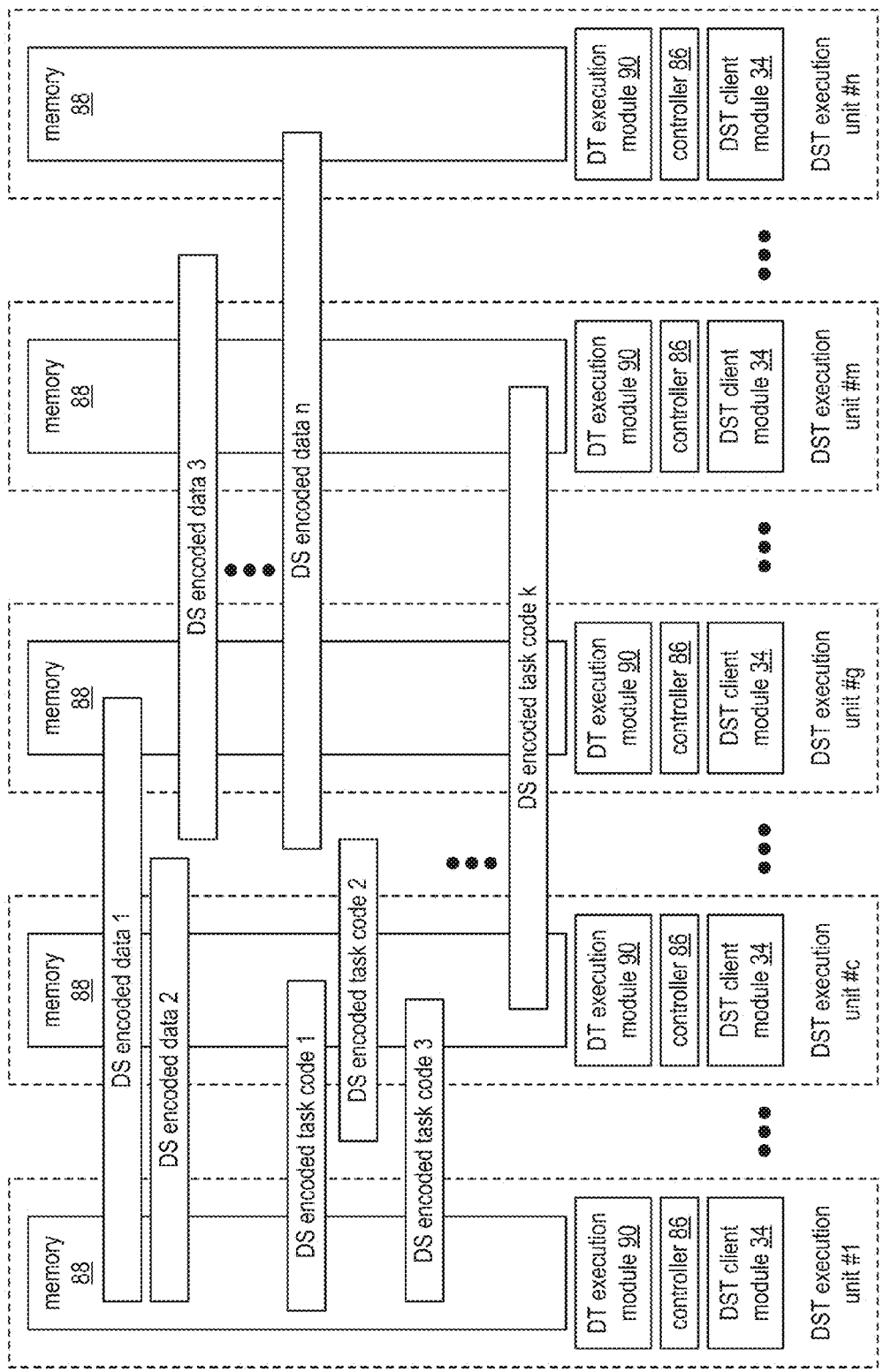
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
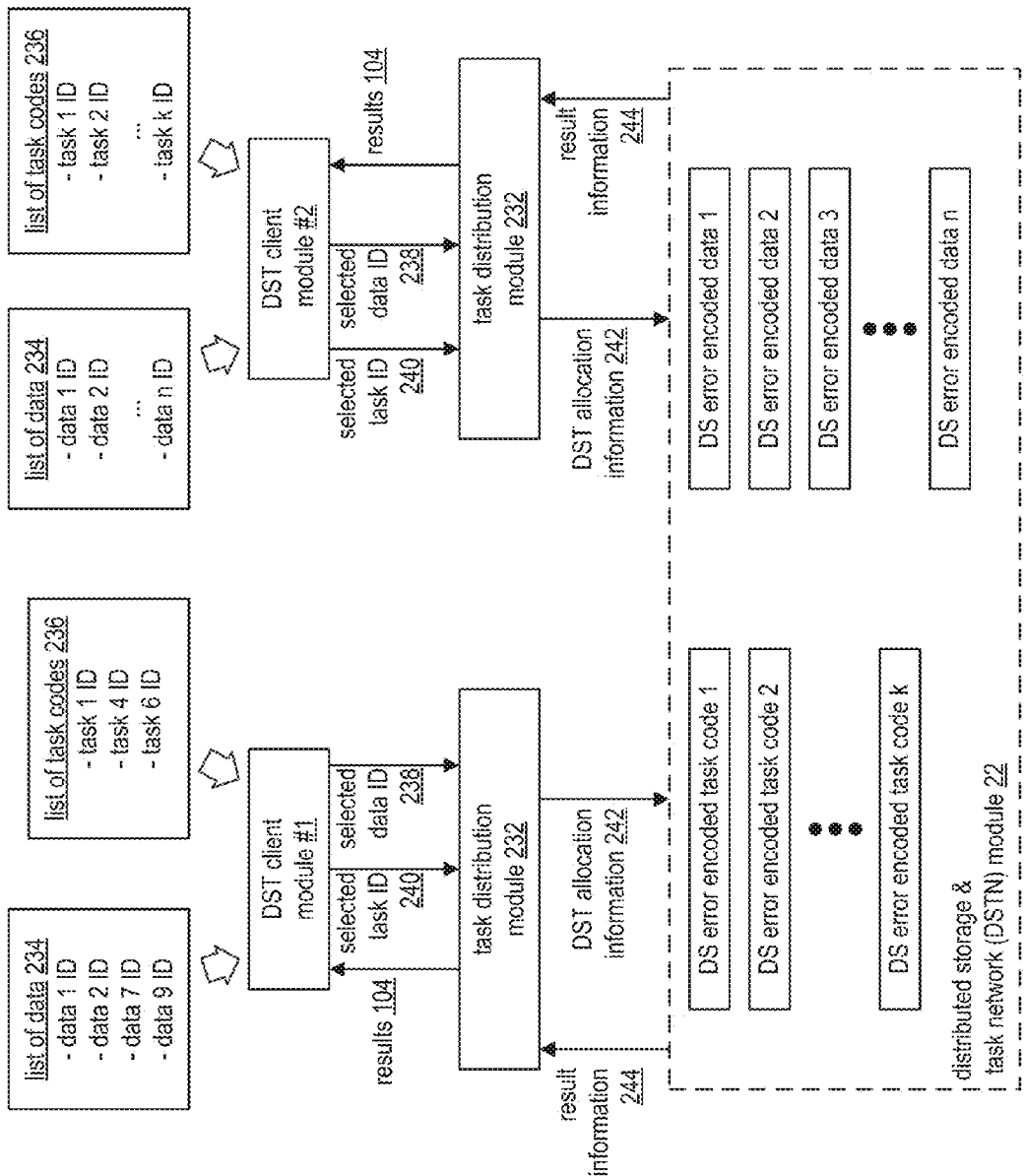
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
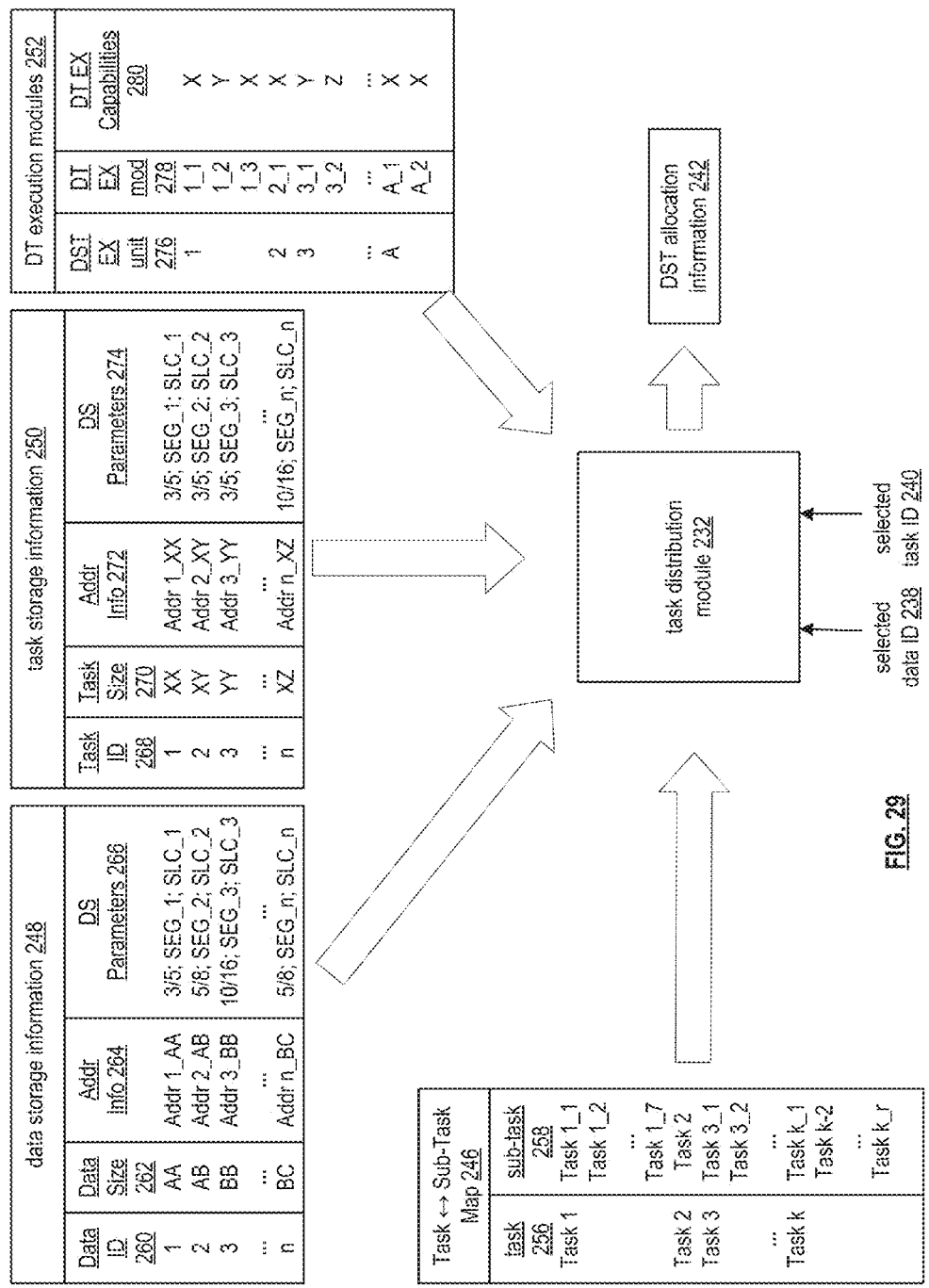
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
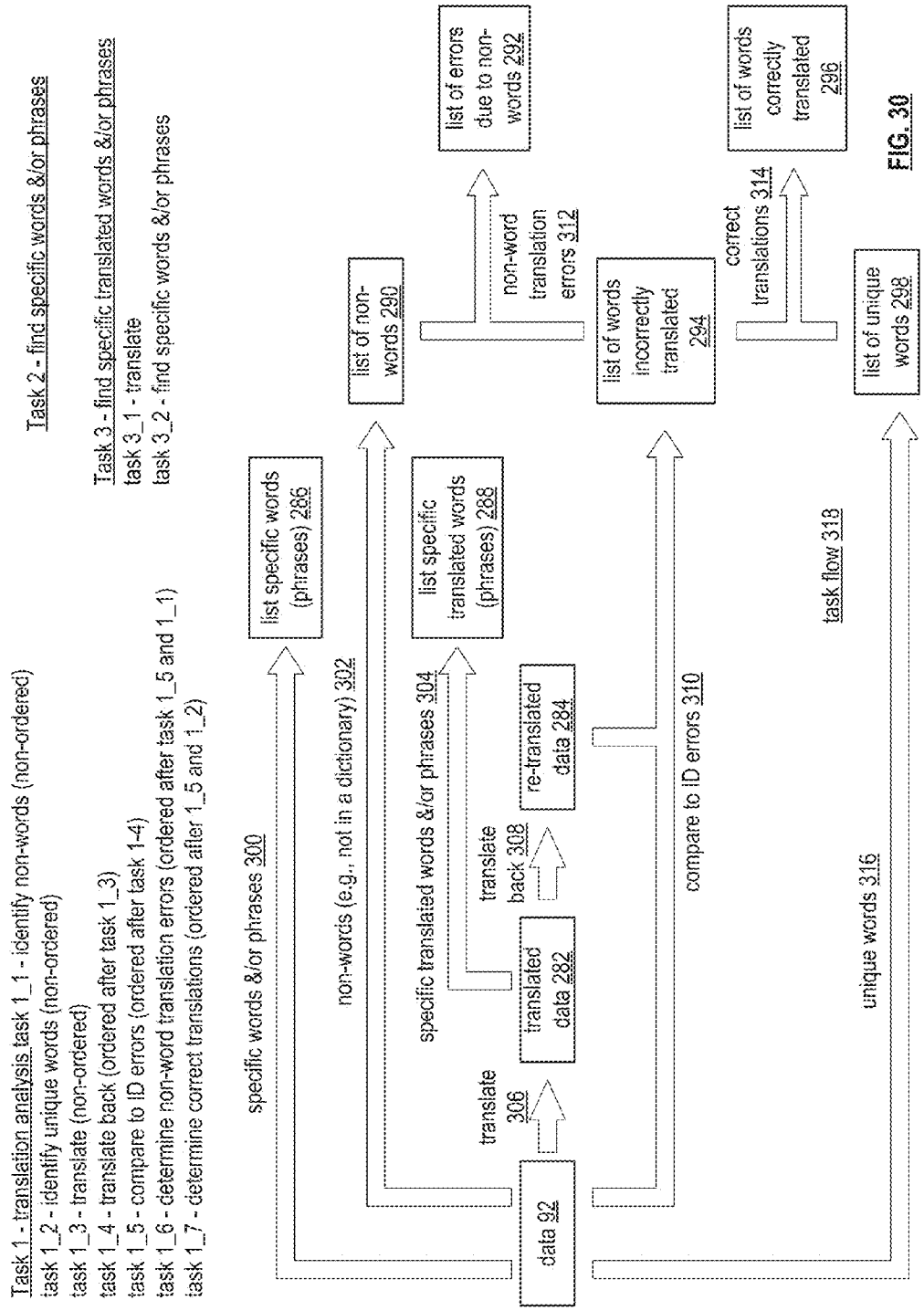
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1 -4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
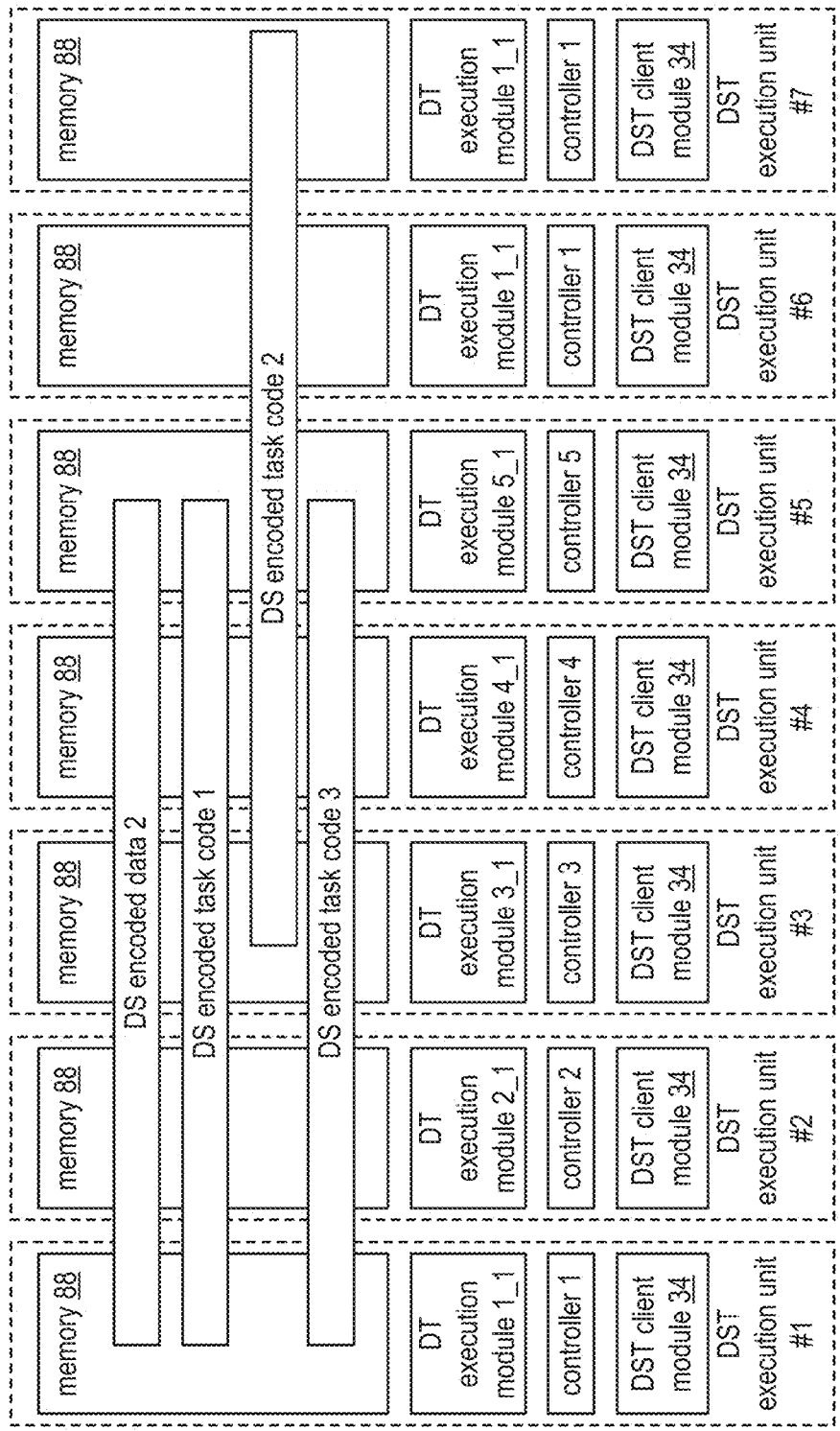
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1 -5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
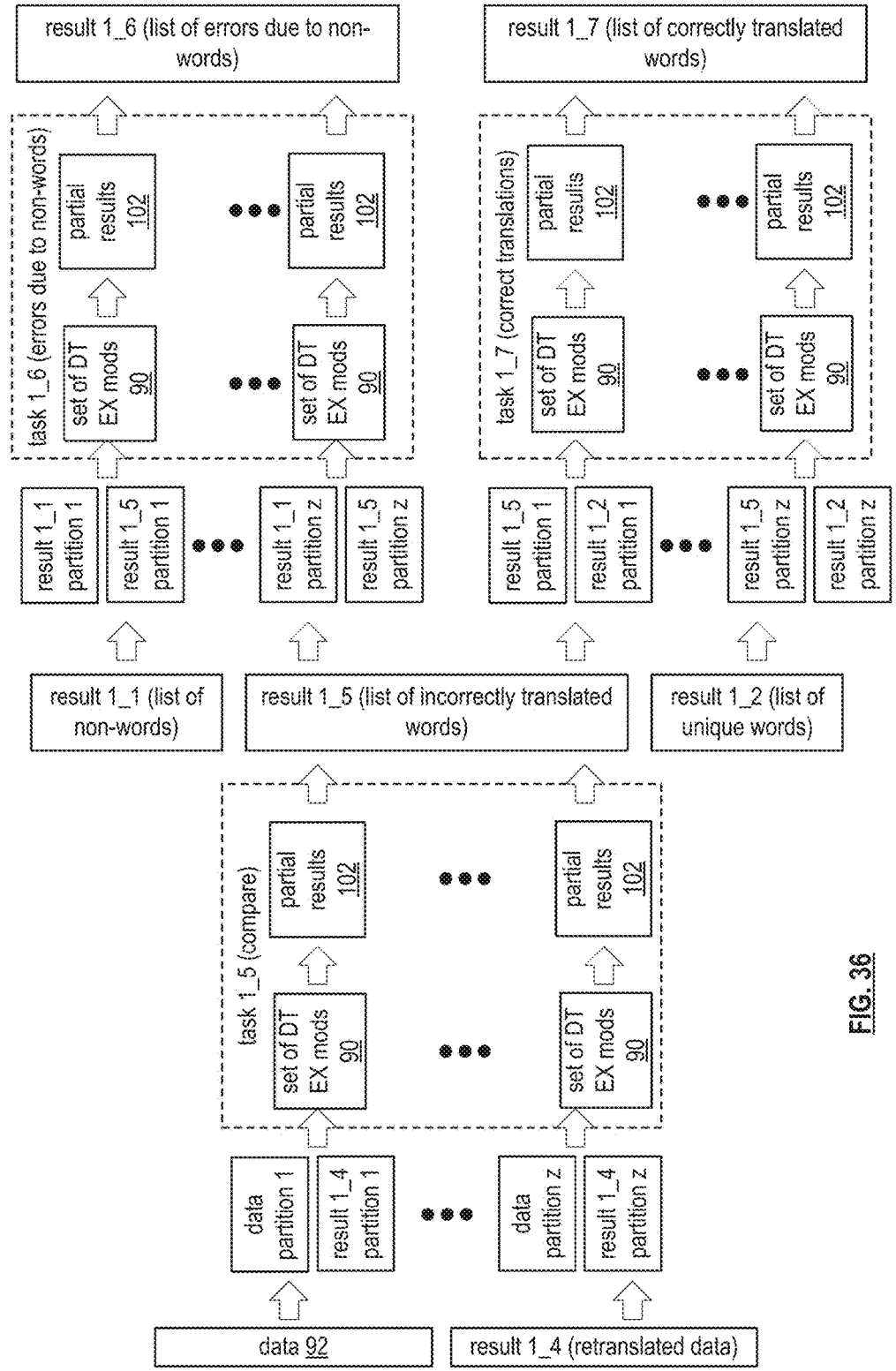

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit b 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
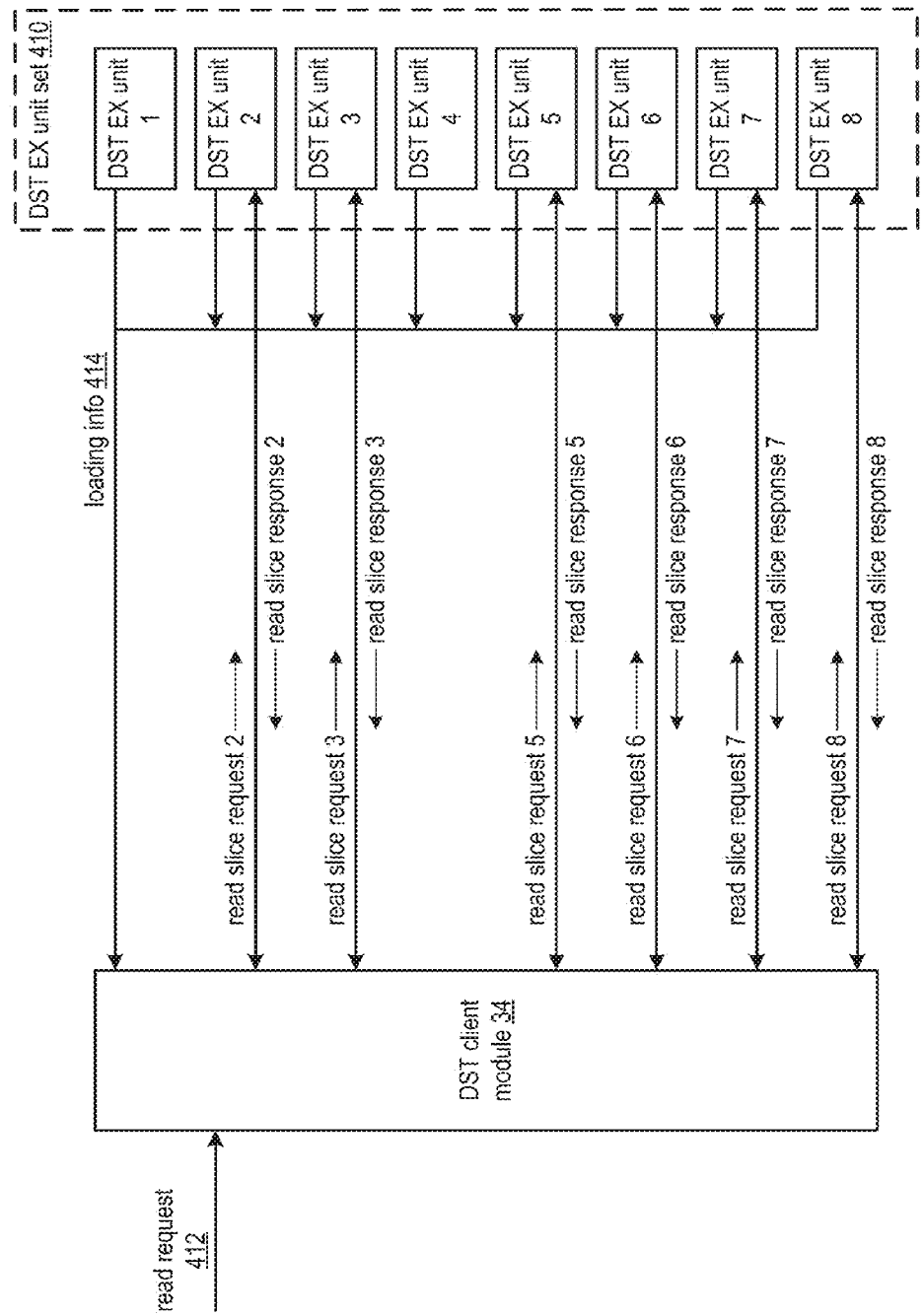
FIG. 40A is a schematic block diagram of a dispersed storage network (DSN) in accordance with the present invention.

FIG. 40A is a schematic block diagram of a dispersed storage network (DSN) that includes the distributed storage and task (DST) client module 34 of FIG. 1 and a DST execution unit set 410. The DST execution unit set 410 includes a set of DST execution units 1-8. Alternatively, the DST execution unit set may include any number of DST execution units. Each DST execution unit may be implemented utilizing the DST execution unit 36 of FIG. 1. The DSN is operable to store and retrieve data in the DST execution unit set. As a specific example, data is segmented utilizing a segmentation scheme to produce data segments. Each data segment is encoded using a dispersed storage error coding function and in accordance with dispersal parameters to produce a set of encoded data slices. The dispersal parameters includes one or more of a width, a write threshold, a read threshold, a decode threshold, an encoding matrix identifier, and an information dispersal algorithm identifier. For instance, each data segment includes a width number of encoded data slices for storage in the DST execution unit set and may be recovered when at least a decode threshold number of encoded data slices are subsequently retrieved from the DST execution unit set and decoded using the dispersed storage error coding function.

As a specific example of operation, the DST client module 34 receives a read request 412 to read a data segment of the data segments from the DST execution unit set 410. The DST client module 34 obtains loading information 414 of each DST execution unit. The loading information 414 includes one or more of an operations per second indicator, an input/output bandwidth utilization level, a memory utilization level, and a partial task queue level. The obtaining includes at least one of initiating a query, receiving an error message, performing a lookup, and receiving the loading information 414 from one or more of the DST execution units.

Having obtained the loading information 414, the DST client module 34 identifies a read threshold number of DST execution units based on one or more of the loading information and a pattern selection scheme. Selecting based on the loading information 414 includes at least one of selecting DST execution units associated with loading information 414 that compares favorably to a loading threshold level and selecting DST execution units associated with a most favorable loading information 414 among responding DST execution units. Selecting based on the pattern selection scheme includes determining the pattern selection scheme and identifying the read threshold number of DST execution units based on the determined pattern selection scheme.

The determining of the pattern selection scheme includes at least one of performing a lookup, receiving a pattern selection scheme indicator, analyzing performance of a previous retrieval segments, and analyzing previous loading information. As a specific example, the DST client module 34 identifies a next read threshold number of DST execution units of a round robin pattern selection scheme as the read threshold number of DST execution units when the next read threshold number of DST execution units are associated with loading information 414 that compares favorably to the loading threshold level (e.g., each DST execution unit is not overloaded). As another specific example, the DST client module 34 identifies a read threshold number of DST execution units associated with the most favorable loading information, among a width number of responding DST execution units, as the read threshold number of DST execution units. For instance, the DST client module 34 identifies DST execution units 2, 3, 5, 6, 7, and 8 when DST execution units 2, 3, 5, 6, 7, and 8 are associated with the most favorable loading information and the read threshold is 6.

Having identified the read threshold number of DST execution units, the DST client module 34 issues read slice requests to the identified read threshold number of DST execution units. For instance, the DST client module 34 generates and sends read slice requests 2, 3, 5, 6, 7, and 8 to the DST execution units 2, 3, 5, 6, 7, and 8. Each read slice request includes a slice name that corresponds to an encoded data slice stored on the corresponding DST execution unit. For example, a read slice request 2 includes a slice name to retrieve an encoded data slice 2 from DST execution unit 2.

Subsequent to issuing the read slice request, the DST client module 34 receives read slice responses from at least some of the identified read threshold number of DST execution units. For instance, the DST client module 34 receives read slice responses 2, 3, 5, 6, 7, and 8 from the DST execution units 2, 3, 5, 6, 7, and 8. Having received the read slice responses, the DST client module 34 decodes a decode threshold number of encoded data from the received read slice responses slices using the dispersed storage error coding function to reproduce the data segment.

Figure 40B:
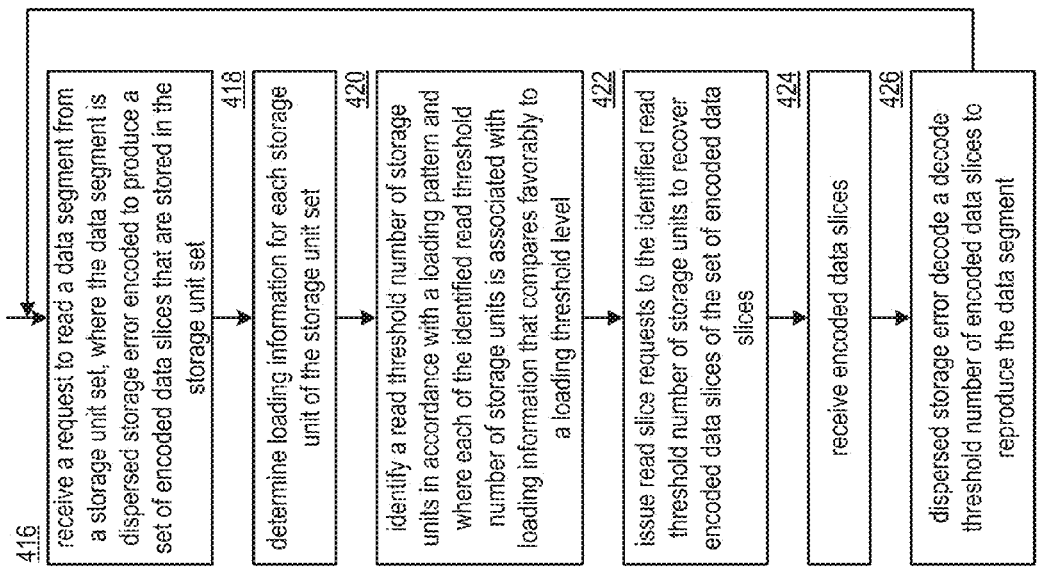
FIG. 40B is a flowchart illustrating an example of selecting storage units in accordance with the present invention.

FIG. 40B is a flowchart illustrating an example of selecting storage units. The method continues at step 416 where a processing module (e.g., of a distributed storage and task (DST) client module) receives a request to read a data segment from a storage unit set (e.g., a set of DST execution units). Alternatively, the processing module receives a read data object request to recover data segments of a data object. The method continues at step 418 where the processing module determines loading information for each storage unit of the storage unit set. The determining includes at least one of a computing loading information based on previous requests and responses, initiating a query, receiving an error message, performing a lookup, and receiving the loading information.

The method continues at step 420 where the processing module identifies a read threshold number of storage units in accordance with a loading pattern and where each of the identified read threshold number of storage units is associated with loading information to compares favorably to a loading threshold level. The identifying may include identifying a next pattern of a series of loading patterns (e.g., a round robin read threshold number of the set of storage units, a predetermined pattern, a pattern from a lookup). The selecting may further include comparing loading information of each of the storage units and selecting storage units associated with loading information that compares favorably to a loading threshold level (e.g., selecting a read threshold number of storage units that are each lightly loaded below the loading threshold level). The selecting may still further include comparing the loading information of each of the storage units and selecting storage units associated with most favorable loading information (e.g., selecting a read threshold number of least loaded storage units).

The method continues at step 422 where the processing module issues read slice requests to the identified read threshold number of storage units to recover encoded data slices of the set of data slices. The issuing includes generating a read threshold number of read slice requests that correspond to encoded data slices associated with the identified read threshold number of storage units and sending the generated read threshold number of read slice requests to the identified read threshold number of storage units. The method continues at step 424 where the processing module receives encoded data slices (e.g., extracted from received read slice responses). The method continues at step 426 where the processing module disperse storage error decodes a decode threshold number of encoded data slices of the received encoded data slices to reproduce the data segment. The method may branch back to step 416 where the processing module receives another request to read another data segment from the storage unit set. As such, the processing module may select a different loading pattern and select different storage units.

Figure 41A:
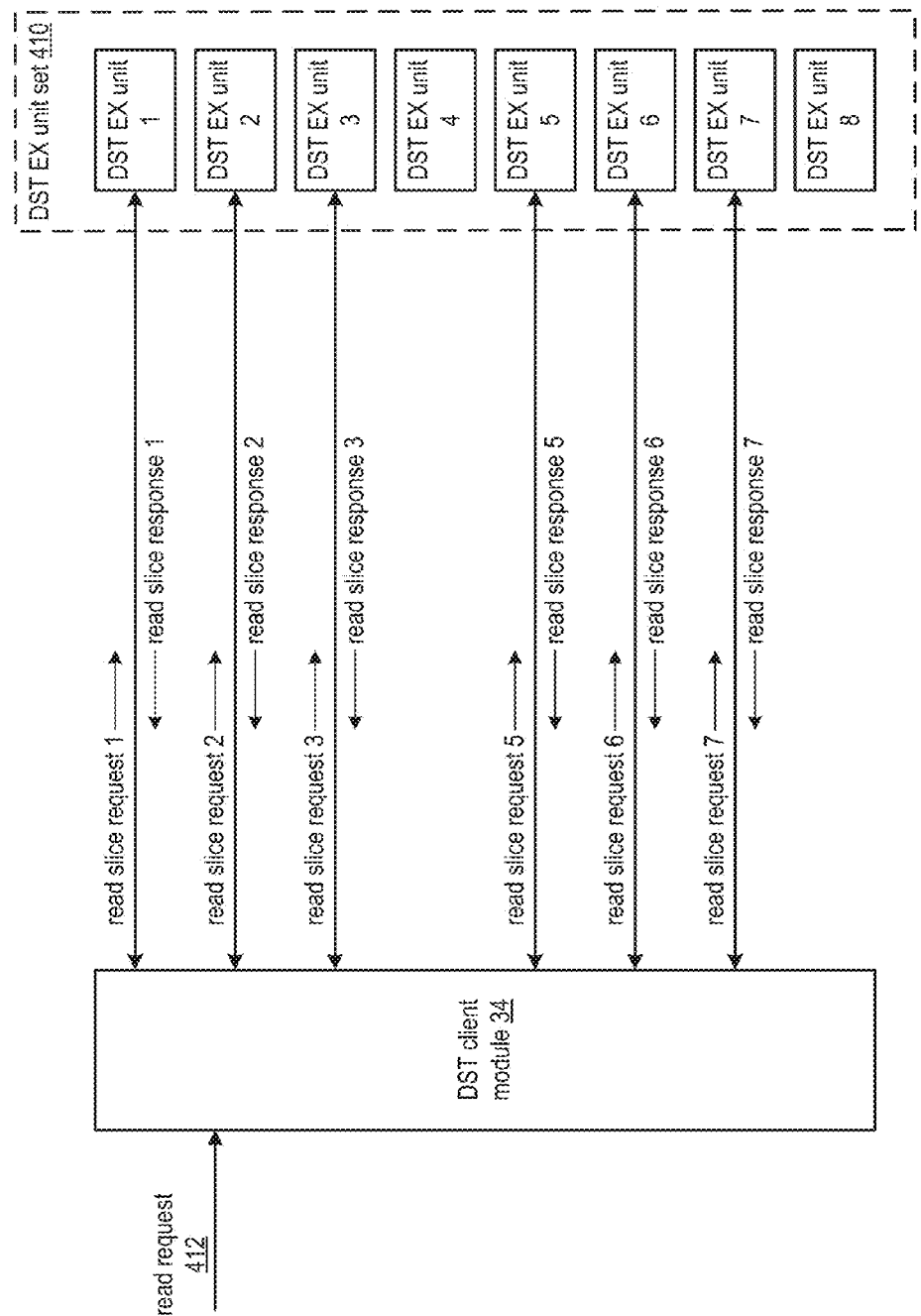
FIG. 41A is a schematic block diagram of another dispersed storage network (DSN) in accordance with the present invention.

FIG. 41A is a schematic block diagram of another dispersed storage network (DSN) that includes the distributed storage and task (DST) client module 34 of FIG. 1 and the DST execution (EX) unit set 410 of FIG. 40A. The DST execution unit set for a 10 includes a set of DST execution units 1-8. Alternatively, the DST execution unit set may include any number of DST execution units. Each DST execution unit may be implemented utilizing the DST execution unit 36 of FIG. 1. The DSN is operable to store and retrieve data in the DST execution unit set 410. As a specific example, data is segmented utilizing a segmentation scheme to produce data segments. Each data segment is encoded using a dispersed storage error coding function and in accordance with dispersal parameters to produce a set of encoded data slices. The dispersal parameters includes one or more of a width, a write threshold, a read threshold, a decode threshold, an encoding matrix identifier, and an information dispersal algorithm identifier. For instance, each data segment includes a width number of encoded data slices for storage in the DST execution unit set and may be recovered when at least a decode threshold number of encoded data slices are subsequently retrieved from the DST execution unit set and decoded using the dispersed storage error coding function.

As a specific example of operation, the DST client module 34 receives a read request 412 to read a data segment of the data segments from the DST execution unit set. When receiving the read request 412, the DST client module 34 identifies a prioritization scheme. The identifying may be based on one or more of the read request, a vault identifier (ID), a data ID, a registry lookup, a directory lookup, a data type indicator, a data size estimator, a segment priority indicator, a performance requirement, and a reliability requirement. The prioritization scheme includes at least one of a minimum latency scheme, a maximum throughput scheme, and a maximum predictability scheme. For example, the DST client module 34 identifies the minimum latency scheme when a performance requirement is extracted from the read request indicating that a fastest retrieval access time is required. As another example, the DST client module 34 identifies the maximum throughput scheme when the data size estimator is greater than a data size threshold level. As yet another example, the DST client module 34 identifies the maximum predictability scheme when the reliability requirement indicates that a lowest standard deviation of retrieval performance is required.

When the minimum latency scheme is selected, the DST client module 34 selects at least a read threshold number of DST execution units based on latency information for each DST execution unit. For example, the DST client module 34 obtains latency access times (e.g., performs a lookup, initiates a query, receives a response, performs a test) for each DST execution unit of the DST execution unit set and selects DST execution units 1, 2, 3, 5, 6, and 7 when the DST execution units 1, 2, 3, 5, 6, and 7 are associated with most favorable latency access times.

When the maximum throughput scheme is selected, the DST client module 34 selects at least the read threshold number of DST execution units based on throughput information for each DST execution unit. For example, the DST client module 34 obtains throughput levels (e.g., performs a lookup, initiates a query, receives a response, performs a test) for each DST execution unit of the DST execution unit set and selects DST execution units 1, 2, 3, 5, 6, and 7 when the DST execution units 1, 2, 3, 5, 6, and 7 are associated with most favorable throughput levels.

When the maximum predictability scheme is selected, the DST client module 34 selects at least the read threshold number of DST execution units based on predictability information for each DST execution unit. For example, the DST client module 34 obtains predictability information (e.g., performs a lookup, initiates a query, receives a response, performs a test) for each DST execution unit of the DST execution unit set and selects DST execution units 1, 2, 3, 5, 6, and 7 when the DST execution units 1, 2, 3, 5, 6, and 7 are associated with most favorable perfectibility information (e.g., lowest standard deviation of performance levels for one or more of error rate, a retrieval latency, retrieval throughput, average task execution level).

Having identified the read threshold number of DST execution units, the DST client module 34 issues read slice requests to the identified read threshold number of DST execution units. For instance, the DST client module 34 generates and sends read slice requests 1, 2, 3, 5, 6, and 7 to the DST execution units 1, 2, 3, 5, 6, and 7. Each read slice request includes a slice name that corresponds to an encoded data slice stored on the corresponding DST execution unit. For example, a read slice request 2 includes a slice name to retrieve an encoded data slice 2 from DST execution unit 2.

Subsequent to issuing the read slice request, the DST client module 34 receives read slice responses from at least some of the identified read threshold number of DST execution units. For instance, the DST client module 34 receives read slice responses 1, 2, 3, 5, 6, and 7 from the DST execution units 1, 2, 3, 5, 6, and 7. Having received the read slice responses, the DST client module 34 decodes a decode threshold number of encoded data from the received read slice responses slices using the dispersed storage error coding function to reproduce the data segment.

Figure 41B:
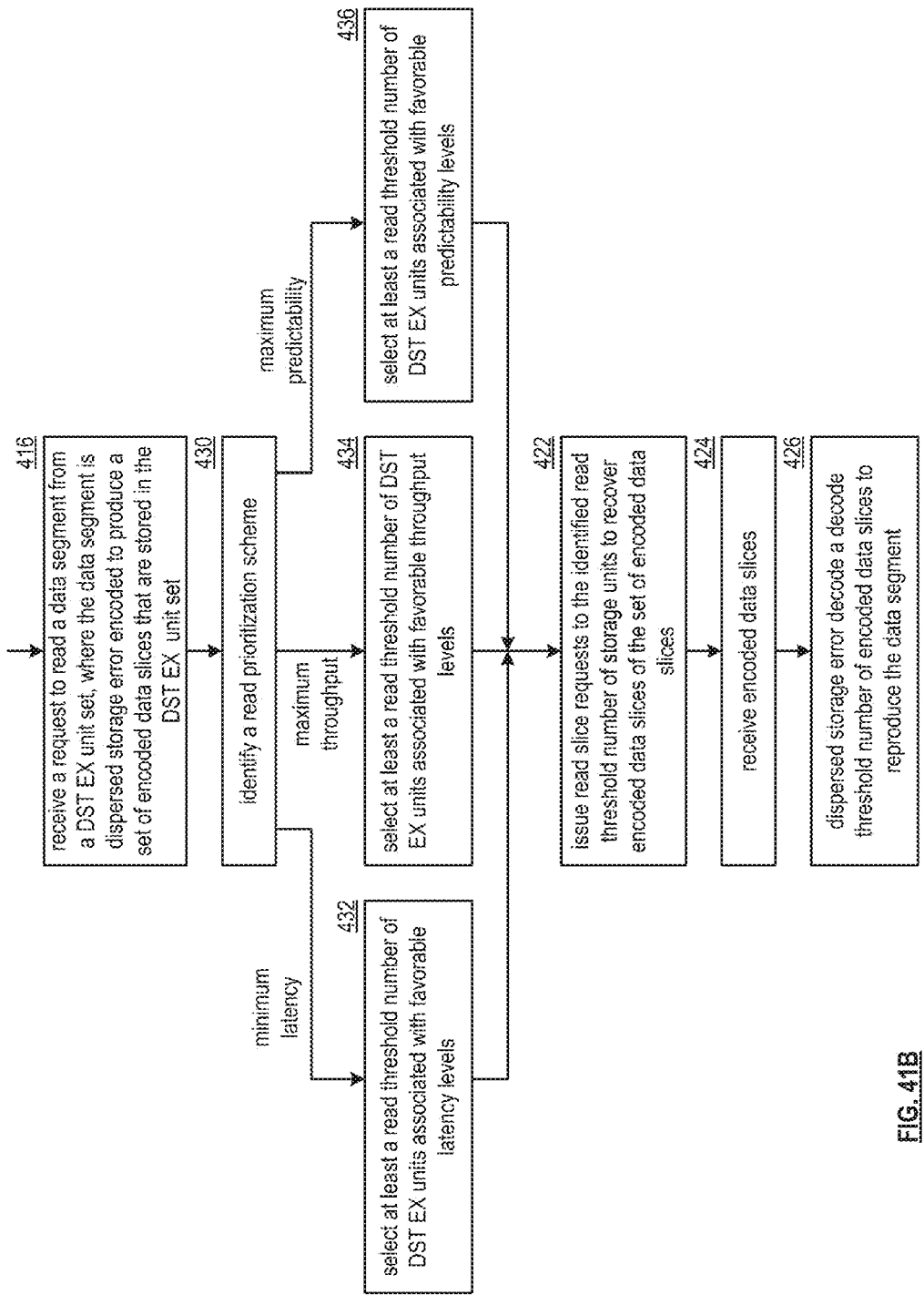
FIG. 41B is a flowchart illustrating another example of selecting storage units in accordance with the present invention.

FIG. 41B is a flowchart illustrating another example of selecting storage units, which include similar steps to FIG. 40B. The method continues with step 416 of FIG. 40B where a processing module (e.g., of a distributed storage and task (DST) client module) receives a request to read a data segment from a distributed storage and task (DST) execution unit set, where the data segment is dispersed storage error encoded to produce a set of encoded data slices that are stored in the DST execution unit set. The method continues at step 430 where the processing module identifies a read prioritization scheme (e.g., one of a minimum latency scheme, a maximum throughput scheme, and a maximum predictability scheme).

When the processing module selects the minimum latency scheme, the method continues at step 432 where the processing module selects at least a read threshold number of DST execution units associated with favorable latency levels. As a specific example, the processing module selects the read threshold number of DST execution units that are associated with latency levels below a latency threshold level. As another specific example, the processing module selects the read threshold number of DST execution units that are associated with lowest latency levels amongst all of the DST execution units. Alternatively, the processing module selects more than the read threshold number of DST execution units and less than or equal to a width number of DST execution units. For instance, the processing module selects more than the read threshold number of DST execution units when every possible combination of the read threshold number of DST execution units does not include the read threshold number of DST execution units associated with the favorable latency levels. The method branches to step 422 of FIG. 40B where the processing module issues read slice requests.

When the processing module selects the maximum throughput scheme, the method continues at step 434 where the processing module selects the at least the read threshold number of DST execution units associated with favorable throughput levels. As a specific example, the processing module selects the read threshold number of DST execution units that are associated with throughput levels above a throughput threshold level. As another specific example, the processing module selects the read threshold number of DST execution units that are associated with highest throughput levels amongst all of the DST execution units. Alternatively, the processing module selects the more than the read threshold number of DST execution units and less than or equal to the width number of DST execution units. For instance, the processing module selects more than the read threshold number of DST execution units when every possible combination of the read threshold number of DST execution units does not include the read threshold number of DST execution units associated with the favorable throughput levels. The method branches to step 422 of FIG. 40B where the processing module issues read slice requests.

When the processing module selects the maximum predictability scheme, the method continues at step 436 where the processing module selects the at least the read threshold number of DST execution units associated with favorable predictability levels (e.g., standard deviation levels for one or more of retrieval error rate, retrieval latency, and retrieval throughput). As a specific example, the processing module selects the read threshold number of DST execution units that are associated with predictability levels above a predictability threshold level. As another specific example, the processing module selects the read threshold number of DST execution units that are associated with highest predictability levels amongst all of the DST execution units. Alternatively, the processing module selects the more than the read threshold number of DST execution units and less than or equal to the width number of DST execution units. For instance, the processing module selects more than the read threshold number of DST execution units when every possible combination of the read threshold number of DST execution units does not include the read threshold number of DST execution units associated with the favorable predictability levels. The method continues to step 422 of FIG. 40B where the processing module issues read slice requests.

The method continues with step 422, 424, and 426 of FIG. 40B where the processing module issues read slice requests to the identified read threshold number of DST execution units to recover encoded data slices of the set of encoded data slices, receives the encoded data slices, and dispersed storage error decodes a decode threshold number of encoded data slices to reproduce the data segment. The method may loop back to step 430 where the processing module identifies the read prioritization scheme when continuing to read further data segments, where the processing module may select a different read prioritization scheme for the further data segments.

Figure 42A:
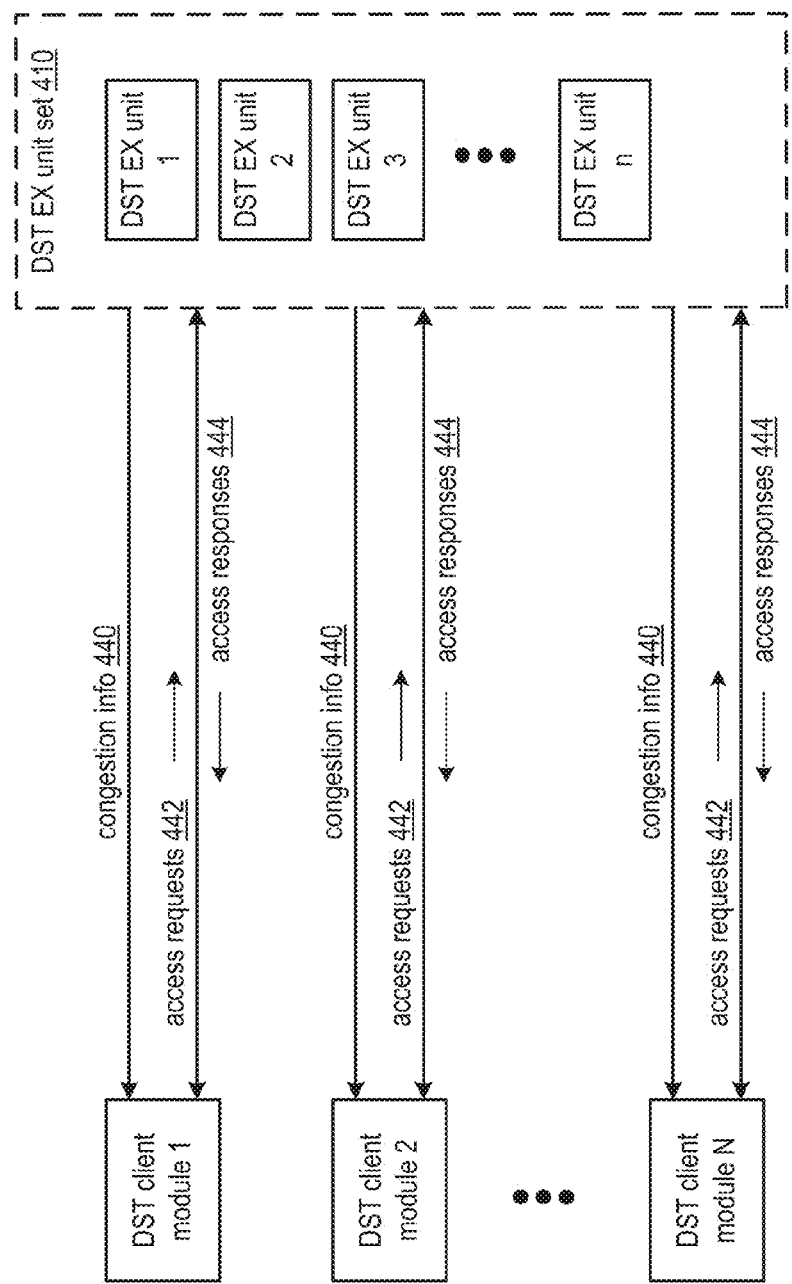
FIG. 42A is a schematic block diagram of another dispersed storage network (DSN) in accordance with the present invention.

FIG. 42A is a schematic block diagram of another dispersed storage network (DSN) that includes distributed storage and task (DST) client modules 1-N and the DST execution unit set 410 of FIG. 40A. Alternatively, the DSN includes two or more DST execution unit sets. The DST execution unit set includes a set of DST execution units 1-n. Each DST execution unit may be implemented utilizing the DST execution unit 36 of FIG. 1. Each DST client module may be implemented utilizing the DST client module 34 of FIG. 1. The DSN is operable to store and retrieve data in the DST execution unit set. As a specific example, data is segmented utilizing a segmentation scheme to produce data segments. Each data segment is encoded using a dispersed storage error coding function and in accordance with dispersal parameters to produce a set of encoded data slices. The dispersal parameters includes one or more of a width, a write threshold, a read threshold, a decode threshold, an encoding matrix identifier, and an information dispersal algorithm identifier. For instance, each data segment includes a width number of encoded data slices for storage in the DST execution unit set and may be recovered when at least a decode threshold number of encoded data slices are subsequently retrieved from the DST execution unit set and decoded using the dispersed storage error coding function.

As a specific example of operation, the DST client module 1 detects an overload condition of one or more of the DST execution units. The detecting includes at least one of initiating a query, receiving a query response, receiving an error message, performing a test, and receiving congestion information 440. The congestion information 440 includes one or more of operations executed per second, input/output bandwidth utilization level, a partial task queue depth, a resource overload indicator, and a memory utilization indicator. For instance, DST execution unit 2 issues congestion information 440 to one or more of the DST client modules when detecting a congestion level greater than a high congestion threshold level.

Having detected the overload condition, the DST client module 1 identifies a congestion reduction scheme based on the congestion information. The congestion reduction scheme includes one or more of a unit selection scheme, a retry timing scheme, a lower rebuild performance scheme, and a selective address generation scheme. When the unit selection scheme is selected, the DST client module 1 identifies a subset of DST execution units associated with favorable congestion information for subsequent access (e.g., issuing access requests 442 only to the identified subset of DST execution units and receiving access responses 444 from the identified subset of DST execution units). When the retry timing scheme is selected, the DST client module 1 extends retry time frame windows associated with retrying subsequent access requests based on unfavorable access responses (e.g., extending wait times prior to retrying an access request when a corresponding access responses not received within an expected time frame).

When the lower rebuild performance scheme is selected, the DST client module 1 decreases frequency of one or more of scanning for encoded data slice errors and rebuilding encoded data slices associated with detected encoded data slice errors (e.g., slowing down detection of encoded data slice errors and slowing down rebuilding of encoded data slices associated with an error). When the selective address generation scheme is selected, the DST client module 1 upon writing a new data object to the set of DST execution units, generates DSN addresses associated with DST execution units associated with favorable congestion information (e.g., assigning a new data object to a data object number, source name, and resulting slice names where the resulting slice names are associated with the DST execution units associated with the favorable congestion information). When detecting that the overload condition the longer exists, the DST client module 1 suspends execution of the identified congestion reduction scheme.

Figure 42B:
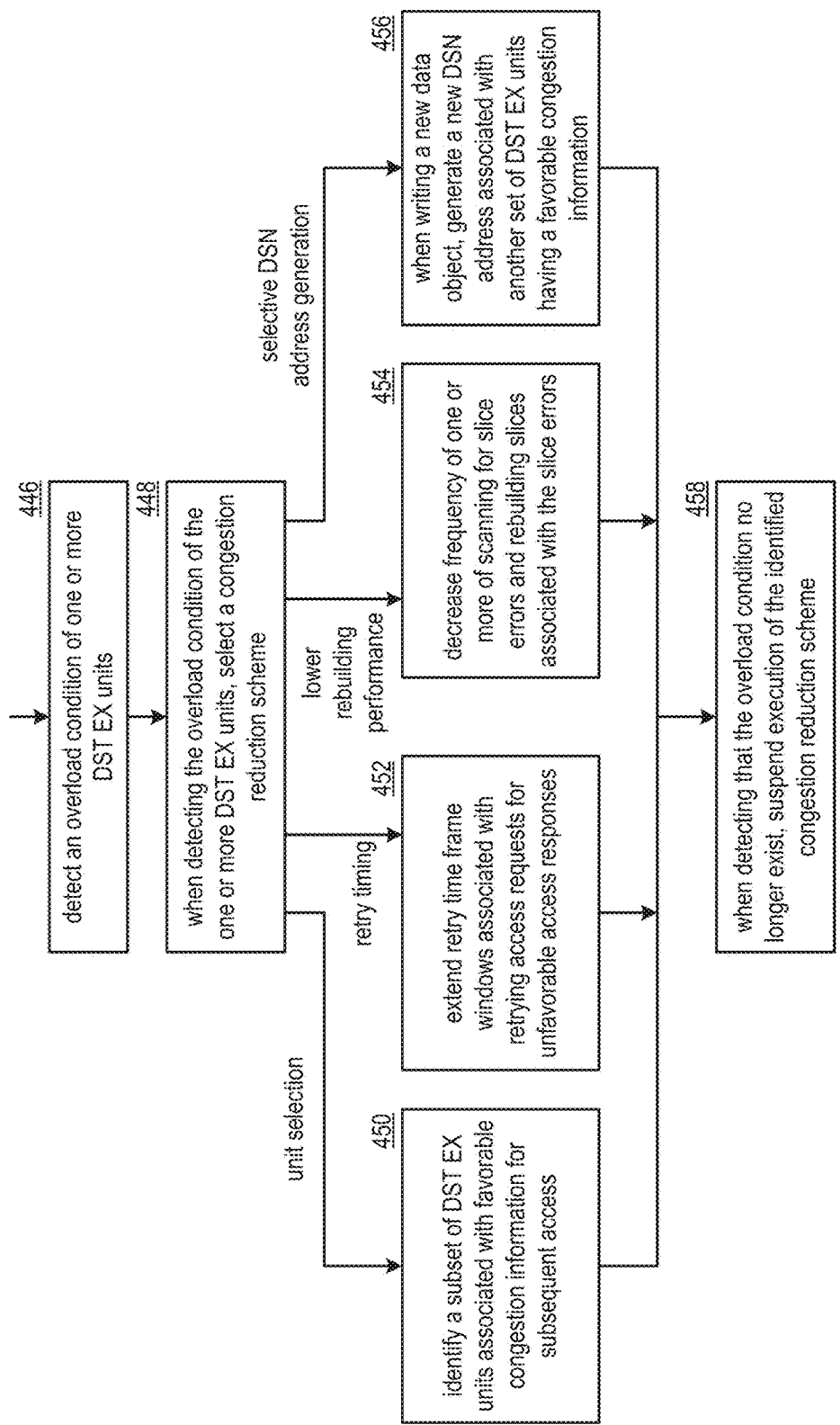
FIG. 42B is a flowchart illustrating an example of selecting a congestion reduction scheme in accordance with the present invention.

The FIG. 42B is a flowchart illustrating an example of selecting a congestion reduction scheme. The method continues at step 446 where a processing module (e.g., of a distributed storage and task (DST) client module) detects an overload condition of one or more DST execution units of a set of DST execution units. The detecting includes at least one of performing a test, initiating a query, receiving a query response, receiving an error message, and receiving congestion information from the set of DST execution units. When detecting the overload condition of the one or more DST execution units, the method continues at step 448 where the processing module selects a congestion reduction scheme. The selecting may be based on one or more of a predetermination, a request, a system registry lookup, a level of congestion, and a type of congestion. The congestion reduction scheme includes at least one of a unit selection scheme, a retry timing scheme, a lower rebuilding performance scheme, and a selective dispersed storage network (DSN) address generation scheme.

As a specific example, the processing module selects the unit selection scheme when detecting that less than a low threshold level number of DST execution units are overloaded (e.g., 1 of 8). As another specific example, the processing module selects the retry timing scheme when successful access sequences have longer than expected access latencies. For instance, the processing module detects that previous access latencies for 5 of 8 DST execution units are double the expected access latencies. As yet another specific example, the processing module selects the lower rebuilding performance scheme when substantially all of the DST execution units are associated with the overload condition (e.g., 6 of 8 are overloaded). As a still further specific example, the processing module selects the selective DSN address generation scheme when substantially all of the DST execution units of the set of DST execution units are associated with the overload condition and another set of DST execution units is available, where the other set of DST execution units is not associated with the overload condition.

When the processing module selects the unit selection scheme, the method continues at step 450 where the processing module identifies a subset of DST execution units associated with favorable congestion information for subsequent access (e.g., most favorable, more favorable than a congestion threshold level). The method branches to step 458 where the processing module detects that the overload condition the longer exists.

When the processing module selects the retry timing scheme, the method continues at step 452 where the processing module extends retry time frame windows associated with retrying access request for unfavorable access responses (e.g., extending retry timers). The method branches to step 458 where the processing module detects that the overload condition no longer exists.

When the processing module selects the lower rebuilding performance scheme, the method continues at step 454 where the processing module decreases frequency of one or more of scanning for slice errors and rebuilding slices associated with the slice errors (e.g., slowing down rebuilding to lower congestion). The method branches to step 458 where the processing module detects that the overload condition no longer exists.

When the processing module selects the selective DSN address generation scheme, the method continues at step 456 where the processing module, when writing a new data object, generates a new DSN address associated with the other set of DST execution units having a favorable congestion information. The writing includes identifying the other set of DST execution units having the favorable congestion information and generating an object number of the DSN address such that the DSN address is associated with the DST execution units having the favorable congestion information. The method continues to step 458 where the processing module detects that the overload condition the longer exists.

When detecting that the overload condition no longer exists, the method continues at step 458 where the processing module suspends execution of the identified congestion reduction scheme. For example, the processing module indicates that the overload condition does not exist. As another example, the processing module returns to typical approaches for one or more of unit selection, retry timing, rebuilding frequency, and DSN address generation for writing new data objects.

Figure 43A:
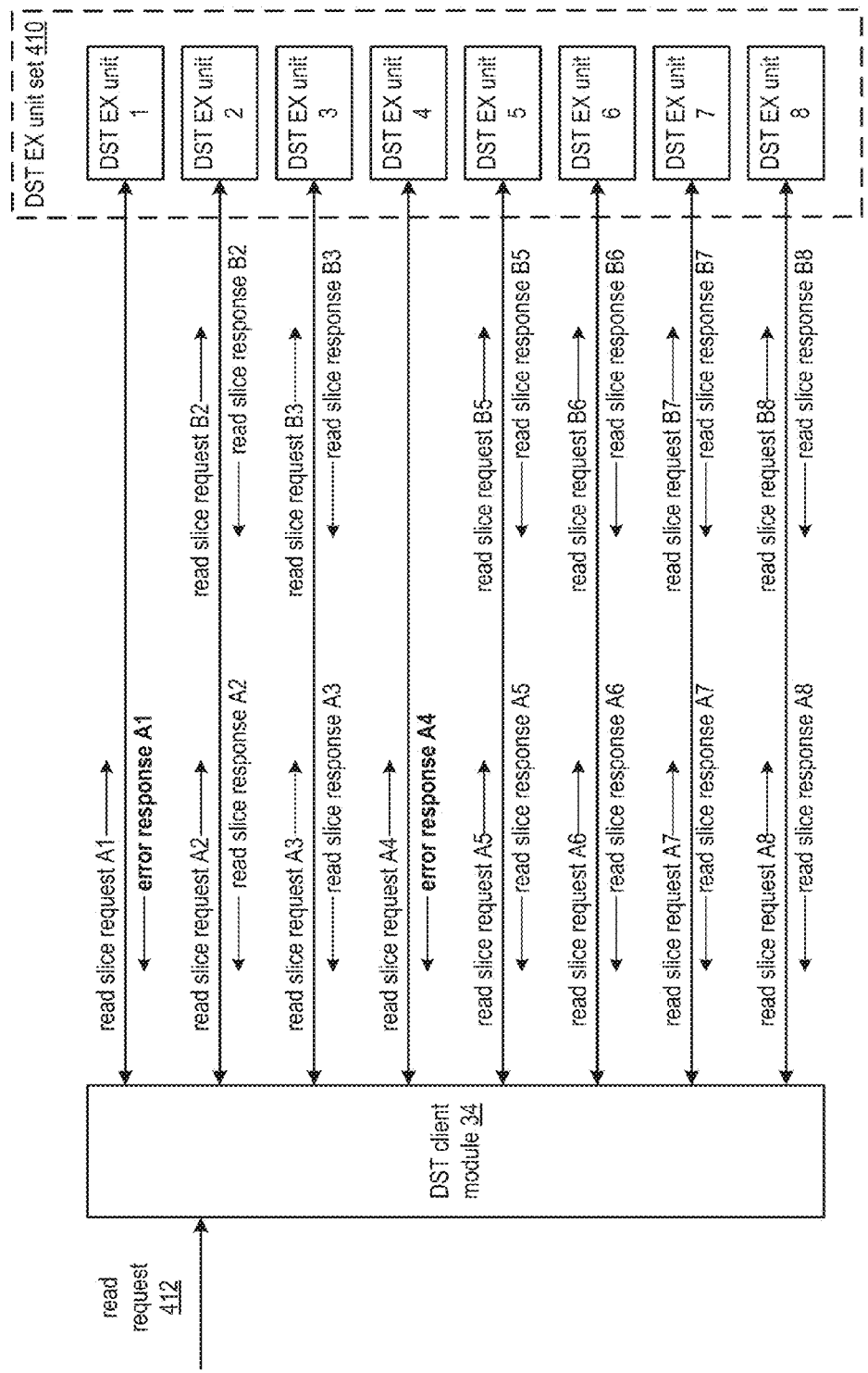
FIG. 43A is a schematic block diagram of another dispersed storage network (DSN) in accordance with the present invention.

FIG. 43A is a schematic block diagram of another dispersed storage network (DSN) that includes the distributed storage and task (DST) client module 34 of FIG. 1 and the DST execution unit set 410 of FIG. 40A. The DST execution unit set for the tenth includes a set of DST execution units 1-8. Alternatively, the DST execution unit set ordered 10 may include any number of DST execution units. Each DST execution unit may be implemented utilizing the DST execution unit 36 of FIG. 1. The DSN is operable to store and retrieve data in the DST execution unit set. As a specific example, data is segmented utilizing a segmentation scheme to produce data segments. Each data segment is encoded using a dispersed storage error coding function and in accordance with dispersal parameters to produce a set of encoded data slices. The dispersal parameters includes one or more of a width, a write threshold, a read threshold, a decode threshold, an encoding matrix identifier, and an information dispersal algorithm identifier. For instance, each data segment includes a width number of encoded data slices for storage in the DST execution unit set and may be recovered when at least a decode threshold number of encoded data slices are subsequently retrieved from the DST execution unit set and decoded using the dispersed storage error coding function.

As a specific example of operation, the DST client module 34 receives a read request 412 and issues one or more sets of read slice requests (e.g., read slice request A1 through A8 for data segment A) to the DST execution unit set 410 to recover one or more data segments of the data segments. The DST client module 34 receives read slice responses and/or error responses from the DST execution unit set. Each read slice response may include one or more of an encoded data slice and an error response indicator. The error response may include one or more of an encoded data slice missing indicator, a slice error indicator, an invalid slice integrity value indicator, a slice quarantined indicator, an empty memory indicator, a missing slice revision indicator, an outdated slice revision indicator, and a superfluous revision indicator. For instance, the DST client module 34 receives read slice responses A2, A3, A5, A6, A7, and A8 that each include corresponding valid encoded data slices and error responses A1 and A4 from DST execution units 1 and 4 respectively.

Having received the read slice responses and/or error responses, the DST client module 34 determines a probability of receiving valid data each of the DST execution units based on the received read slice responses and/or the error responses. For example, the processing module calculates an error rate based on received error responses and calculates the probability of receiving valid data based on the error rate.

When recovering a subsequent one or more data segments, the DST client module selects a read threshold number of DST execution units based on the probability of receiving valid data from each of the DST execution units. For example, the DST client module selects the read threshold number of DST execution units associated with a highest probability of receiving valid data. As another example, the DST client module selects the read threshold number of DST execution units associated with probabilities of receiving valid data that are greater than a probability of receiving data threshold level. For instance, the DST client module selects DST execution units 2, 3, 5, 6, 7, and 8 when the probability of receiving valid data for the DST execution units 2, 3, 5, 6, 7, and 8 is greater than the probability receiving valid data for DST execution units 1 and 4 when the read threshold is 6.

Having identified the read threshold number of DST execution units, the DST client module 34 issues read slice requests to the identified read threshold number of DST execution units. For instance, the DST client module 34 generates and sends read slice requests B2, B3, B5, B6, B7, and B8 to the DST execution units 2, 3, 5, 6, 7, and 8. Each read slice request includes a slice name that corresponds to an encoded data slice stored on the corresponding DST execution unit. For example, read slice request B2 includes a slice name to retrieve an encoded data slice b2 from DST execution unit 2.

Subsequent to issuing the read slice requests, the DST client module 34 receives read slice responses from at least some of the identified read threshold number of DST execution units. For instance, the DST client module 34 receives read slice responses B2, B3, B5, B6, B7, and B8 from the DST execution units 2, 3, 5, 6, 7, and 8. Having received the read slice responses, the DST client module 34 decodes a decode threshold number of encoded data from the received read slice responses slices using the dispersed storage error coding function to reproduce the data segment.

Figure 43B:
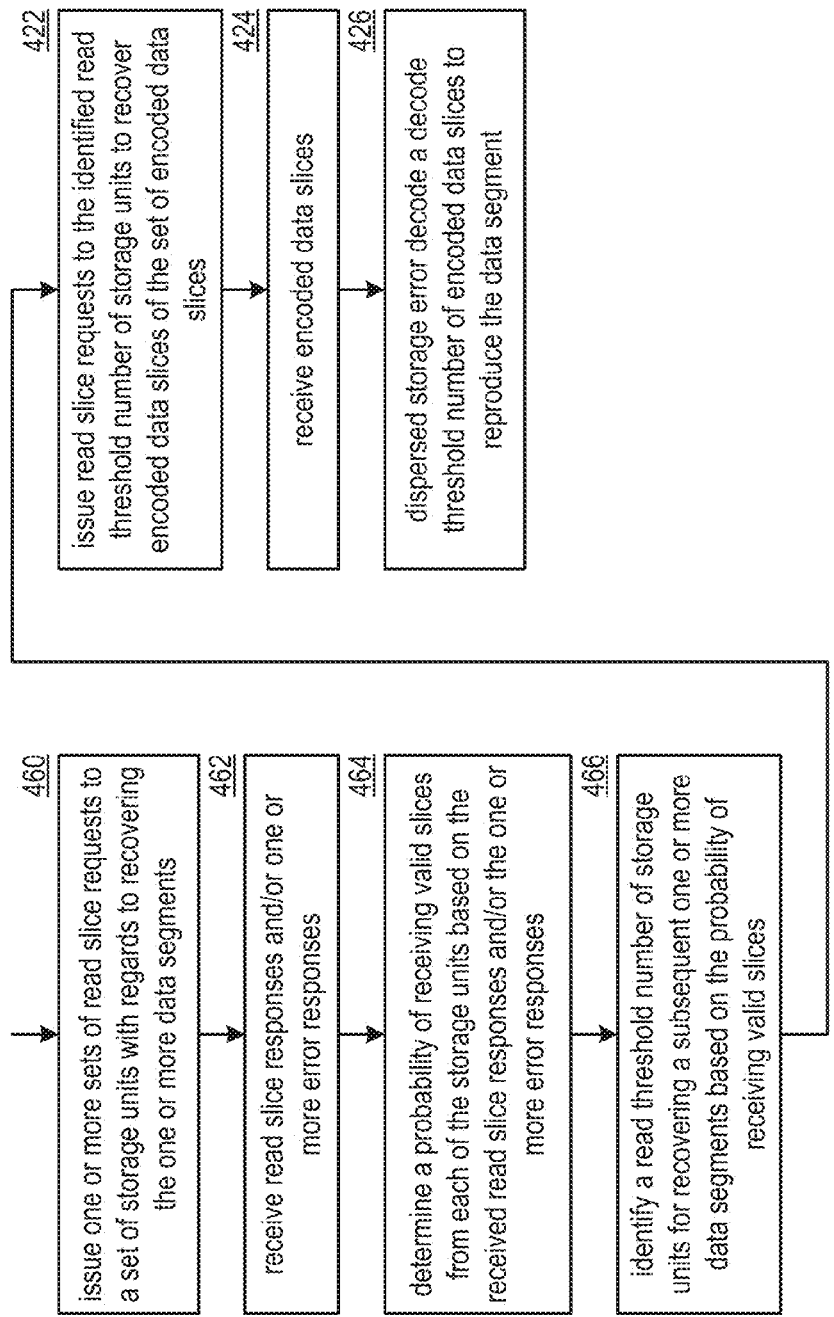
FIG. 43B is a flowchart illustrating another example of selecting storage units in accordance with the present invention.

FIG. 43B is a flowchart illustrating another example of selecting storage units, which include similar steps to FIG. 40B. The method continues at step 460 where a processing module (e.g., of a distributed storage and task (DST) client module) issues one or more sets of read slice requests to a set of storage units (e.g., DST execution units) with regards to recovering the one or more data segments, where each of the one or more data segments are disperse storage error encoded to produce a set of encoded data slices. The issuing includes generating and sending the read slice requests. The method continues at step 462 where the processing module receives read slice responses and/or one or more error responses. The method continues at step 464 where the processing module determines a probability of receiving valid slices from each of the storage units based on the received read slice responses and/or the one or more error responses.

The method continues at step 466 where the processing module identifies a read threshold number of storage units for recovering a subsequent one or more data segments based on the probability of receiving valid slices. For example, the processing module selects the read threshold number of storage units where the read threshold number of storage units are associated with a greatest probability of receiving valid slices. As another specific example, the processing module selects the read threshold number of storage units where the read threshold number of storage units are associated with a probability of receiving valid slices greater than a probability threshold level. The method continues with steps 422, 424, and 426 of FIG. 40B where the processing module issues read slice requests to the identified read threshold number of storage units to recover encoded data slices of the set of encoded data slices, receives encoded data slices, and disperse storage error decodes a decode threshold number of encoded data slices to reproduce the data segment of the one or more data segments.

Figure 44A:
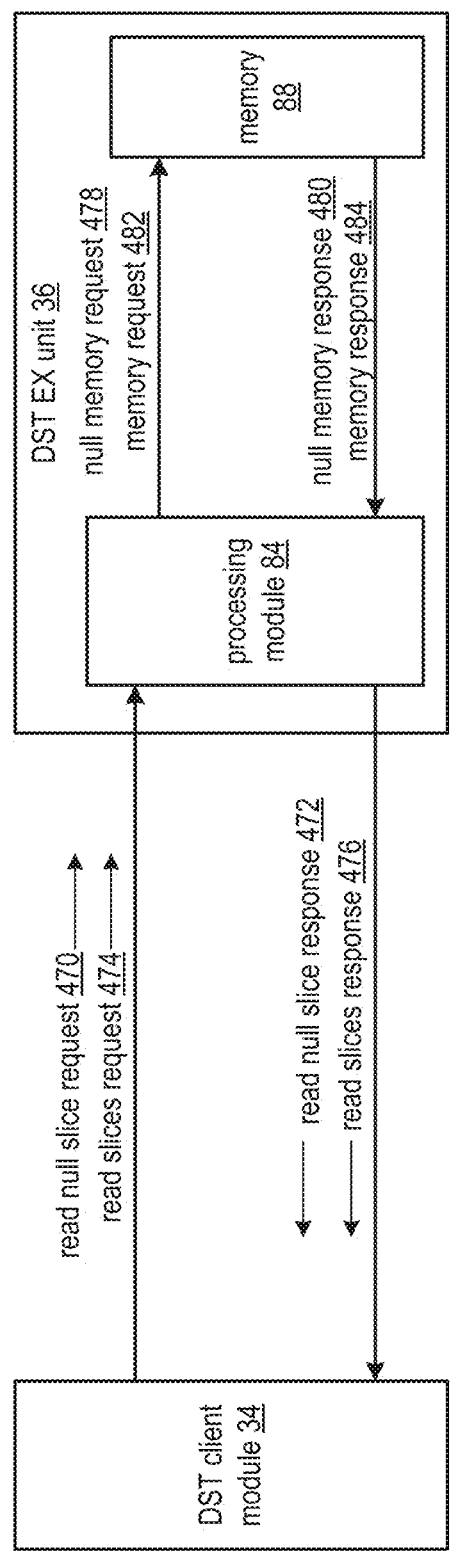
FIG. 44A is a schematic block diagram of another dispersed storage network (DSN) in accordance with the present invention.

FIG. 44A is a schematic block diagram of another dispersed storage network (DSN) that includes the distributed storage and task (DST) client module 34 and the DST execution (EX) unit 36 of FIG. 1. The DST execution unit 36 includes the processing module 84 and the memory 88 of FIG. 3. Alternatively, the DSN may include a set of DST execution units 36, where the set of DST execution units 36 includes the DST execution unit 36. Alternatively, the DST execution unit 36 may include two or more memories 88.

The DSN is operable to store and retrieve a portion of data in the DST execution unit 36. As a specific example, data is segmented utilizing a segmentation scheme to produce data segments. Each data segment is encoded using a dispersed storage error coding function and in accordance with dispersal parameters to produce a set of encoded data slices. The dispersal parameters includes one or more of a width, a write threshold, a read threshold, a decode threshold, an encoding matrix identifier, and an information dispersal algorithm identifier. For instance, each data segment includes a width number of encoded data slices, where at least one encoded data slice is stored in the DST execution unit 36. The data may be recovered when at least a decode threshold number of encoded data slices of the set of encoded data slices are subsequently retrieved and decoded using the dispersed storage error coding function, where the retrieving includes retrieving the at least one encoded data slice from the DST execution unit 36.

The storing and retrieving of the at least one encoded data slice may include selecting the DST execution unit 36 from a plurality of candidate DST execution units 36 based on a throughput level of the DST execution unit 36. The throughput level of the DST execution unit 36 includes a number of bytes processed per unit time and may be represented by a formula DST execution unit throughput=number of bytes processed/(processing module time+memory access time).

In an example of operation to determine the DST execution unit throughput, the DST client module 34 generates a read null slice request 470. The read null slice request 470 includes a slice name for an encoded data slice that is not expected to be stored on the DST execution unit 36. As a specific example, the DST client module 34 performs a table lookup to determine an unutilized slice name that corresponds to the DST execution unit 36. Having generated the read null slice request 470, the DST client module 34 sends the read null slice request 470 to the DST execution unit 36 and starts a timer. Having received the request, the processing module 84 issues a null memory request 478 to the memory 88 and receives a null memory response 480 from the memory 88, where the response does not include an encoded data slice (e.g., but does take time to access the memory 88 so as to include the memory access time). The processing module 84 issues a read null slice response 472 to the DST client module 34, where the read null slice response 472 does not include an encoded data slice. The DST client module 34 receives the read null slice response 472 and ends the timer. The DST client module 34 determines null slice latency as a value of the timer (e.g., end time−start time).

Having determined the null slice latency, the DST client module 34 generates a read slices request 474 for one or more encoded data slices (e.g., that are known to exist on the DST execution unit 36). The DST client module 34 sends the read slices request 474 to the DST execution unit 36 and starts a second timer. Having received the read slices request 474, the processing module 84 issues a memory request 482 to the memory 88 to retrieve the one or more encoded data slices. The memory 88 issues a memory response 484 to the processing module 84, where the memory response 484 includes the one or more encoded data slices. The processing module 84 issues a read slices response 476 to the DST client module 34, where the read slices response 476 includes a response size number of bytes of the one or more encoded data slices.

Next, the DST client module 34 receives the read slices response 476 and ends the second timer. The DST client module 34 determines slice latency as a value of the second timer (e.g., end time−start time). Having determined the slice latency and the null slice latency, the DST client module 34 determines the response size (e.g., counting bytes of the aggregate of the one or more encoded data slices of the read slices response). Having determined the response size, the DST client module 34 determines the DST execution unit throughput in accordance with a formula: DST execution unit throughput=(response size)/(slice latency−null latency). As such, the DST client module 34 has performed one test to acquire one determination of the DST execution unit throughput. Alternatively, or in addition to, the DST client module 34 performs more than one test and averages corresponding throughput results to produce an averaged DST execution unit throughput. Such averaging may include applying a higher weighting for larger than average response sizes.

Figure 44B:
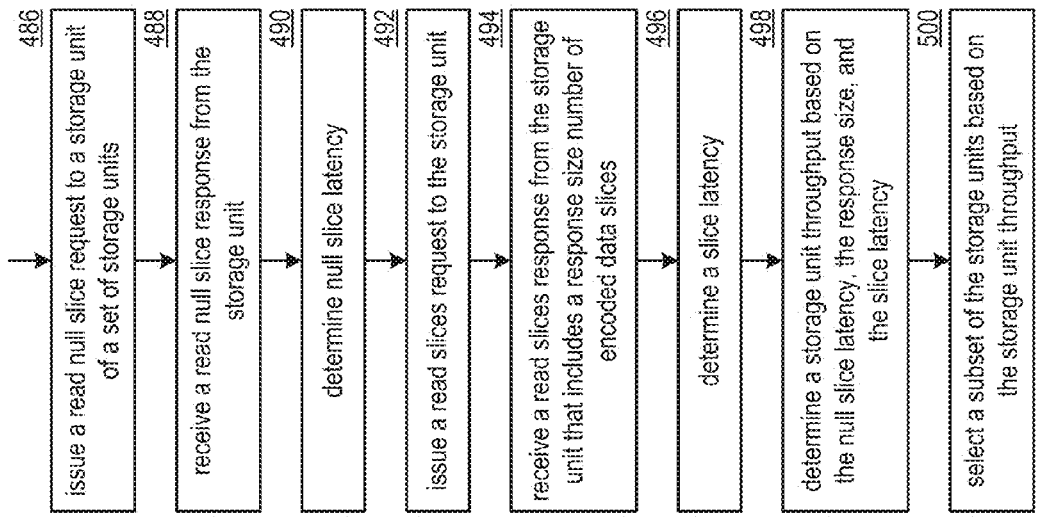
FIG. 44B is a flowchart illustrating an example of determining a storage unit throughput level in accordance with the present invention.

FIG. 44B is a flowchart illustrating an example of determining a storage unit. The method continues at step 486 where a processing module (e.g., of a distributed storage and task (DST) client module) issues a read null slice request to a storage unit of a set of storage units. The issuing includes generating the read null slice request for an encoded data slice that does not exist, sending the read null slice request to the storage unit, and starting a timer. The method continues at step 488 where the processing module receives a read null slice response from the storage unit. The receiving includes stopping the timer. The method continues at step 490 where the processing module determines null slice latency based on a value of the timer (e.g., measure elapsed time from sending of the request to receiving of the response).

The method continues at step 492 where the processing module issues a read slices request to the storage unit. The issuing includes determining a test number of encoded data slices, generating the read slices request for the test number of encoded data slices known to exist on the storage unit, sending the read slices request to the storage unit, and starting another timer. The determining the test number of encoded data slices may be based on one or more of a predetermination, a request, a previous storage unit throughput level, a test schedule, and a current variance of a current estimated storage unit throughput level.

Having issued the read slices request, the method continues at step 484 where the processing module receives a read slices response from the storage unit that includes a response size number of encoded data slices and stops the other timer. The receiving includes determining the response size number by at least one of counting bytes of the aggregate of encoded data slices and receiving the response size number. Having received the read slices response, the method continues at step 496 where the processing module determines slice latency based on a value of the other timer (e.g., measure elapsed time from sending of the read slices request to receiving of the read slices response).

The method continues at step 498 where the processing module determines a storage unit throughput based on the null slice latency, the response size, and the slice latency. The determining includes calculating the storage unit throughput in accordance with a formula: storage unit throughput=(response size)/(slice latency−null latency). The method continues at step 500 where the processing module selects a subset of the storage units based on the storage unit throughput. As a specific example, the processing module selects a threshold number (e.g., at least one of a write threshold, a read threshold, a decode threshold) of storage units to comprise the subset, where the threshold number of storage units are associated with favorable storage unit throughput values (e.g., highest throughput levels, throughput levels above a throughput threshold level).

FIGS. 45A-C are a schematic block diagram of another dispersed storage network (DSN) that includes the distributed storage and task (DST) client module 34 of FIG. 1, the network 24 of FIG. 1, and a storage group 510. The DST client module 34 includes the dispersed storage (DS) error encoding 112 of FIG. 4 and the DS error decoding 182 of FIG. 13. The storage group 510 includes a storage group number of storage units. Each storage unit may be implemented utilizing the DST execution unit 36 of FIG. 1. Each storage unit includes an interface, a local memory, and a processing module. For example, the storage units each include the interface 169 FIG. 11, the memory 88 of FIG. 3 as the local memory, and the processing module 84 of FIG. 3.

The storage group number is greater than an information dispersal algorithm (IDA) width, where dispersed storage encoding parameters includes the IDA width, a read threshold number, and a decode threshold number. As a specific example, the storage group 510 includes 10 storage units when the IDA width is 8 and the decode threshold number is 5. The DSN functions to access data stored in the storage group 510. The accessing includes writing the data to the storage group 510 and reading stored data from the storage group 510 to reproduce the data.

FIG. 45A illustrates steps of an example of the writing of the data where the DST client module 34 receives a write request 512 to store a data object in the storage group 510. The write request 512 includes the data object and a data identifier (ID) of the data object. The DS error encoding 112 determines the dispersed storage encoding parameters based on one or more of the data ID, a requesting entity ID, a data type indicator, a data size indicator, a system registry lookup, a directory lookup, and a dispersed hierarchical index lookup.

Having determined the dispersed storage encoding parameters, the DS error encoding 112 divides the data object into a plurality of data segments and utilizes the dispersed storage encoding parameters to dispersed storage error encode each data segment of the plurality of data segments to produce a plurality of sets of encoded data slices, where a decode threshold number of encoded data slices of each set of encoded data slices is required to reconstruct each data segment.

Having produced the plurality of sets of encoded data slices, the DS error encoding 112 may obtain storage unit status information 1-10 for the storage units 1-10. The storage unit status information includes, for one or more of the storage units, one or more of a current throughput level, a throughput capability level, a level of storage utilization, a task loading level, an access latency level, and an availability status (e.g., off-line, online, rebuilding with limited availability). Having obtained the storage unit status information, the DS error encoding 112 selects a target number of storage units of the storage group 510 based on one or more of the storage unit status information 1-10 and a load equalization scheme. When each set of encoded data slices is to be stored in the storage group 510, there are a (storage group number) choose (target number) of combinations for selecting a target number of storage units from the storage group number of storage units. For instance, there are 10 choose 8 (e.g., =45) number of combinations for selecting the target number of storage units from the storage group when the storage group includes 10 storage units and the target number is equivalent to the IDA width of 8.

As a specific example, the DS error encoding 112 selects a different combination of the IDA width number of storage units for each data segment in accordance with a round robin load equalization scheme. As another specific example, the DS error encoding 112 selects the target number of storage units associated with favorable storage unit status information (e.g., available status). For instance, the DS error encoding 112 selects storage units 1, 3-7, and 10 as 8 target number of storage units out of the 10 storage group number of storage units when storage unit status information 2 indicates that storage unit 2 is underperforming (e.g., poorest throughput performance) and storage unit status information 9 indicates that storage unit 9 is underperforming (e.g., highest latency).

Having selected the target number of storage units, the DS error encoding 112 issues sets of a target number of write slice requests (e.g., write slice requests 1-8) to the selected IDA width number of storage units to store encoded data slices of each set of the IDA width number of encoded data slices. The issuing includes generating and sending the target number of write slice requests. For example, a set of encoded data slices 1-8 is stored in the storage group 510 by sending encoded data slice 1 to storage unit 1, encoded data slice 2 to storage unit 3, encoded data slice 3 to storage unit 4, encoded data slice 4 to storage unit 5, encoded data slice 5 to storage unit 6, encoded data slice 6 to storage unit 7, encoded data slice 7 to storage unit 8, and encoded data slice 8 to storage unit 10. Having issued the target number of write slice requests, the DST client module 34 may associate the data ID with the selected IDA width number of storage units. The associate includes at least one of updating a DSN directory and updating a dispersed hierarchical index. For example, the DST client module 34 updates the DSN directory to associate the data ID with identifiers of the selected IDA width number of DST execution units (e.g., storage units 1, 3-8, 10).

FIG. 45B illustrates steps of an example of the reading of the stored data where the DS error decoding 182 receives a read request 514 that includes the data ID. For each data segment of the plurality of data segments, the DS error decoding 182 may identify the target number of storage units based on the established association between the data ID and the IDA width number of storage units by performing a DSN directory lookup. For instance, the DS error decoding 182 accesses the DSN directory to determine that encoded data slices of the data object were stored in storage units 1, 3-8, and 10.

Having identified the target number of storage units, the DS error decoding 182 may obtain updated storage unit status information 1-10 from the storage group 510. For example, the DS error decoding 182 issues a storage unit status information request to each storage unit of the storage group 510 and receives storage unit status information from the storage group 510 to produce the updated storage unit status information.

Having obtained the updated storage unit status information, the DS error decoding 182 selects a read threshold number of storage units based on the updated storage unit status information. The selecting includes at least one of selecting storage units from the identified target number of storage units and selecting storage units from the storage group 510. For example, the DS error decoding 182 selects the read threshold number of storage units associated with most favorable updated storage unit status information (e.g., lowest access latency compared to others). For instance, the DS error decoding 182 selects storage units 1-2, 4-7 as the read threshold number of storage units when storage unit status information 3 indicates that storage unit 3 is performing unfavorably and the storage unit status information 9 indicates that storage unit 9 continues to perform unfavorably. Alternatively, the DS error decoding 182 selects all storage units of the storage group 510 when the read threshold number is substantially the same as the storage group number of storage units.

Having selected the read threshold number of storage units, the DS error decoding 182 generates a read threshold number of access requests 516. Each access request 516 includes one or more of a type 518, a level 520, and a slice address 522. The type 518 indicates at least one of a read type, a write type, a delete type, a list type, and a rebuild type. The level 520 indicates at least one of a data object level, a data segment level, and an encoded data slice level. For example, the DS error decoding 182 generates the level 520 to include the data object level when recovery of all encoded data slices from each storage unit for the entire data object is desired. As another example, the DS error decoding 182 generates the level 520 to include the data segment level when recovery of just one data segment (e.g., corresponding to a portion of the data object) is desired. As yet another example, the DS error decoding 182 generates a level 520 to include the encoded data slice level when recovery of just one encoded data slices desired.

The slice address 522 includes one or more of an encoded data slice number identifier (ID) 524, a vault ID 526, a data object ID 528, dispersed storage encoding parameters ID 530, and a data segment ID 532. The encoded data slice number ID 524 indicates an encoded data slice number of each set of encoded data slices. For instance, a number from 1-8 when the IDA width is 8. The vault ID 526 includes a vault identifier number associated with at least one of a requesting entity and the data object. The data object ID 528 includes a number (e.g., a random number, a deterministic function value generated by performing a deterministic function on the data ID) generated once when receiving the data object for storage. The dispersed storage encoding parameters ID 530 includes an identifier associated with a particular combination of the dispersed storage encoding parameters. The data segment ID 532 includes a number of each segment of the plurality of segments. The slice address 522 may further include a data partition identifier that identifies a group of data segments. For instance, the data segment ID 532 includes multiple identifiers corresponding to multiple data segments.

Having generated the read threshold number of access requests 516, the DS error decoding 182 sends, via the network 24, the read threshold number of access requests 516 to the selected storage units. For example, the DS error decoding 182 sends the access request 516 to storage units 1-2 and 4-7. As another example, the DS error decoding 182 sends a common access request 516 to a group of storage units. The group of storage units receives the common access request.

Each storage unit of a group of storage units interprets the access request to determine whether the storage unit is an intended recipient of the access request 516, where storage units of a sub-set of storage units of the group of storage units are intended recipients. The interpreting the access request includes comparing, by each storage unit of the group of storage units, a requesting entity's identifier of the access request with a list of authorized users to determine whether the storage unit is the intended recipient of the access request 516.

Having determined that the storage request 516 is the intended recipient of the access request 516, each storage unit of the sub-set of storage units determines a type of the access request and a level of the access request. The interpreting includes the storage unit interpreting the type 518 and the level 520 of the access request 516.

FIG. 45C illustrates further steps of the example of the reading of the stored data where, having determined the type of the access request and the level of the access request, the storage unit processes the access request in accordance with the type of the access request and the level of the access request. As a specific example, when the access request is the read request and the level of access request is at the data object level, each storage unit searches a slice address table (e.g., within the local memory of the storage unit) based on the given data object identifier 528 of the access request 516, where the slice address table includes a plurality of slice addresses regarding a plurality of encoded data slices stored within the storage unit (e.g., updated when storing slices). The slice address table further includes a searchable data object identifier field, a searchable data segment identifier field, and a searchable encoded data slice number identifier field.

Having searched the slice address table, each storage unit of the sub-set of storage units retrieves, from the local memory, each encoded data slice of the plurality of encoded data slices having the data object identifier of its slice address substantially matching the given data object identifier 528 to produce a retrieved set of encoded data slices 534. Having retrieved the encoded data slices, each storage unit sends, via the network 24, the retrieved set of encoded data slices 534 to a requesting entity of the DSN (e.g., to the DS error decoding 182). For example, storage unit 1 sends encoded data slice 1 to the DS error decoding 182, storage unit 4 sends encoded data slice 3 to the DS error decoding 182, storage unit 5 sends encoded data slice 4 to the DS error decoding 182, storage unit 6 sends encoded data slice 5 to the DS error decoding 182, and storage unit 7 sends encoded data slice 6 to the DS error decoding 182. The DS error decoding module 182 decodes a decode threshold number of received encoded data slices 534 (e.g., extracted from received read slice responses) for each set of encoded data slices to reproduce data 536.

As another specific example of the processing of the access request 516 based on the type of the access request and the level of the access request, when the access request is the read request and the level of access request is at the data segment level, each storage unit of the sub-set of storage units searches the slice address table based on the given data segment identifier 532 of the access request 516. Each storage unit of the sub-set of storage units retrieves from the local memory an encoded data slice of the plurality of encoded data slices having the data segment identifier of its slice address substantially matching the given data segment identifier 532 to produce a retrieved encoded data slice. Each storage unit of the sub-set of storage units sends, via the network 24, the retrieved encoded data slice to the requesting entity of the DSN (e.g., to the DS error decoding 182).

As yet another specific example of the processing of the access request 516 based on the type of the access request and the level of the access request, when the access request is the read request, or rebuild request, and the level of access request is at the encoded data slice level, each storage unit of the sub-set of storage units searches the slice address table based on the given encoded data slice number identifier 524 of the access request 516. A storage unit of the sub-set of storage units retrieves from the local memory an encoded data slice of the plurality of encoded data slices having the encoded data slice number identifier of its slice address substantially matching the given encoded data slice number identifier 524 to produce a retrieved encoded data slice. Alternatively, more than one storage unit retrieves the encoded data slice when replicated encoded data slices have been previously stored. The storage unit sends, via the network 24, the retrieved encoded data slice to the requesting entity of the DSN (e.g., to the DS error decoding 182).

As a further specific example of processing the access request 516 based on the type of the access request and the level of the access request, when the access request is the list request and the level of access request is at the data object level, each storage unit of the sub-set of storage units searches the slice address table based on the given data object identifier 528 of the access request 516. Each storage unit of the sub-set of storage units generates from the local memory a list response to include a slice address for each encoded data slice of the plurality of encoded data slices having the data object identifier of its slice address substantially matching the given data object identifier 528. Each storage unit of the sub-set of storage units sends, via the network 24, the list response to the requesting entity of the DSN (e.g., the DS error decoding 182).

As a still further specific example of processing the access request 516 based on the type of the access request and the level of the access request, when the access request is the list request and the level of access request is at the data segment level, each storage unit of the sub-set of storage units searches the slice address table based on the given data segment identifier 532 of the access request 516. Each storage unit of the sub-set of storage units generates from the local memory a list response to include a slice address for the encoded data slice of the plurality of encoded data slices having the data segment identifier of its slice address substantially matching the given data segment identifier 532. Each storage unit of the sub-set of storage units sends, via the network 24, the list response to the requesting entity of the DSN (e.g., the DS error decoding 182).

As yet a still further specific example of processing the access request 516 based on the type of the access request and the level of the access request, when the access request is the list request and the level of access request is at the encoded data slice level, each storage unit of the sub-set of storage units searches the slice address table based on the given encoded data slice number identifier 524 of the access request 516. At least one storage unit of the sub-set of storage units generates from the local memory a list response to include a slice address for the encoded data slice of the plurality of encoded data slices having the encoded data slice number identifier of its slice address substantially matching the given data segment number identifier 532. The storage unit sends, via the network 24, the list response to the requesting entity of the DSN (e.g., the DS error decoding 182).

FIG. 45D is a flowchart illustrating an example of accessing data. In particular, a method is presented for use in conjunction with one or more functions and features described in conjunction with FIGS. 1-39, 45A-C, and also FIG. 45D. The method begins at step 540 where a processing module of a storage unit of one or more storage units of a dispersed storage network (DSN) receives, by a group of storage units, a common access request, where a data object is divided into a plurality of data segments, where a data segment of the plurality of data segments is encoded to produce a set of encoded data slices, and where a decode threshold number of encoded data slices of the set of encoded data slices is required to reconstruct the data segment. Hereafter, the common access request may be interchangeably referred to as the access request.

The method continues at step 542 where each storage unit of the group of storage units interprets the access request to determine whether the storage unit is an intended recipient of the access request, where storage units of a sub-set of storage units of the group of storage units are intended recipients. The interpreting the access request further includes comparing, by each storage unit of the group of storage units, a requesting entity's identifier of the access request with a list of authorized users to determine whether the storage unit is the intended recipient of the access request.

The method continues at step 544 where each storage unit of the sub-set of storage units determines a type of the access request and a level of the access request (e.g., by interpreting the access request). When the access request is a read request and the level of access request is at a data segment level, the method branches to step 552. When the access request is the read request and the level of access request is at an encoded data slice level, the method branches to step 558. When the access request is the read request and the level of access request is at a data object level, the method continues to step 546.

When the access request is the read request and the level of access request is at the data object level, the method continues at step 546 where each storage unit of the sub-set of storage units searches a slice address table based on a given data object identifier of the access request, wherein the slice address table includes a plurality of slice addresses regarding a plurality of encoded data slices stored within the storage unit. A slice address includes a data object identifier, a data segment identifier, and an encoded data slice number identifier. The slice address further include one or more of a data partition identifier that identifies a group of data segments, and a dispersed storage encoding parameters identifier. The slice address table includes a searchable data object identifier field, a searchable data segment identifier field, and a searchable encoded data slice number identifier field.

The method continues at step 548 where each storage unit of the sub-set of storage units retrieves from local memory each encoded data slice of the plurality of encoded data slices having the data object identifier of its slice address substantially matching the given data object identifier to produce a retrieved set of encoded data slices. The method continues at step 550 where each storage unit of the sub-set of storage units sends the retrieved set of encoded data slices to a requesting entity of the DSN.

When the access request is the read request and the level of access request is at the data segment level, the method continues at step 552 where each storage unit of the sub-set of storage units searches the slice address table based on a given data segment identifier of the access request. The method continues at step 554 where each storage unit of the sub-set of storage units retrieves from the local memory an encoded data slice of the plurality of encoded data slices having the data segment identifier of its slice address substantially matching the given data segment identifier to produce a retrieved encoded data slice. The method continues at step 556 where each storage unit of the sub-set of storage units sends the retrieved encoded data slice to the requesting entity of the DSN.

When the access request is the read request or a rebuild request and the level of access request is at the encoded data slice level, the method continues at step 558 where each storage unit of the sub-set of storage units searches the slice address table based on a given encoded data slice number identifier of the access request. The method continues at step 560 where at least one storage unit of the sub-set of storage units retrieves from the local memory an encoded data slice of the plurality of encoded data slices having the encoded data slice number identifier of its slice address substantially matching the given encoded data slice number identifier to produce a retrieved encoded data slice. The method continues at step 562 where the storage unit sends the retrieved encoded data slice to the requesting entity of the DSN.

Alternatively, or in addition to, when the access request is a list request and the level of access request is at the data object level, the method includes each storage unit of the sub-set of storage units searching the slice address table based on the given data object identifier of the access request. Each storage unit of the sub-set of storage units generates from the local memory, a list response to include a slice address for each encoded data slice of the plurality of encoded data slices having the data object identifier of its slice address substantially matching the given data object identifier. Each storage unit of the sub-set of storage units sends the list response to the requesting entity of the DSN.

Alternatively, or in addition to, when the access request is the list request and the level of access request is at the data segment level, the method includes each storage unit of the sub-set of storage units searching the slice address table based on a given data segment identifier of the access request. Each storage unit of the sub-set of storage units generates from the local memory a list response to include a slice address for the encoded data slice of the plurality of encoded data slices having the data segment identifier of its slice address substantially matching the given data segment identifier. Each storage unit of the sub-set of storage units sends the list response to the requesting entity of the DSN.

Alternatively, or in addition to, when the access request is the list request and the level of access request is at the encoded data slice level, the method includes each storage unit of the sub-set of storage units searching the slice address table based on a given encoded data slice number identifier of the access request. At least one storage unit of the sub-set of storage units generates from the local memory a list response to include a slice address for the encoded data slice of the plurality of encoded data slices having the encoded data slice number identifier of its slice address substantially matching the given data segment number identifier. The at least one storage unit sends the list response to the requesting entity of the DSN.

The method described above in conjunction with the processing module and the storage unit can alternatively be performed by other modules of the dispersed storage network or by other devices. In addition, at least one memory section that stores operational instructions can, when executed by one or more processing modules of one or more computing devices of the dispersed storage network (DSN), cause the one or more computing devices to perform any or all of the method steps described above.

FIG. 46A is a schematic block diagram of another dispersed storage network (DSN) that includes the distributed storage and task (DST) client module 34 of FIG. 1 and the storage group 510 of FIG. 45A. The storage group 510 includes a storage group number of DST execution units, where the storage group number is greater than each width number of a corresponding dispersal parameter set utilized when dispersed storage error encoding multiple data objects with different dispersal parameters for storage in the storage group 510. As a specific example, the storage group includes 10 DST execution units when a width is 5 for storage of a data object A and a width is 8 for storage of a data object B. The DST execution units may be implemented utilizing the DST execution unit 36 of FIG. 1. The DST client module 34 includes the dispersed storage (DS) error encoding module 112 of FIG. 4.

The DSN is operable to store the multiple data objects (e.g., A and B) in the storage group 510. As a specific example, data object A is segmented utilizing a segmentation scheme to produce data segments. Each data segment is encoded using a dispersed storage error coding function and in accordance with the dispersal parameters for data object A to produce a set of 5 encoded data slices. The dispersal parameters includes one or more of the width, a write threshold, a read threshold, a decode threshold, a target number that is greater than or equal to the decode threshold and less than or equal to the width number, an encoding matrix identifier, and an information dispersal algorithm identifier. For instance, each data segment includes the width number of 5 encoded data slices for storage in the storage group and may be recovered when at least the decode threshold number of encoded data slices are subsequently retrieved from the storage group and decoded using the dispersed storage error coding function.

When the set of encoded data slices is to be stored in the storage group, there are a (storage group number) choose (width number) of combinations for selecting the width number of DST execution units from the storage group number of DST execution units. For instance, there are 252=10 choose 5 number of combinations for selecting the width number of DST execution units from the storage group when the storage group includes 10 DST execution units and the width is 5 for data object A.

In an example of a writing data operation, the DST client module 34 receives a write request to store data object A 570 in the storage group 510. The request 570 may include the data object A and a data identifier (ID) for data object A. The DST client module 34 determines the dispersal parameters based on one or more of the data ID, a requesting entity ID, a data type indicator, a data size indicator, a system registry lookup, a directory lookup, and a dispersed hierarchical index lookup. The DS error encoding module 112 encodes the data using the dispersed storage error coding function and in accordance with the dispersal parameters to produce sets of the width number (e.g., 5) of encoded data slices (e.g., encoded data slices A1-A5).

The DST client module 34 obtains storage unit status information 574 for the storage group 510. The storage unit status information 574 includes, for one or more of the DST execution units, one or more of a current throughput level, a throughput capability level, a level of storage utilization, a task loading level, an access latency level, and an availability status (e.g., off-line, online, rebuilding with limited availability). Having obtained the storage unit status information 574, the DST client module 34 selects a width number of DST execution units of the storage group based on one or more of the storage unit status information and a load equalization scheme. As a specific example, the DST client module 34 selects a different combination of the width number of DST execution units for each data segment in accordance with a round robin load equalization scheme. As another specific example, the DST client module 34 selects the width number of DST execution units associated with favorable storage unit status information (e.g., available status).

Having selected the width number of DST execution units, the DST client module 34 generates sets of a width number of slice names 570, where each slice name 578 includes a portion of the dispersal parameters (e.g., a target number). For example, each slice name includes a pillar index field 582, a vault ID field 584, an object ID field 586, a dispersal parameters field 588, and a segment number field 590. The pillar index field 582 includes a pillar index entry corresponding to a slice number of the width number of slices (e.g., 1-5). The vault ID field 584 includes a vault entry corresponding to a vault associated with the write request for data object A. The object ID field 586 includes an object entry, where the object entry is a random number that is permanently assigned to the data object A. The dispersal parameters field 588 includes dispersal parameter entries of one or more of the dispersal parameters. For example, the dispersal parameters field includes a dispersal parameter entry for the width number to signify an expected target number of encoded data slices of the set of encoded data slices that includes the encoded data slice associated with the slice name. The segment number field 590 includes a segment number entry corresponding to a segment of the data segments of the data.

Having generated the width number of slice names 578, the DST client module 34 generates a width number of write slice requests 576 (e.g., write slice requests A1-A5), where the width number of write slice requests 576 includes the sets of the width number of encoded data slices and the sets of the width number of slice names 578. For example, each write slice request 576 includes an encoded data slice 580 of the width number of encoded data slices and a corresponding slice name 578 of the width number of slice names associated with the width number of encoded data slices.

Having generated the width number of write slice requests 576, the DST client module 34 sends the width number of write slice requests 576 (e.g., write slice requests A1-A5) to the selected width number of DST execution units to store the sets of encoded data slices and associated sets of the width number of slice names.

Having issued the width number of write slice requests 576, the DST client module 34 associates the data ID with the width number of DST execution units. For example, the DST client module 34 updates a directory to associate the data ID with identifiers of the width number of DST execution units.

The process may be repeated to store data object B. For example, the DST client module 34 receives a write data request to write data object B 572 in the storage group 510, where the write data request 572 includes a data ID of the data object B. The DST client module 34 determines the dispersal parameters to include a width of 8 and identifies a target number of 7 DST execution units. The DS error encoding module 112 encodes data object B to produce sets of 8 encoded data slices. The DST client module 34 generates 8 slice names for each set of encoded data slices to produce sets of 8 slice names, where the dispersal parameters field includes a dispersal parameters entry of a target of 7. The DST client module 34 issues sets of write slice requests (e.g., write slice requests B1-B7) to the identified 7 DST execution units, where the write slice requests includes subsets of 7 encoded data slices of the sets of 8 encoded data slices and subsets of 7 slice names of the sets of 8 slice names. The DST client module 34 associates the data ID of the data object B with the 7 identified DST execution units.

FIG. 46B is a flowchart illustrating an example of writing data. The method begins with step 592 where a processing module (e.g., of a distributed storage and task (DST) client module) receives a write request to store data in a storage group of storage units. The method continues at step 594 where the processing module determines dispersal parameters (e.g., via a lookup). The method continues at step 596 where the processing module encodes the data using the dispersal parameters to produce sets of a width number of encoded data slices. The method continues at step 598 where the processing module obtains storage unit status information for the storage group of storage units. The method continues at step 600 where the processing module selects a target number of storage units of the storage group based on the storage unit status information.

The method continues at step 602 where the processing module generates sets of a width number of slice names, where each slice name includes a portion (e.g., a width number entry) of the dispersal parameters. The method continues at step 604 where the processing module generates a target number of write slice requests, where the requests includes the target number of encoded data slices of the sets of the width number of encoded data slices and the target number of slice names of the sets of the width number of slice names.

The method continues at step 606 where the processing module sends the target number of write slice requests to the selected target number of storage units to store the sets of encoded data slices and the sets of slice names. The method continues at step 608 where the processing module associates an identifier of the data with identifiers of the selected width number of storage units (e.g., updates a directory).

FIG. 46C is a schematic block diagram of another dispersed storage network (DSN) that includes the distributed storage and task (DST) client module 34 of FIG. 1 and the storage group 510 of FIG. 46A. The DST client module 34 includes a rebuilding module 610. The DSN is operable to rebuild encoded data slices associated with slice errors, where an object is segmented utilizing a segmentation scheme to produce data segments. Each data segment is encoded using a dispersed storage error coding function and in accordance with dispersal parameters for the data object to produce a set of encoded data slices. The dispersal parameters includes one or more of a width, a write threshold, a read threshold, a decode threshold, an encoding matrix identifier, and an information dispersal algorithm identifier. For instance, each data segment includes the width number of encoded data slices for storage in the storage group and may be recovered when at least the decode threshold number of encoded data slices are subsequently retrieved from the storage group and decoded using the dispersed storage error coding function.

The slice error includes at least one of a missing slice and a corrupted slice. A missing slice may be detected when an expected slice name is not present on an expected DST execution unit. A corrupted slice may be detected when a calculated integrity value for the encoded data slice does not match a stored integrity value for the encoded data slice. A list range request and the list range response sequence may be performed to detect the missing slice by identifying the DST execution unit that has no record of the expected slice name.

In an example of a rebuilding operation, the DST client module 34 issues a storage group number of list range requests 1-10 to the storage group 510. The issuing includes generating the storage group number of list range requests 1-10 and sending the storage group number of list range requests 1-10 to each DST execution unit 1-10 of the storage group. Each list range request includes a starting slice name and an ending slice name, where the slice names correspond to a common DSN address range across the storage group. Each DST execution unit processes a corresponding list range request and issues a corresponding list range response. The DST client module 34 receives list range responses 1-10, where each list range response indicates slice names of currently stored encoded data slices where the slice names fall within the starting slice name and the ending slice name.

For a set of encoded data slices, the DST client module 34 interprets received slice names from the list range responses to determine a width number. For example, the DST client module 34 extracts a width number from a dispersal parameters field of a received slice name. Having determined the width number, the DST client module 34 compares received list range responses for the set of encoded data slices to determine a number of stored encoded data slices of the set of encoded data slices.

When the number of stored encoded data slices compares unfavorably to the width number, the processing module 34 initiates a rebuilding process to modify the number of stored encoded data slices. As a specific example, when there are too few stored encoded data slices (e.g., less than the width number), the rebuilding module rebuilds one or more encoded data slices and issues one or more write slice requests 576 to the storage group, where the one or more write slice requests includes rebuilt encoded data slices. As another specific example, when there are too many stored encoded data slices (e.g., greater than a target number and less than or equal to the width number), the DST client module 34 issues one or more write slice requests to the storage group, where the one or more write slice requests includes delete slice requests to adjust the number of stored encoded data slices to be the target number.

FIG. 46D is a flowchart illustrating an example of rebuilding data. The method begins at step 614 where a processing module (e.g., of a distributed storage and task (DST) client module) issues list range requests to storage units of a storage group. The issuing includes selecting a dispersed storage network (DSN) address range, generating the list range requests in accordance with the DSN address range, and outputting the list range requests to the storage group. The method continues at step 616 where the processing module receives the list range responses from storage group. For slice names associated with a set of encoded data slices, the method continues at step 618 where the processing module interprets the slice names to determine a target number. For example, the processing module extracts the target number from a dispersal parameters field of one or more of the slice names of the list range responses.

The method continues at step 620 where the processing module interprets the list range responses for the set of encoded data slices to determine a number of stored encoded data slices of the set of encoded data slices. For example, the processing module identifies a number of stored encoded data slices where each encoded data slice is associated with a common revision number and slice names of the slice names associated with the set of encoded data slices. When the number of stored encoded data slices compares unfavorably to the target number, the method continues at step 622 where the processing module initiates a rebuilding process to favorably modify the number of stored encoded data slices. As a specific example, when the number of stored encoded data slices is less than the target number, the processing module rebuilds one or more encoded data slices and issues one or more write slice requests to the storage group to store the rebuilt one or more encoded data slices. As another specific example, when the number of stored encoded data slices is greater than the target number, the processing module issues one or more delete slice requests to the storage group to delete one or more encoded data slices such that the number of remaining stored encoded data slices is substantially the same as the target number.

FIG. 47A is a schematic block diagram of another dispersed storage network (DSN) that includes the distributed storage and task (DST) client modules 34 of FIG. 1, a data backup unit 632, and a DST execution unit set 630. Alternatively, the DSN includes two or more backup units 632. The data backup unit 632 may be implemented utilizing at least one of a storage server, a storage unit, a memory device, a user device, a DST execution unit, a tape drive, an archive memory system, and another DSN. The DST execution unit set includes a set of DST execution units 1-n. Each DST execution unit may be implemented utilizing the DST execution unit 36 of FIG. 1.

The DSN is operable to store and retrieve data in one or more of the DST execution unit set and the data backup unit. As a specific example, a data object 638 is stored in the data backup unit 632 and the data object 638 is segmented utilizing a segmentation scheme to produce data segments. Each data segment is encoded using a dispersed storage error coding function in accordance with dispersal parameters to produce a set of encoded data slices. Sets of encoded data slices are stored in the DST execution unit set. The dispersal parameters includes one or more of a width, a write threshold, a read threshold, a decode threshold, an encoding matrix identifier, and an information dispersal algorithm identifier. For instance, each data segment includes a width number of encoded data slices for storage in the DST execution unit set and may be recovered when at least a decode threshold number of encoded data slices are subsequently retrieved from the DST execution unit set and decoded using the dispersed storage error coding function.

As a specific example of operation, the DST client module 34 detects a slice error associated with an identified encoded data slice, of one of the sets of encoded data slices, requiring rebuilding as a rebuilt encoded data slice. The identifying includes at least one of receiving an error message, performing a list slice range operation, performing a list digest operation, detecting a missing slice, and detecting a corrupted slice. Having identified the slice error, the DST client module 34 determines whether the data object is available from an alternative storage mechanism. The determining may be based on one or more of receiving a status message, initiating a query, performing a lookup, accessing a storage location table, accessing a system registry, identifying the alternative storage mechanism as the data backup unit, issuing a data object request 636 to the data backup unit, and receiving the data object 638 from the data backup unit 632. As a specific example, the DST client module 34 utilizes an identifier of the data object to access the storage location table to identify storage locations to include the data backup unit and the DST execution unit set.

When the data object 638 is available from the alternative storage mechanism, the DST client module 34 determines whether DSN memory loading is unfavorable. As a specific example, the DST client module obtains DSN memory loading information (e.g., a memory access loading level, a latency level, a task processing level, a throughput level, a predetermination) with regards to the DST execution unit set and compares the DSN memory loading information to a DSN memory loading threshold level. For instance, the DST client module 34 determines that the DSN memory loading is unfavorable when the memory access loading level is greater than a memory access loading threshold level. As another instance, the DST client module 34 determines that the DSN memory loading is unfavorable based on the predetermination (e.g., always determines that the DSN memory loading is unfavorable).

When the data object 638 is not available from the alternative storage mechanism, the DST client module 34 issues read slice requests to the DST execution unit set, receives at least a decode threshold number of read slice responses 634 that include a decode threshold number of encoded data slices of the one set of encoded data slices that does not include the identified encoded data slice of the detected slice error. Next, the DST client module 34 decodes the decode threshold number of encoded data slices to reproduce a corresponding data segment, encodes the data segment to produce the rebuilt encoded data slice, and issues a write slice request 576 to a corresponding DST execution unit, where the write slice request includes the rebuilt encoded data slice.

When the data object 638 is available from the alternative storage mechanism and the DSN memory loading is unfavorable, the DST client module 34 retrieves the data object from the alternative storage mechanism. As a specific example, the DST client module 34 identifies the data backup unit 632 as the alternative storage mechanism (e.g., based on the storage location table lookup), issues the data object request 636 to the data backup unit, where the data object request 636 includes a data identifier of the data object, and receives the data object 638 from the data backup unit 632. Having received the data object 638, the DST client module 34 identifies a portion of the data object corresponding to the encoded data slice requiring rebuilding. As a specific example, the DST client module 34 identifies a data segment based on a segment number and the segmentation scheme (e.g., offset into the data object).

Having identified the portion of the data object, the DST client module 34 encodes a portion of the data object using the dispersed storage error coding function to produce the rebuilt encoded data slice. As a specific example, the DST client module 34 selects a row of an encoding matrix corresponding to the encoded data slice to be rebuilt, where the encoding matrix was utilized to dispersed storage error encode the data segment to produce the one set of encoded data slices, and matrix multiplies the row by the identified data segment to produce the rebuilt encoded data slice. Having produced the rebuilt encoded data slice, the DST client module 34 issues the write slice request 576 to the corresponding DST execution unit, where the write slice request 576 includes the rebuilt encoded data slice.

FIG. 47B is a flowchart illustrating another example of rebuilding data. The method begins at step 640 where a processing module (e.g., of a distributed storage and task (DST) client module) identifies an encoded data slice requiring rebuilding of a set of encoded data slices. The identifying includes at least one of receiving a rebuilding request, receiving an error message, and detecting a slice error. The detecting the slice error may include issuing storage requests to a set of storage units, receiving list range responses, and comparing the list range responses to identify a missing encoded data slice as the encoded data slice requiring rebuilding. The identifying may further include determining whether dispersed storage network (DSN) memory loading is unfavorable by obtaining DSN memory loading information and comparing the DSN memory loading information to a DSN memory loading threshold level.

When the DSN memory loading is unfavorable, the method continues at step 642 where the processing module determines whether a corresponding data object is available from an alternative storage mechanism. The determining includes at least one of initiating a query, performing a lookup, accessing a data storage unit, accessing a storage location table, accessing a dispersed hierarchical index, and accessing a directory. When the corresponding data object is available from the alternative storage mechanism, the method continues at step 644 where the processing module retrieves the data object from the alternative storage mechanism. As a specific example, the processing module identifies the alternative storage mechanism, issues a data object request to the alternative storage mechanism, and receives the data object.

The method continues at step 646 where the processing module identifies a portion of the data object corresponding to the encoded data slice requiring rebuilding. As a specific example, the processing module identifies a data segment based on a segmentation scheme and a segment number extracted from a slice name of the encoded data slice requiring rebuilding. The method continues at step 648 where the processing module encodes the portion of the data object using a dispersed storage error coding function to produce a rebuilt encoded data slice. As a specific example, the processing module selects a row of an encoding matrix of the dispersed storage error coding function to produce a shortened matrix and matrix multiplies the data segment by the shortened matrix to produce the rebuilt encoded data slice. The method continues at step 650 where the processing module sends the rebuilt encoded data slice to a corresponding storage unit for storage therein. As a specific example, the processing module generates a write slice request that includes the slice name and the rebuilt encoded data slice, identifies a storage unit corresponding to the slice name, and sends the write slice request to the identified storage unit.

FIG. 48A is a schematic block diagram of another dispersed storage network (DSN) that includes the distributed storage and task (DST) client modules 34 of FIG. 1 and a DST execution unit set 630. The DST execution unit set 630 includes a set of DST execution units 1-n. Each DST execution unit may be implemented utilizing the DST execution unit 36 of FIG. 1. The DSN is operable to store data in the DST execution unit set.

As a specific example of operation, the DST client module 34 segments an updated revision of a data object utilizing a segmentation scheme to produce data segments. The DST client module 34 encodes each data segment using a dispersed storage error coding function in accordance with dispersal parameters to produce a set of encoded data slices. The dispersal parameters includes one or more of a width, a write threshold, a read threshold, a decode threshold, an encoding matrix identifier, and an information dispersal algorithm identifier. For instance, the DST client module 34 encodes each data segment to produce a width number of encoded data slices for storage in the DST execution unit set and may be recovered when at least a decode threshold number of encoded data slices are subsequently retrieved from the DST execution unit set and decoded using the dispersed storage error coding function.

The DST client module 34 generates sets of slice names for the sets of encoded data slices, where the sets of slice names are associated with a new revision number 658 associated with the updated revision of the data object. As a specific example, the DST client module 34 generates the new revision number 658 as a last known revision number 656 plus one, where the last known revision number 656 includes a previous revision number with regards to the DST client module 34 (e.g., locally cached).

Having produced the set of encoded data slices, the set of slice names, and the new revision number, the DST client module 34 issues a set of checked write slice requests 1-n 652 to the DST execution unit set 630, where each of the set of checked write slice requests 652 includes an encoded data slice 660 of the set of encoded data slices, a slice name 654 of the set of slice names, the new revision number 658, and the last known revision number 656. Each checked write slice request 652 may further include a desired response indicator, where the desired response indicator indicates whether a corresponding checked write slice response shall include encoded data slices of committed slice revisions that are greater than the new revision number and whether the corresponding checked write slice response shall include encoded data slices of uncommitted revisions greater than the new revision number. The set of checked write slice requests 1-n and a corresponding set of checked write slice responses 1-n may include a common transaction number to tie them together. Alternatively, or in addition to, each checked write slice request may include two or more encoded data slices, corresponding slice names, last known revisions, and the revision numbers.

For each DST execution unit, the DST execution unit determines whether the last known revision number 656 is substantially the same as a current committed revision number of a corresponding encoded data slice associated with the slice name 654. When substantially the same, a synchronized state exists between revisions of the DST client module 34 and the DST execution unit. When the last known revision number 656 is not substantially the same as the current committed revision number, the DST execution unit issues a checked write slice response 662 to the DST client module 34, where the checked write slice response 662 includes a status indicator 664 and, for each of r number of revisions with a revision number greater than the last known revision number, a corresponding retrieved encoded data slice and the revision number. The checked write slice response 662 may further include such information for both a committed and an uncommitted encoded data slice, where a committed encoded data slice is associated with receiving a commit transaction request when the encoded data slice is stored.

The status indicator 664 includes at least one status indication including at least one of no error, slice name that assigned to the DST execution unit, a slice name locked by another transaction (e.g., may be an uncommitted slice with a greater revision number than the last on revision of the checked write slice request), a current committed revision does not equal the last known revision of the checked write slice request (e.g., slice name not locked by another transaction), and insufficient permissions. Having received the checked write slice responses 662, the DST client module 34 updates the last known revision number to be substantially the same as a greatest revision number extracted from the checked write slice responses. The DST client module may reissue the checked write slice requests 1-n utilizing an updated new revision number based on the updated last known revision number.

FIG. 48B is a flowchart illustrating another example of writing data. The method begins at step 666 where a client module (e.g., of a distributed storage and task (DST) client module) obtains a set of encoded data slices for storage in a set of storage units. The obtaining includes at least one of receiving the set of encoded data slices, generating the set of encoded data slices, and obtaining a last known revision number associated with a previously stored set of encoded data slices associated with a set of slice names corresponding to the set of encoded data slices. The method continues at step 668 where the client module generates a set of checked write slice requests, where each checked write slice request includes an encoded data slice of the set of encoded data slices, a slice name of the set of slice names, the last known revision number, and a new revision number (e.g., last known revision number plus one). The method continues at step 670 where the client module sends the set of checked write slice requests to the set of storage units.

For each storage unit of the set of storage units, the method continues at step 672 where the storage unit determines whether the last known revision number is substantially the same as a current committed revision number of a stored encoded data slice corresponding to the slice name. As a specific example, the client module performs a slice name table lookup to identify a the current committed revision number and compares the current committed revision number to the last known revision number from the received checked write slice request.

When the last known revision number is not substantially the same as the current committed revision number of the stored encoded data slice, the method continues at step 674 where the storage unit issues a checked write slice response to the client, where the checked write slice response includes a status indicator and one or more retrieved encoded data slices and associated revision numbers. Alternatively, the storage unit issues the checked write slice response to only include the status indicator when a flag of the corresponding checked write slice request indicates that the response shall not include encoded data slices. The method continues at step 676 where the client module determines an updated last known revision number and an updated new revision number based on the received checked write slice responses from the set of storage units. As a specific example, the client module utilizes an associated revision number of the responses that is a greatest revision number as the updated last known revision number and calculates the updated new revision number by adding one to the updated last known revision number. The method branches back to step 668 where the client module generates the set of checked write slice responses to utilize the updated last known revision number and the updated new revision number.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more storage units of a dispersed storage network (DSN), the method comprises:

receiving, by a group of storage units, a common access request, wherein a data object is divided into a plurality of data segments, wherein a data segment of the plurality of data segments is encoded, based on a plurality of dispersed storage (DS) error encoding parameters, to produce a set of encoded data slices, wherein the dispersed storage (DS) error encoding parameters include data segmenting information, error coding information and slicing information, and further wherein a decode threshold number of encoded data slices of the set of encoded data slices is required to reconstruct the data segment;

interpreting, by each storage unit of the group of storage units, the access request to determine whether the storage unit is an intended recipient of the access request, wherein storage units of a sub-set of storage units of the group of storage units are intended recipients;

determining, by each storage unit of the sub-set of storage units, a type of the access request and a level of the access request; and when the access request is a read request and the level of access request is at a data object level:

searching, by each storage unit of the sub-set of storage units, a slice address table based on a given data object identifier of the access request, wherein the slice address table includes a plurality of slice addresses associated with a group of encoded data slices stored within the storage unit, and wherein a slice address includes a data object identifier, a data segment identifier, and an encoded data slice number identifier;

retrieving, by each storage unit of the sub-set of storage units from local memory, encoded data slices of the plurality of encoded data slices having a data object identifier substantially matching the given data object identifier to produce a retrieved group of encoded data slices; and sending, by each storage unit of the sub-set of storage units, the retrieved group of encoded data slices to a requesting entity of the DSN.

2. The method of claim 1 further comprises:

when the access request is the read request and the level of access request is at a data segment level:

searching, by each storage unit of the sub-set of storage units, the slice address table based on a given data segment identifier of the access request;

retrieving, by each storage unit of the sub-set of storage units from the local memory, an encoded data slice of the plurality of encoded data slices having the data segment identifier substantially matching the given data segment identifier to produce a retrieved encoded data slice; and sending, by each storage unit of the sub-set of storage units, the retrieved encoded data slice to the requesting entity of the DSN.

3. The method of claim 1 further comprises:

when the access request is the read request and the level of access request is at an encoded data slice level:

searching, by each storage unit of the sub-set of storage units, the slice address table based on a given encoded data slice number identifier of the access request;

retrieving, by a storage unit of the sub-set of storage units from the local memory, an encoded data slice of the plurality of encoded data slices having the encoded data slice number identifier substantially matching the given encoded data slice number identifier to produce a retrieved encoded data slice; and sending, by the storage unit, the retrieved encoded data slice to the requesting entity of the DSN.

4. The method of claim 1 further comprises:

when the access request is a list request and the level of access request is at the data object level:

searching, by each storage unit of the sub-set of storage units, the slice address table based on the given data object identifier of the access request;

generating, by each storage unit of the sub-set of storage units from the local memory, a list response to include a slice address for each encoded data slice of the plurality of encoded data slices having the data object identifier substantially matching the given data object identifier; and sending, by each storage unit of the sub-set of storage units, the list response to the requesting entity of the DSN.

5. The method of claim 1 further comprises:

when the access request is a list request and the level of access request is at a data segment level:

searching, by each storage unit of the sub-set of storage units, the slice address table based on a given data segment identifier of the access request;

generating, by each storage unit of the sub-set of storage units from the local memory, a list response to include a slice address for the encoded data slice of the plurality of encoded data slices having the data segment identifier substantially matching the given data segment identifier; and sending, by each storage unit of the sub-set of storage units, the list response to the requesting entity of the DSN.

6. The method of claim 1 further comprises:

when the access request is a list request and the level of access request is at an encoded data slice level:

searching, by each storage unit of the sub-set of storage units, the slice address table based on a given encoded data slice number identifier of the access request;

generating, by a storage unit of the sub-set of storage units from the local memory, a list response to include a slice address for the encoded data slice of the plurality of encoded data slices having the encoded data slice number identifier substantially matching the given data segment number identifier; and sending, by the storage unit, the list response to the requesting entity of the DSN.

7. The method of claim 1, wherein the slice address further comprises one or more of:

a data partition identifier that identifies a group of data segments; and a dispersed storage encoding parameters identifier.

8. The method of claim 1, wherein the interpreting the access request further comprises:

comparing, by each storage unit of the group of storage units, a requesting entity's identifier of the access request with a list of authorized users to determine whether the storage unit is the intended recipient of the access request.

9. The method of claim 1, wherein the slice address table comprises:

a searchable data object identifier field;

a searchable data segment identifier field; and a searchable encoded data slice number identifier field.

10. A computer readable storage medium comprises:

at least one memory section that stores operational instructions that, when executed by one or more processing modules of one or more storage units of a dispersed storage network (DSN), causes the one or more storage units to:

receive, by a group of storage units, a common access request, wherein a data object is divided into a plurality of data segments, wherein a data segment of the plurality of data segments is encoded, based on a plurality of dispersed storage (DS) error encoding parameters, to produce a set of encoded data slices, wherein the dispersed storage (DS) error encoding parameters include data segmenting information, error coding information and slicing information, and further wherein a decode threshold number of encoded data slices of the set of encoded data slices is required to reconstruct the data segment;

interpret, by each storage unit of the group of storage units, the access request to determine whether the storage unit is an intended recipient of the access request, wherein storage units of a sub-set of storage units of the group of storage units are intended recipients;

determine, by each storage unit of the sub-set of storage units, a type of the access request and a level of the access request; and when the access request is a read request and the level of access request is at a data object level:

search, by each storage unit of the sub-set of storage units, a slice address table based on a given data object identifier of the access request, wherein the slice address table includes a plurality of slice addresses associated with a group of encoded data slices stored within the storage unit, and wherein a slice address includes a data object identifier, a data segment identifier, and an encoded data slice number identifier;

retrieve, by each storage unit of the sub-set of storage units from local memory, encoded data slices of the plurality of encoded data slices having a data object identifier substantially matching the given data object identifier to produce a retrieved group of encoded data slices; and send, by each storage unit of the sub-set of storage units, the retrieved group of encoded data slices to a requesting entity of the DSN.

11. The computer readable storage medium of claim 10 further comprises:
the at least one memory section stores further operational instructions that, when executed by the one or more processing modules, causes the one or more storage units of the DSN to:
when the access request is the read request and the level of access request is at a data segment level:
search, by each storage unit of the sub-set of storage units, the slice address table based on a given data segment identifier of the access request;
retrieve, by each storage unit of the sub-set of storage units from the local memory, an encoded data slice of the plurality of encoded data slices having the data segment identifier substantially matching the given data segment identifier to produce a retrieved encoded data slice; and
send, by each storage unit of the sub-set of storage units, the retrieved encoded data slice to the requesting entity of the DSN.

12. The computer readable storage medium of claim 10 further comprises:
the at least one memory section stores further operational instructions that, when executed by the one or more processing modules, causes the one or more storage units of the DSN to:
when the access request is the read request and the level of access request is at an encoded data slice level:
search, by each storage unit of the sub-set of storage units, the slice address table based on a given encoded data slice number identifier of the access request;
retrieve, by a storage unit of the sub-set of storage units from the local memory, an encoded data slice of the plurality of encoded data slices having the encoded data slice number identifier substantially matching the given encoded data slice number identifier to produce a retrieved encoded data slice; and
send, by the storage unit, the retrieved encoded data slice to the requesting entity of the DSN.

13. The computer readable storage medium of claim 10 further comprises:
the at least one memory section stores further operational instructions that, when executed by the one or more processing modules, causes the one or more storage units of the DSN to:
when the access request is a list request and the level of access request is at the data object level:
search, by each storage unit of the sub-set of storage units, the slice address table based on the given data object identifier of the access request;
generate, by each storage unit of the sub-set of storage units from the local memory, a list response to include a slice address for each encoded data slice of the plurality of encoded data slices having the data object identifier substantially matching the given data object identifier; and
send, by each storage unit of the sub-set of storage units, the list response to the requesting entity of the DSN.

14. The computer readable storage medium of claim 10 further comprises:
the at least one memory section stores further operational instructions that, when executed by the one or more processing modules, causes the one or more storage units of the DSN to:
when the access request is a list request and the level of access request is at a data segment level:
search, by each storage unit of the sub-set of storage units, the slice address table based on a given data segment identifier of the access request;
generate, by each storage unit of the sub-set of storage units from the local memory, a list response to include a slice address for the encoded data slice of the plurality of encoded data slices having the data segment identifier substantially matching the given data segment identifier; and
send, by each storage unit of the sub-set of storage units, the list response to the requesting entity of the DSN.

15. The computer readable storage medium of claim 10 further comprises:
the at least one memory section stores further operational instructions that, when executed by the one or more processing modules, causes the one or more storage units of the DSN to:
when the access request is a list request and the level of access request is at an encoded data slice level:
search, by each storage unit of the sub-set of storage units, the slice address table based on a given encoded data slice number identifier of the access request;
generate, by a storage unit of the sub-set of storage units from the local memory, a list response to include a slice address for the encoded data slice of the plurality of encoded data slices having the encoded data slice number identifier substantially matching the given data segment number identifier; and
send, by the storage unit, the list response to the requesting entity of the DSN.

16. The computer readable storage medium of claim 10, wherein the slice address further comprises one or more of:
a data partition identifier that identifies a group of data segments; and
a dispersed storage encoding parameters identifier.

17. The computer readable storage medium of claim 10, wherein the one or more processing modules functions to execute the operational instructions stored by the at least one memory section to cause the one or more storage units of the DSN to interpret the access request by:
comparing, by each storage unit of the group of storage units, a requesting entity's identifier of the access request with a list of authorized users to determine whether the storage unit is the intended recipient of the access request.

18. The computer readable storage medium of claim 10, wherein the slice address table comprises:
a searchable data object identifier field;
a searchable data segment identifier field; and
a searchable encoded data slice number identifier field.

19. A storage unit of a group of storage units of a dispersed storage network (DSN), the storage unit comprises:
a network interface;
a local memory; and
a processing module configured to the network interface and the local memory, wherein the processing module functions to:

receive from a requesting entity of the DSN, via the network interface, a common access request, wherein a data object is divided into a plurality of data segments, wherein a data segment of the plurality of data segments is encoded, based on a plurality of dispersed storage (DS) error encoding parameters, to produce a set of encoded data slices, wherein the dispersed storage (DS) error encoding parameters include data segmenting information, error coding information and slicing information, and further wherein a decode threshold number of encoded data slices of the set of encoded data slices is required to reconstruct the data segment;

interpret the access request to determine whether the storage unit is an intended recipient of the access request, wherein storage units of a sub-set of storage units of the group of storage units are intended recipients;

when the storage unit is the intended recipient, determine a type of the access request and a level of the access request; and when the access request is a read request and the level of access request is at a data object level:
search a slice address table based on a given data object identifier of the access request, wherein the slice address table includes a plurality of slice addresses associated with a group of encoded data slices stored within the storage unit, and wherein a slice address includes a data object identifier, a data segment identifier, and an encoded data slice number identifier;
retrieve, from the local memory, encoded data slices of the plurality of encoded data slices having the data object identifier substantially matching the given data object identifier to produce a retrieved group of encoded data slices; and
send, via the network interface, the retrieved group of encoded data slices to the requesting entity of the DSN.

20. The storage unit of claim 19, wherein the processing module further functions to:
when the access request is the read request and the level of access request is at a data segment level:
search the slice address table based on a given data segment identifier of the access request;
retrieve, from the local memory, an encoded data slice of the plurality of encoded data slices having the data segment identifier substantially matching the given data segment identifier to produce a retrieved encoded data slice; and
send, via the interface, the retrieved encoded data slice to the requesting entity of the DSN.

21. The storage unit of claim 19, wherein the processing module further functions to:
when the access request is the read request and the level of access request is at an encoded data slice level:
search the slice address table based on a given encoded data slice number identifier of the access request;
retrieve, from the local memory, an encoded data slice of the plurality of encoded data slices having the encoded data slice number identifier substantially matching the given encoded data slice number identifier to produce a retrieved encoded data slice; and
send, via the interface, the retrieved encoded data slice to the requesting entity of the DSN.

22. The storage unit of claim 19, wherein the processing module further functions to:
when the access request is a list request and the level of access request is at the data object level:
search the slice address table based on the given data object identifier of the access request;
generate, from the local memory, a list response to include a slice address for each encoded data slice of the plurality of encoded data slices having the data object identifier substantially matching the given data object identifier; and
send, via the interface, the list response to the requesting entity of the DSN.

23. The storage unit of claim 19, wherein the processing module further functions to:
when the access request is a list request and the level of access request is at a data segment level:
search the slice address table based on a given data segment identifier of the access request;
generate, from the local memory, a list response to include a slice address for the encoded data slice of the plurality of encoded data slices having the data segment identifier substantially matching the given data segment identifier; and
send, via the interface, the list response to the requesting entity of the DSN.

24. The storage unit of claim 19, wherein the processing module further functions to:
when the access request is a list request and the level of access request is at an encoded data slice level:
search the slice address table based on a given encoded data slice number identifier of the access request;
generate, from the local memory, a list response to include a slice address for the encoded data slice of the plurality of encoded data slices having the encoded data slice number identifier substantially matching the given data segment number identifier; and
send, via the interface, the list response to the requesting entity of the DSN.

25. The storage unit of claim 19, wherein the slice address further comprises one or more of:
a data partition identifier that identifies a group of data segments; and
a dispersed storage encoding parameters identifier.

26. The storage unit of claim 19, wherein the processing module functions to interpret the access request by:
comparing, by each storage unit of the group of storage units, a requesting entity's identifier of the access request with a list of authorized users to determine whether the storage unit is the intended recipient of the access request.

27. The storage unit of claim 19, wherein the slice address table comprises:
a searchable data object identifier field;
a searchable data segment identifier field; and
a searchable encoded data slice number identifier field.

* * * * *